United States Patent [19]

Kamada et al.

[11] Patent Number: 5,712,964
[45] Date of Patent: Jan. 27, 1998

[54] COMPUTER GRAPHICS DATA DISPLAY DEVICE AND METHOD BASED ON A HIGH-SPEED GENERATION OF A CHANGED IMAGE

[75] Inventors: Hiroshi Kamada; Katsuhiko Hirota; Kaori Suzuki; Atsuko Tada; Asako Yumoto; Michiteru Kodama; Hirokatsu Musha; Fujio Sato; Kiyoshi Kobayashi, all of Kawasaki; Satoshi Kasai, Shizuoka, all of Japan

[73] Assignee: Fujitsu Limited, Kawasaki, Japan

[21] Appl. No.: 313,914

[22] Filed: Sep. 28, 1994

[30] Foreign Application Priority Data

| Sep. 29, 1993 | [JP] | Japan | 5-242974 |
| Sep. 29, 1993 | [JP] | Japan | 5-242975 |
| Sep. 29, 1993 | [JP] | Japan | 5-243075 |
| Sep. 29, 1993 | [JP] | Japan | 5-243083 |
| Sep. 29, 1993 | [JP] | Japan | 5-265613 |

[51] Int. Cl.$^6$ ............................................. G06T 15/70
[52] U.S. Cl. ................................................... 395/118
[58] Field of Search ........................... 395/118, 119, 395/124, 806

[56] References Cited

U.S. PATENT DOCUMENTS

| 5,356,156 | 10/1994 | Suzuki et al. | 395/118 X |
| 5,430,835 | 7/1995 | Williams et al. | 395/154 |
| 5,481,664 | 1/1996 | Hiroya et al. | 395/154 |
| 5,485,560 | 1/1996 | Ishida et al. | 395/119 X |
| 5,513,303 | 4/1996 | Robertson et al. | 395/119 |
| 5,537,528 | 7/1996 | Takahashi et al. | 395/154 |

Primary Examiner—Phu K. Nguyen
Assistant Examiner—Cliff N. Vo
Attorney, Agent, or Firm—Staas & Halsey

[57] ABSTRACT

A computer graphics data display device and method simplify a movement interference calculation by use of an interference attribute of an object, and control a process time by predicting a display time of a frame. Furthermore, the number of simultaneously calculated moving objects is restricted to speed up the calculation, and a retrieving process can also be performed at a high speed using display data obtained by compressing editing data. If any change has arisen in the editing data, only change data are transmitted to a display data memory unit, and the editing data and the display data are concurrently processed. Thus, dynamic images can be successfully displayed with reality.

27 Claims, 80 Drawing Sheets

■ AND — : PINK (SWITCH ATTRIBUTE OBJECT)

◎ : POSITION OF VIEWPOINT

▧ : PALE BLUE (REACTION ATTRIBUTE OBJECT)

☐ : WHITE (OTHER OBJECTS)

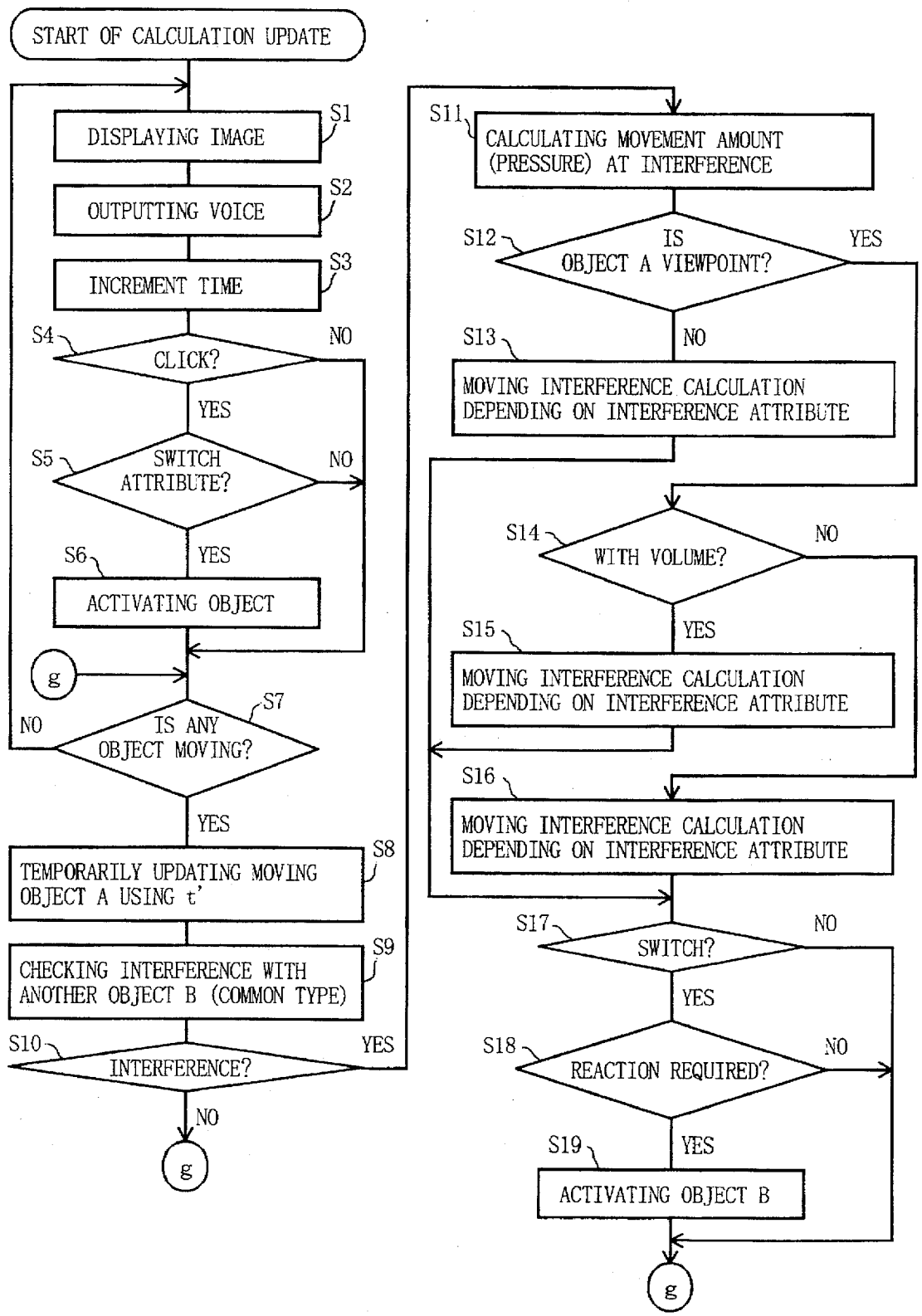
F I G. 19

CENTER OF BOUNDING VOLUME OF AMENDED OBJECT A =
CENTER OF BOUNDING VOLUME OF TEMPORARILY UPDATED
OBJECT A + L2
L2 = RADIUS OF BOUNDING VOLUME OF OBJECT A - L1
CALCULATING L1 FROM FLOOR AND CENTRAL POSITION
OF BOUNDING VOLUME

OBJECT TREE 101  MOVING OBJECT LIST

| ANIMATION DATA | DYNAMICS (PHISICS RULE) METHOD | KEY FRAME METHOD |
|---|---|---|
| REQUIRED DATA | •CENTER-OF-GRAVITY DATA<br>•GRAVITY DATA | •POSITION DATA OF OBJECT IN KEY FRAME (GENERALLY POSITION DATA OF PLURAL OBJECTS) |

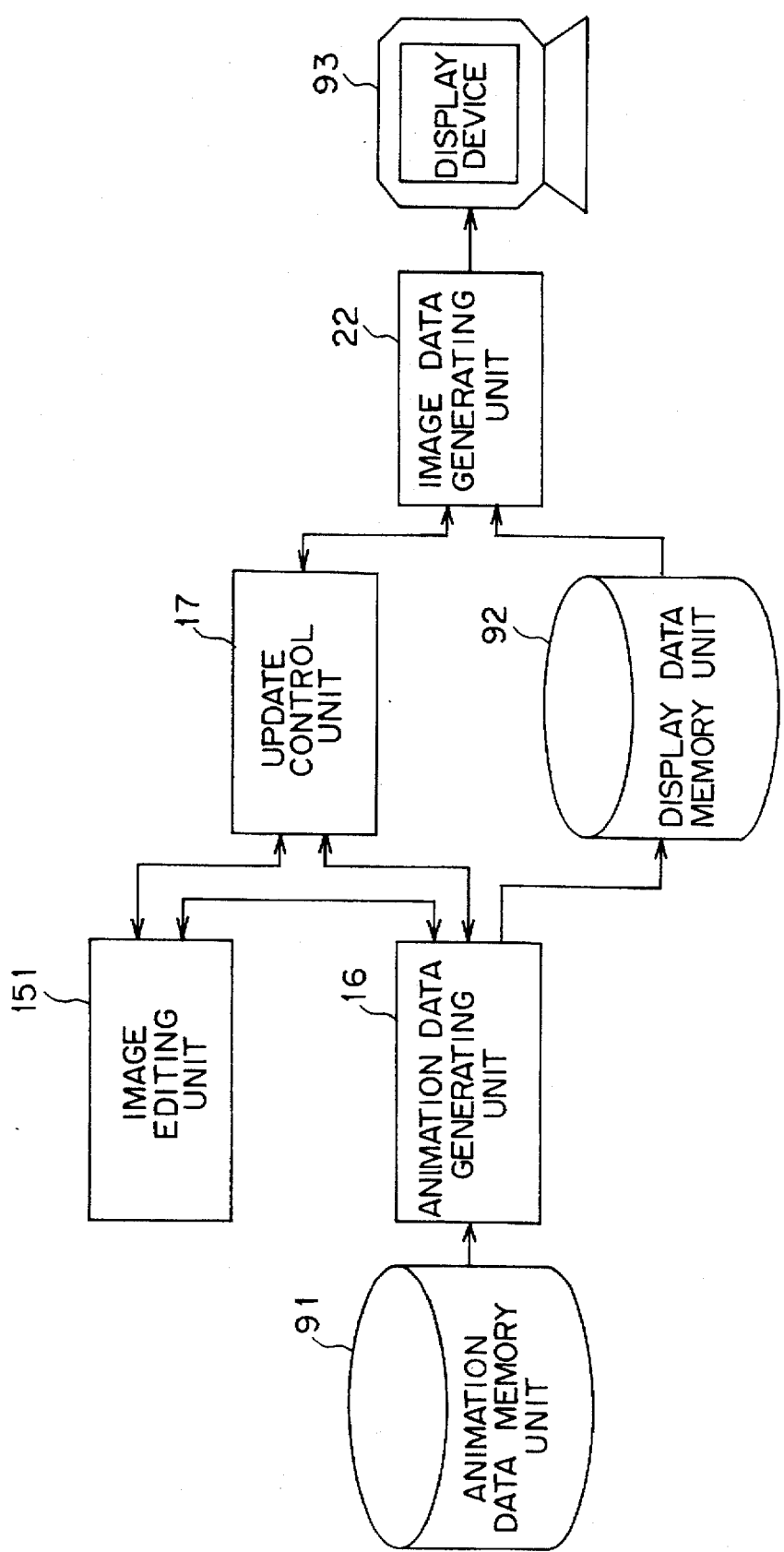
F I G. 52

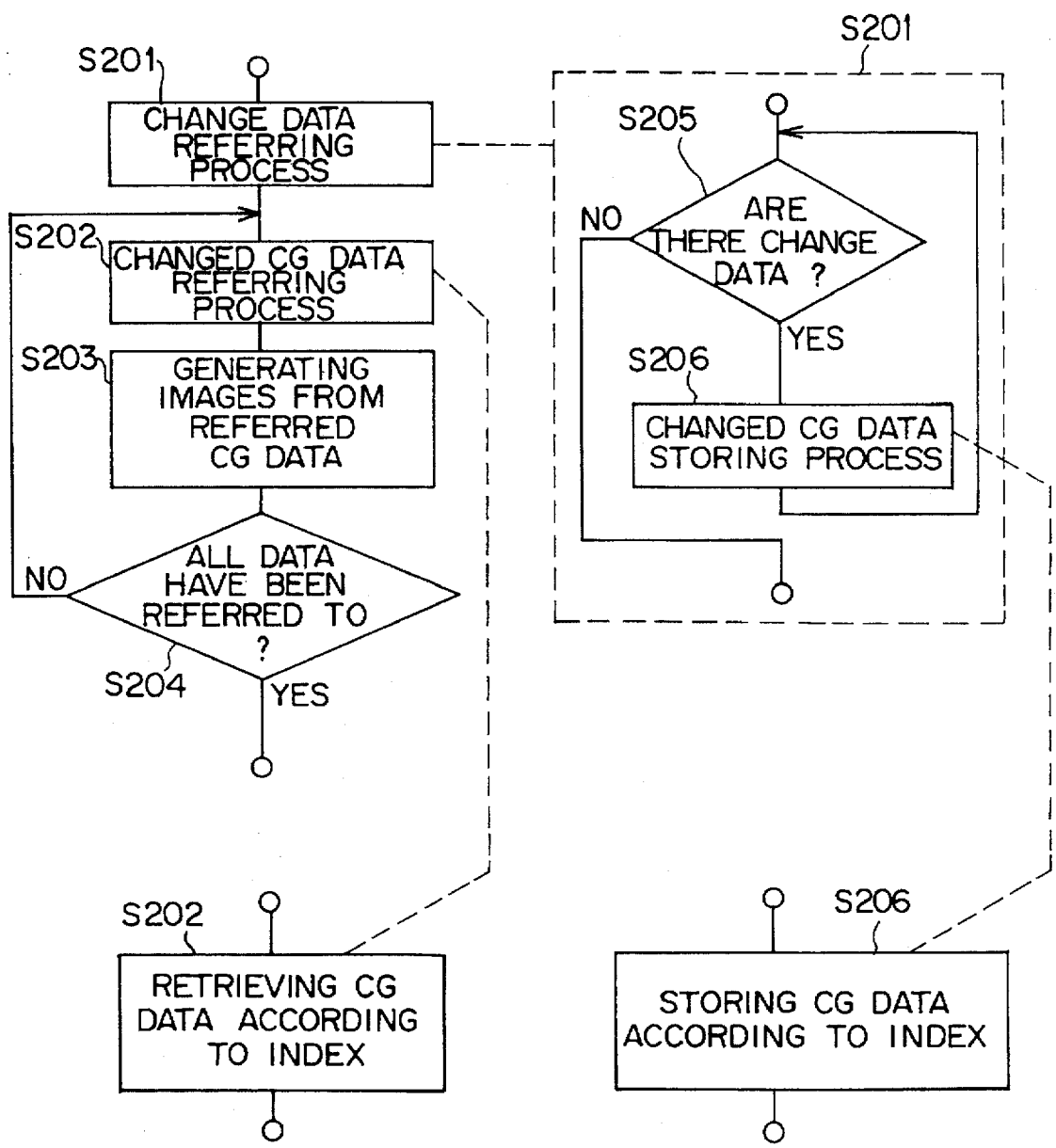
F I G. 61

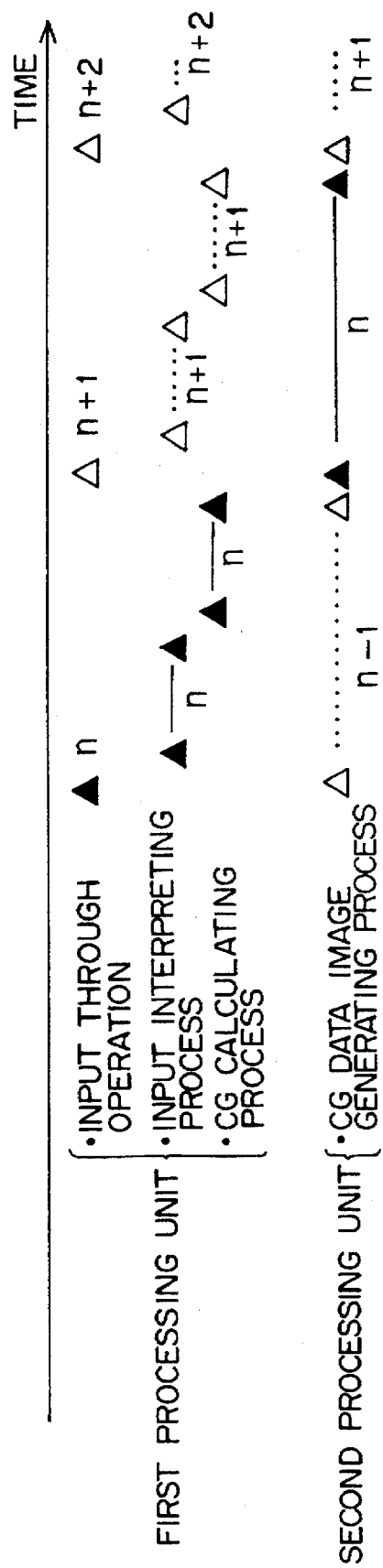
F I G. 62

```
struct {
    int key;            /*RETRIEVAL KEY*/
    struct t *child;    /*POINTER TO CHILD OBJECT*/
    struct t *broth;    /*POINTER TO YOUNGER BROTHER OBJECT*/
    struct t *paren;    /*POINTER TO PARENT OBJECT*/
    void *data;         /*POINTER TO DATA*/
} t;
```

FIG. 67

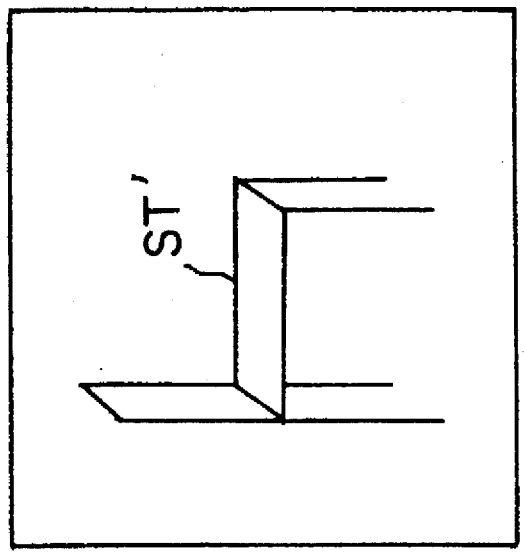
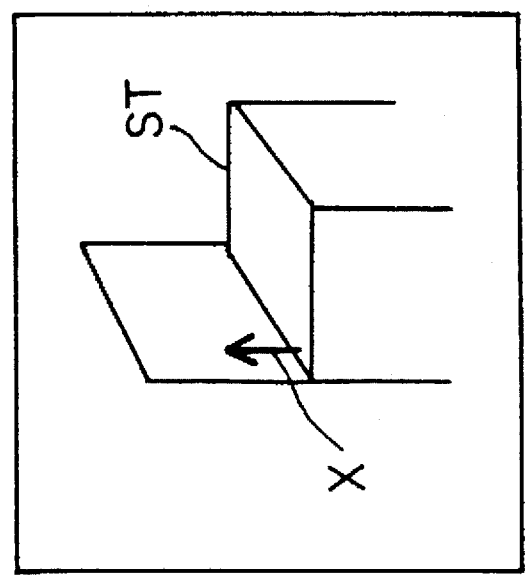
FIG. 69

| POINTER TO PARENT NODE |
|---|
| COLOR INFORMATION (NOT EXISTING IF ATTRIBUTE IS INHERITED FROM PARENT) |
| TEXTURE INFORMATION (NOT EXISTING IF ATTRIBUTE IS INHERITED FROM PARENT) |
| MATRIX INFORMATION (NOT EXISTING IF ATTRIBUTE IS INHERITED FROM PARENT) |

| NUMBER OF CHILDREN | POINTER TO CHILD NODE | POINTER TO CHILD NODE | - - - |

FIG. 78

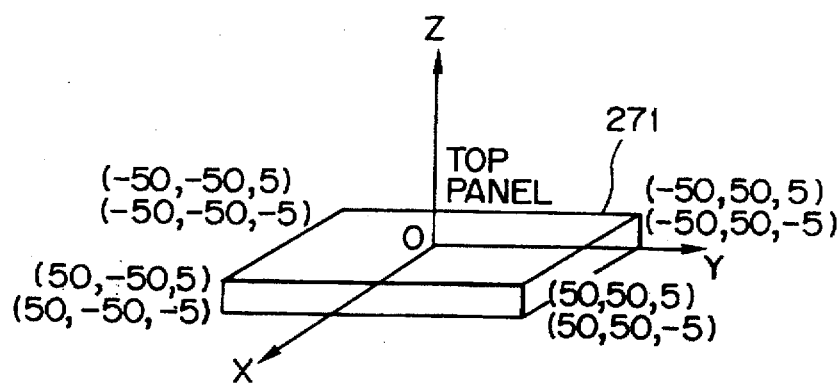
FIG. 82
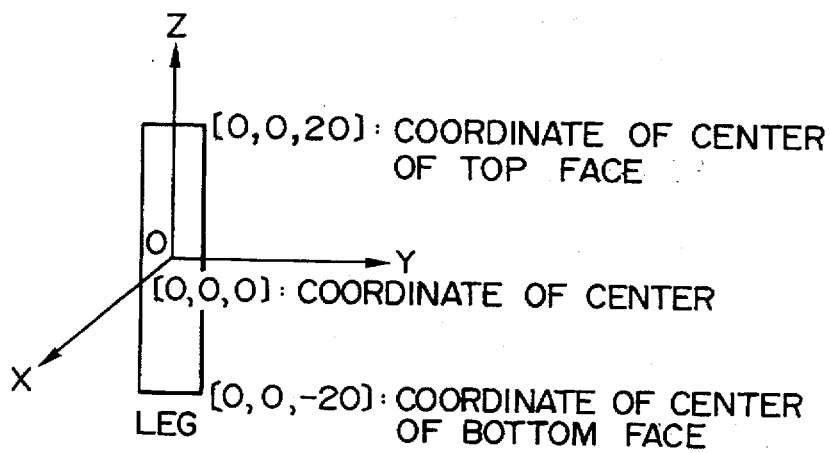
FIG. 83
$$\begin{bmatrix} 1 & 0 & 0 & 0 \\ 0 & 1 & 0 & 0 \\ 0 & 0 & 1 & 0 \\ 100 & 100 & 45 & 1 \end{bmatrix} \quad \begin{bmatrix} 1 & 0 & 0 & 0 \\ 0 & 1 & 0 & 0 \\ 0 & 0 & 1 & 0 \\ 145 & 55 & 20 & 1 \end{bmatrix}$$
WORLD TRANSFORMATION MATRIX OF TOP PANEL    WORLD TRANSFORMATION MATRIX OF LEG 272
FIG. 84

TRANSFORMATION MATRIX OF PARALLEL DISPLACEMENT OF [Tx, Ty, Tz]

$$M_P = \begin{bmatrix} 1 & 0 & 0 & 0 \\ 0 & 1 & 0 & 0 \\ 0 & 0 & 1 & 0 \\ T_x & T_y & T_z & 1 \end{bmatrix}$$

TRANSFORMATION MATRIX OF SCALE CONVERSION OF [Sx, Sy, Sz]

$$M_S = \begin{bmatrix} S_x & 0 & 0 & 0 \\ 0 & S_y & 0 & 0 \\ 0 & 0 & S_z & 0 \\ 0 & 0 & 0 & 1 \end{bmatrix}$$

TRANSFORMATION MATRIX OF ROTATION BY θ AROUND X AXIS

$$M_{RX} = \begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix}$$

TRANSFORMATION MATRIX OF ROTATION BY θ AROUND Y AXIS

$$M_{RY} = \begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix}$$

TRANSFORMATION MATRIX OF ROTATION BY θ AROUND Z AXIS

$$M_{RZ} = \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix}$$

FIG. 85

$$\begin{bmatrix} 1 & 0 & 0 & 0 \\ 0 & -1 & 0 & 0 \\ 0 & 0 & -1 & 0 \\ 45 & -45 & -25 & 1 \end{bmatrix} \begin{bmatrix} 1 & 0 & 0 & 0 \\ 0 & 1 & 0 & 0 \\ 0 & 0 & -1 & 0 \\ 45 & 45 & -25 & 1 \end{bmatrix} \begin{bmatrix} 1 & 0 & 0 & 0 \\ 0 & -1 & 0 & 0 \\ 0 & 0 & -1 & 0 \\ -45 & -45 & -25 & 1 \end{bmatrix} \begin{bmatrix} 1 & 0 & 0 & 0 \\ 0 & 1 & 0 & 0 \\ 0 & 0 & -1 & 0 \\ -45 & 45 & -25 & 1 \end{bmatrix}$$

RELATIVE TRANSFORMATION MATRIX OF LEG 272

RELATIVE TRANSFORMATION MATRIX OF LEG 273

RELATIVE TRANSFORMATION MATRIX OF LEG 274

RELATIVE TRANSFORMATION MATRIX LEG OF 275

FIG. 86

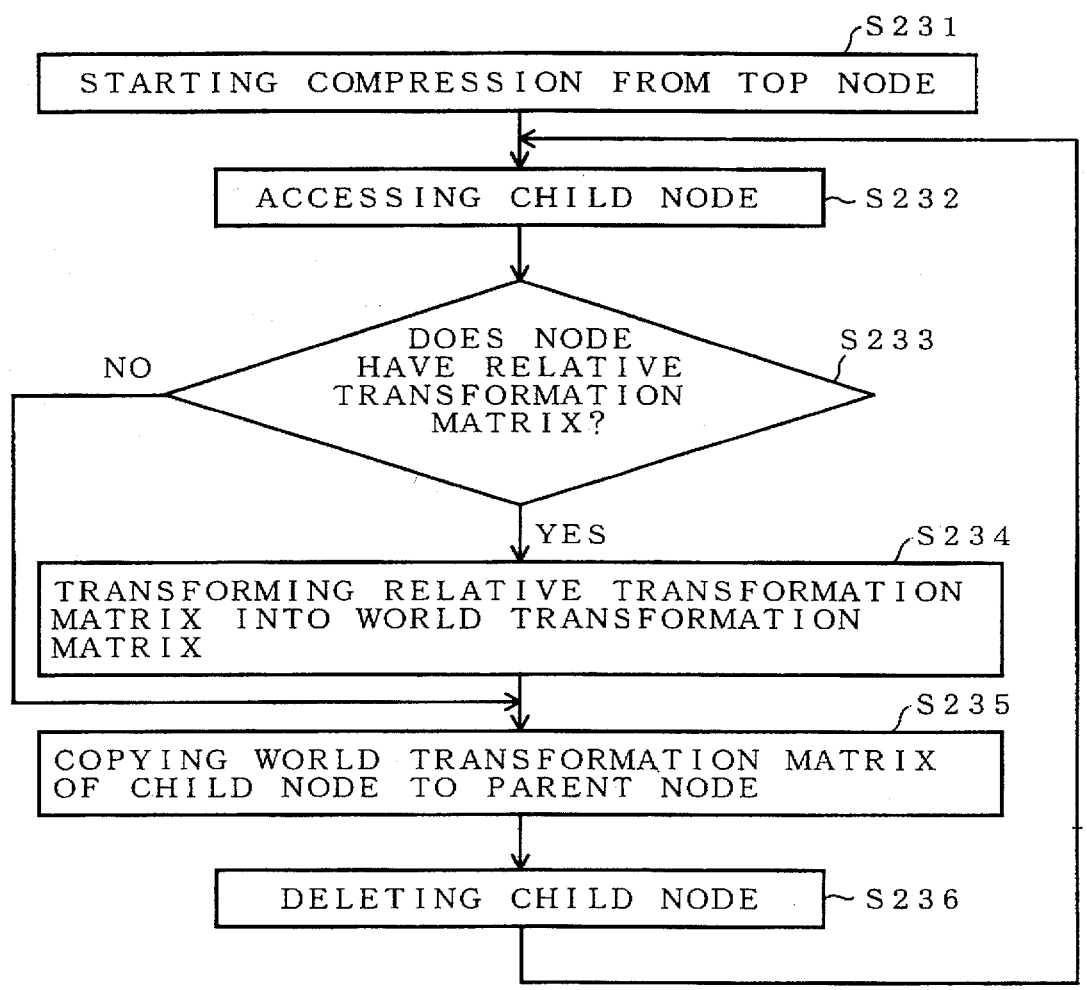
F I G. 9 1

COMPUTER GRAPHICS DATA DISPLAY DEVICE AND METHOD BASED ON A HIGH-SPEED GENERATION OF A CHANGED IMAGE

BACKGROUND OF THE INVENTION

1. Field of the Invention

The present invention relates to a computer graphics device for displaying graphic data (hereinafter referred to as computer graphics data or CG data) through a computer, and more specifically to a CG data display device for generating and displaying a dot image.

2. Description of the Related Art

Recently, CG devices for generating and processing images through computer systems have been widely used in many fields of applications in industry. Among these devices, a CG dynamic image display system should present a high-speed performance to keep up with the movement of an object and should display generated images with high reality.

For example, the improvement in the CG animation technologies has increased the applications of CG simulations for easily presenting various virtual experiences. Increasing especially are "walk-through" applications of CG simulations in which a user can freely walk through a virtual world and feel as if he or she were actually experiencing a specific world.

However, with a device for realizing such CG simulations, a user often passes through a wall or feels unusual in moving around, and therefore it is impossible to feel freely moving around. Thus required is a new technology of realizing a moving in a virtual world with high reality as if it were a real world.

With the conventional CG walk-through technologies, a user walks through a three-dimensional world regardless of the position of objects around a user because the contact between a user's viewpoint and an object in a virtual world is ignored in calculation for a shift of sight.

As a result, the user passes through a wall which cannot be actually passed, or is dug in a sidewalk. Thus, the user often gets lost.

As described above, since the conventional method ignores the contact between a user's viewpoint and an object in a virtual world, the virtual movement is far from a realistic movement. Especially, it is very difficult for general people who try a CG walk-through simulation to successfully move around as they wish. Furthermore, the conventional method offers the following problems.

Apart from a contact between a viewpoint and an object, a user cannot represent using a simple system the difference in interference between two hard objects, between two soft objects, and between a hard and a soft object in a clash of two objects.

Additionally, the user cannot move around with his or her viewpoint maintaining at a constant level in a virtual world. For example, when the user goes upstairs, his or her viewpoint smoothly rises obliquely upward. However, in a virtual CG world, the user either cannot go upstairs or repeats for each step a parallel or vertical movement, resulting in an unsmooth movement (shift of sight).

Furthermore, a common user cannot easily edit the virtual world for lack of a unit for easily defining the reaction and movement of an object such that the object starts any action in response to a clash of objects or at an external instruction, and for lack of a unit for easily grasping the definition.

Recently, a CG accelerator in a workstation has made remarkable progress toward a higher speed and performance. Conspicuously realized is a CG system capable of displaying at a high speed a photo-realistic image. Thus, the time correspondence between a dynamic CG image and a real world can be successfully realized. However, the present technologies have just reached a logical time description, and have not developed a method for general purpose of representing CG images in three dimensions or four dimensions including time in a real-time mode. It is because the CG image display time depends on the complexity in form and cannot be standardized. To solve these problems and integrate the processes of multimedia, it is necessary to fix the time correspondence between a three-dimensional CG image and a real world.

Conventionally, a dynamic CG image has been generated and displayed in a sequential process on completion of the calculation for generation of an image for each frame. Therefore, the generation and display of a frame take a calculation/display time for the generation of an image. Thus, the frame interval between the display time $t_{n-1}$ of the (n−1)th frame and the display time $t_n$ of the n-th frame is considerably long.

In the conventional method, the change of dynamic CG images in time is described only logically, and no system is provided to keep correspondence between a displayed image and the logical description. Therefore, the logically described changes in time cannot be precisely regenerated and displayed. Practically, the time taken for a display process depends on each frame to be displayed because frames are different from one another in image complexity represented by the number of polygons, textures, etc. Furthermore, the time taken for calculation of changes of three-dimensional images also depends on the number of changing objects and the complexity in the calculation. Accordingly, the time taken for the calculation and display of a frame depends on each frame.

However, in the conventional method, frames to be displayed at given intervals in a logically described CG world have been sequentially displayed on completion of respective processes. Therefore, the time flows constantly for respective frames in the CG world, but the frames are displayed at different intervals, thereby failing in representing the actual time flow. Although the frames should be displayed at constant intervals according to the actual time flow in the CG world, the frames are actually displayed at different intervals, the time being extended or reduced in the world displayed on the screen, because the time taken for calculation or display of the frames depends on the complexity of each image. If the frames should be set such that they can be displayed at constant intervals without a deviation from actual time, they must be set at intervals of the maximum value of the time taken for the calculation and display of the frames. Thus, frames are set at undesirably long intervals and generate a problem that resultant dynamic images cannot be smoothly displayed at all.

As described above, since images are sequentially generated through necessary calculation and then displayed on completion of the calculation according to the conventional method, image frames are displayed at long intervals. Additionally, since there has been no system for keeping correspondence between the time in the world on the screen and the actual time, the time flow cannot be regenerated exactly.

Recently, computer animation is very popular in various fields of applications such as architectures, commercial films, educational programs, designing skills, etc. In the computer animation, the time taken for the generation of animation can be considerably reduced by calculating and processing the movement and transformation of an enormous number of objects using a computer system. Recently, in the computer animation, physical rules have been used to display animation images to represent visually natural movement of objects.

If a long time is taken for calculation to generate animation requiring a large amount of calculation processes for a large number of objects, then visually unrealistic animation images are generated. Accordingly, even if large amount of calculation is required for a large number of objects, it is necessary to quickly perform the calculation and display so that natural and smooth animation images can be realized.

Generally, an animation generating device using computer graphics fundamentally comprises an animation data generating unit for calculating the movement and transformation of objects and an image data generating unit for generating image data (two-dimensional data) from computed geometric data of objects (three-dimensional data of a form, position, etc.). Using these units, the animation generating device repeats computing the movement and transformation of objects and generating images to produce animation images. If the animation data generating unit and the image data generating unit perform calculating and generating processes at a high speed, smooth animation images can be generated in real time.

Conventionally, a large amount of processes have been performed at a high speed in the image data generating unit through high-performance hardware (accelerator) and firmware. On the other hand, since the animation data generating unit is required to generate animation images with more realistic movements and complicated transformations out of a large amount of data, its load is undesirably large and a long time is taken for the generation of data for a single frame.

However, the conventional animation generating device needs a long time for generating data calculating the movement and transformation of the whole objects, and then generates an image.

Therefore, if it takes the animation data generating unit a longer time to calculate the movement and transformation of objects than it takes the image data generating unit to display generated images, the images are displayed at longer intervals. As a result, unsmooth and unrealistic animation images appear on a screen. Thus, a higher speed image data generating unit has not generated animation images in real time.

A flight simulator and a drive simulator are required not only to display a static image predetermined by a computer but also to display animation images, and a device like a scene simulator is required to precisely draw a real scene.

These devices display the form of an object to be displayed using a large amount of CG data. To represent a change of viewpoints and natural movements of objects appearing in an image, a large amount of CG data should be changed at very short intervals.

Conventionally, a CG data display device has performed the following process using a single central processing unit (CPU).

The CG data display device stores and updates CG data to be displayed in a data management process. Then, it reads all CG data containing those changed through an image generating process and generates images. It finally displays the images of CG data after sequentially repeating the update of the CG data and the generation of images.

The conventional CG data display device generates and displays images in an image generating process after updating data in a data management process as described above. Such CG data image generation is a time-consuming process, and images are not generated in good time when a large amount of CG data must be updated. Therefore, resultant unrealistic images should be used with a part of CG data regularly omitted. A scene simulator is also required to display minute representation of objects. Therefore, for example, a long time is taken before displaying a minute object image when a viewpoint is changed.

That is, when a large amount of CG data of dynamic images are changed at very short intervals, an image generating process cannot be completed in good time, thereby generating unrealistic animation images. Moreover, in generating static images, an operator has to kill time while the images are being generated.

As computer graphics make striking progress and are used in various fields in industry, the development of more easily operated user interfaces are earnestly demanded. One of the demanded technologies is a three-dimensional object display method of generating a three-dimensional model, editing the model (modeling), and displaying the object in three dimensions. The "displaying the object in three dimensions" indicates a display of a three-dimensional world on a screen.

In the development of a user interface, managing parts objects in a hierarchical structure and constructing data such that each data inherits the attribute of its parent effectively reduce the number of specified entries and are used in many modeling systems.

In this method, however, when a modeled three-dimensional form is displayed, inheriting the attribute of a parent requires all hierarchical tree structure to be searched, thereby consuming much time in a displaying process.

The amount of search time affects the displaying process, and depends on the depth of a hierarchy of an object data structure (that is, the number of steps of the hierarchy) and the number of objects in the object data structure.

FIG. 1 shows the configuration of the important portion of a common three-dimensional object display device for processing computer graphics. The device generates and edits a three-dimensional image, and displays it as a three-dimensional image at a certain point. The device shown in FIG. 1 comprises an object generating and editing unit 1, an editing-formatted hierarchical object data structure memory unit 2, an object displaying process unit 3, and a display device 4.

A user (that is, a designer) instructs the object generating and editing unit 1 to model data, and simultaneously instructs the object display processing unit 3 to display data. Therefore, the object generating and editing unit 1 and the object display processing unit 3 execute their processes while accessing the same data structure. During this modeling process, the internal data structure is hierarchically arranged in object units, and the data are stored in the hierarchical object data structure storing unit 2.

FIG. 2 is an example of a hierarchical object data structure. The object data are hierarchically arranged in object units (that is, for each node) as shown in FIG. 2 in the modeling process.

For example, in modeling a "room", an object is generated as a parent and root representing a room. To this parent object, connected are child objects a "chair", a "desk", and a "wall". The "room" has its attributes "color A" and "transformation matrix M1". The "desk" has its attributes "color C", "transformation matrix M3", and "form α". The "wall" has its attributes "color D", "transformation matrix M4", and "form β". The "chair" has its attributes "color B" and "transformation matrix M2". The child objects of the "chair" are "legs", a "bottom panel", and a "back panel". The "legs" has its attributes "color E" and "transformation matrix M5". The "bottom panel" has its attributes "transformation matrix M6" and "form γ". The "back panel" has its attributes "transformation matrix M7" and "form δ". Furthermore, the "legs" has four child objects "foot", each having its own attribute "form ε", "form ζ", "form η", or "form κ" and are arranged hierarchically. Each object can be assigned an attribute indicating texture instead of color, if required.

If a "foot" is composed of two parts, then it is a parent object to the two parts having attitudes of respective forms. In this case, a modeling operation can be performed without specifying their foot color or transformation matrix because the child objects inherit the attributes of their parent objects.

If the color of the entire legs or the texture of the chair should be changed, only the color attribute E or the texture attribute of the chair object has to be changed to simultaneously change the entire legs including four respective feet because each foot inherits the attributes of its parent objects legs. Inheriting attributes enables a user interface to be provided and modeled without redundant entries specified by a user.

When data are displayed on the display device 4, the object display processing unit 3 searches for and displays each object in a hierarchical object data structure while taking the attributes of the parent object into consideration.

However, to make such a hierarchical modeling data structure more effective, it is necessary to divide the parts into separate groups or have the attributes inherited more frequently. Necessarily increased are the number of objects and the depth of hierarchy. Furthermore, an enormous number of displaying operations should be performed to allow a user to issue a display instruction without considering the number of objects and the depth of the hierarchical structure.

As shown in FIG. 1, since both the object generating/editing process 1 and the object displaying process unit 3 access the object data in the hierarchical object data structure memory unit 2 in performing a modeling process and a displaying process, the hierarchical object data structure which is effectively used in a modeling operation is used as is in a display process. Therefore, with the increasing number of objects, an enormous number of object searching processes are carried out, thereby taking much process time to display data.

SUMMARY OF THE INVENTION

An important object of the present invention is to provide a CG data display device for displaying realistic and lifelike dynamic image, and is explained in detail as listed below.

First, simplified is an editing process in which a virtual CG world is defined so that a simulation of realistic and lifelike movements and changes of states can be easily realized at a high speed through a smaller amount of calculation processes.

Second, data are displayed at short frame intervals with display time and actual time corresponding to each other without affecting a real time displaying process of dynamic CG images.

Third, a smooth and realistic animation is realized by an increased number of display times at shorter image display intervals and at a high speed display.

Fourth, images are generated at a high speed when CG data are updated so that data can be displayed realistically.

Fifth, a display process is performed at a high speed by decreasing the time taken for an object searching process associated with the display.

The present invention relates to the CG data display device and method for displaying CG data. The CG data display device according to the present invention comprises a management unit for managing CG data, and a generating unit for generating image data from the CG data output by the management unit and displaying the generated data. The image data are generated by the generating unit and displayed as static or dynamic images on a screen.

The attributes of an object managed by the management unit includes an interference attribute indicating a movement generated through an interference by a contact, clash, etc. with another object, and another reaction attribute indicating a reaction generated by an interference.

The management unit stores a hierarchical object data structure in an editing form, controls the number of objects simultaneously calculated, and calculates the form, position, etc. of an object so that CG data can be updated. At this time, the change in state of an object is calculated according to the attributes indicating the interference or the reaction between objects to be displayed. Then, output are the CG data obtained by calculation, or are change data minimal for the update of the CG data.

The management unit predicts the time taken for the calculation of data in the management unit and for the generation of image data in the generating unit to control the time relating to the data calculation and the image data generation.

The generating unit stores the hierarchical object data structure in an editing form, generates image data and outputs them to a display unit upon receipt of updated CG data from the management unit. If the generating unit receives from the management unit the change data for use in updating the CG data, it updates the CG data according to the change data and generates image data.

Since the management unit and the generating unit are independent of each other, the management unit performs a calculation process on a frame, and the generating unit concurrently performs a displaying process on another frame in a pipeline system, thereby speeding up the entire process.

Introducing an interference attribute and a reaction attribute diversifies the movement of an object in a virtual world and realizes a realistic shift of a viewpoint. Furthermore, the calculation is simplified and the time taken for a calculation process can be considerably reduced.

The management unit predicts a display time of a corresponding frame from the time taken for a calculation process and a displaying process, and obtains through calculation the CG data at the predicted display time. Upon completion of the calculation process, the display time of the frame is reestimated. Then, it is determined whether or not it can be displayed at the initially predicted time.

If a reestimated display time is earlier than the predicted time, then the generating unit extends the display of the frame and displays it at the predicted time. If the reestimated display time is much later than the predicted time, then the frame is not displayed.

Through the time control as described above, each frame of dynamic images can be displayed at a time corresponding to the actual time for the frame without affecting the realistic representation in the virtual world.

The management unit does not simultaneously calculate the movements of all objects in a screen, but calculates them separately and transmits the results to the generating unit. Each time the generating unit receives a calculation result, it converts the result into image data for display. Thus, the image data are displayed at short intervals, thereby displaying smooth dynamic images.

If the minimal CG data indicating the type of change are transmitted from the management unit to the generating unit as change data, then the transmission cost can be considerably reduced.

The generating unit stores tree-structured object data in a compressed format in which data are stored in a smaller number of layers and as smaller number of objects than those stored in the management unit, thereby shortening the search time for display. Thus, an attribute-inheritable object can be effectively edited and a displaying process can be performed at a high speed.

According to the CG data display device and method of the present invention, image data are updated and displayed at a high speed to generate precise and realistic dynamic images.

BRIEF DESCRIPTION OF THE DRAWINGS

FIG. 19 is the process flowchart according to the first embodiment of the present invention;

FIG. 52 shows an example of the configuration of another configuration of the important portion of the third embodiment;

FIG. 61 is the detailed flowchart of the CG data image generating process;

FIG. 62 shows the time relationship between the process performed by the first processing unit and that performed by the second processing unit;

FIG. 67 shows the data structure according to the structure of the C language;

FIG. 69 shows the shift of the viewpoint;

FIG. 78 shows the contents of each node of the tree structure;

FIG. 82 shows the modeling coordinate system of the top panel;

FIG. 83 shows the modeling coordinate system of the foot;

FIG. 84 shows the world transformation matrix of the top panel and the world transformation matrix of the foot;

FIG. 85 shows the transformation matrix in the three-dimensional graphics;

FIG. 86 shows the relative transformation matrix of the foot;

FIG. 91 is the flowchart of the compressing process of the hierarchical object data structure having matrix information as an attribute.

DESCRIPTION OF THE PREFERRED EMBODIMENTS

The preferred embodiments of the present invention are explained below by referring to the attached drawings.

Figure 3:
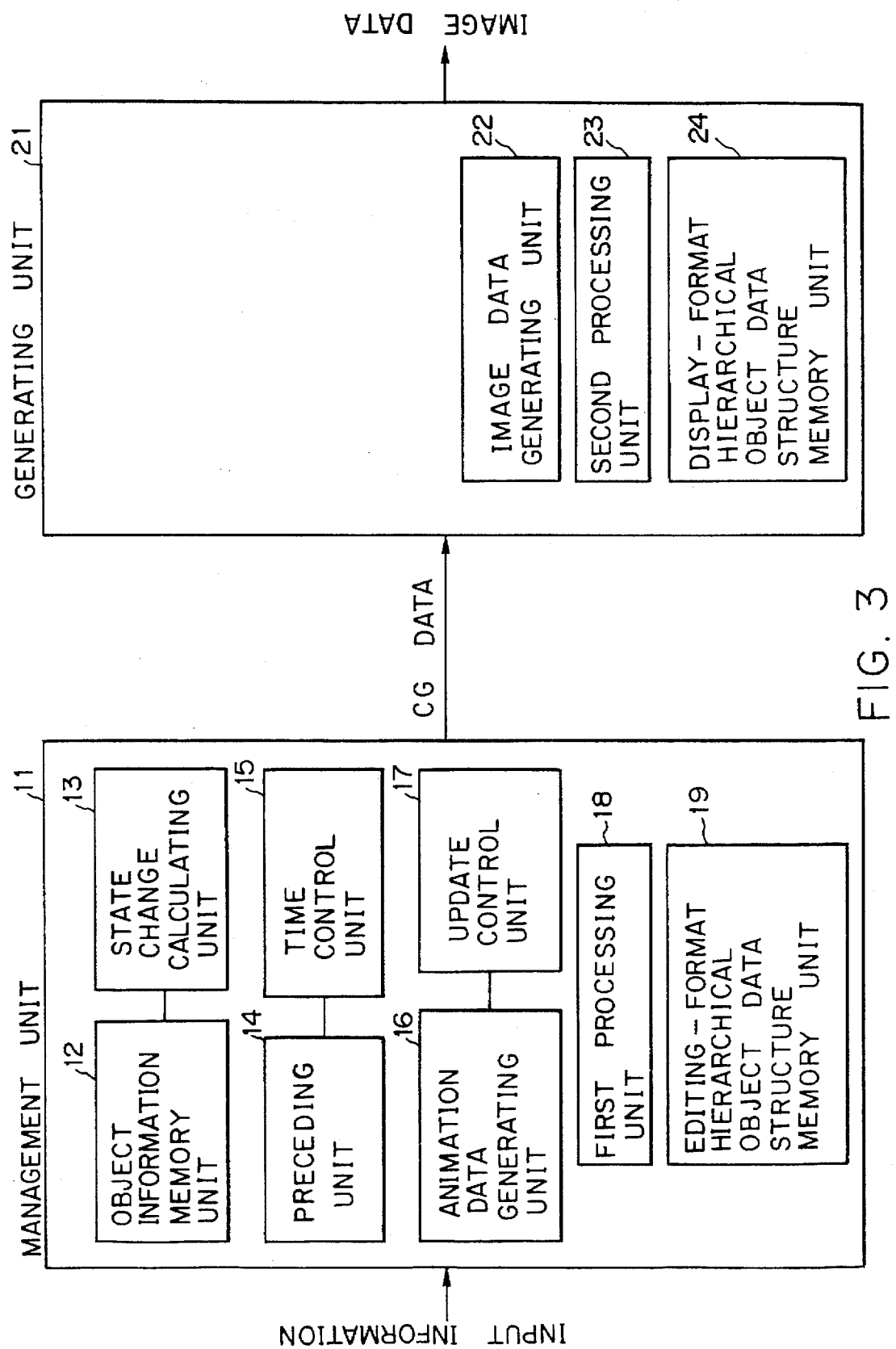
FIG. 3 shows the configuration of the computer graphics data display device according to the embodiment of the present invention.

FIG. 3 shows a configuration of the CG data display device according to the embodiment of the present invention. The CG data display device shown in FIG. 3 comprises a management unit 11 for receiving CG data and performing calculation according to the information input externally and a generating unit 21 for generating image data from the CG data output by the management unit 11 and transmitting them to a display unit not shown in FIG. 3.

The display unit displays on a screen the image data received from the generating unit 21.

The management unit 11 comprises an object information memory unit 12, a state change calculating unit 13, a predicting unit 14, a time control unit 15, an animation data generating unit 16, an update control unit 17, a first processing unit 18, and an editing-format hierarchical object data structure memory unit 19.

The generating unit 21 comprises an image data generating unit 22, a second processing 23, and a display-format hierarchical object data structure memory unit 24.

The object information memory unit 12 stores attributes indicating interference and reaction between objects to be displayed. The state change calculating unit 13 calculates a state change of objects according to the attributes of the objects stored in the object information memory unit 12.

The predicting unit 14 predicts time taken for data calculation in management unit 11 and time taken for generation of image data in the generating unit 21. The time control unit 15 performs time control on the data calculation and the image data generation according to the prediction by the predicting unit 14.

The animation data generating unit 16 calculates a form and a position of an object to update CG data. The update control unit 17 controls the number of objects generated at one time by the animation data generating unit 16.

The first processing unit 18 manages CG data. When the CG data are subject to a change, the CG data associated with the change are output as change data. The second processing unit 23 stores the CG data, and upon receipt of the change data, it updates the CG data based on the change data, and generates image data.

The editing-format hierarchical object data structure memory unit 19 stores a hierarchical object data structure in an editorial form. The display-format hierarchical object data structure memory unit 24 stores the hierarchical object data structure in a display form.

The object information memory unit 12 and the state change calculating unit 13 are explained in association with the first embodiment of the present invention. The predicting unit 14 and the time control unit 15 are explained in association with the second embodiment. In association with the third embodiment, the animation data generating unit 16 and the update control unit 17 are explained. In association with the fourth embodiment, the first processing unit 18 and the second processing unit 23 are explained. Furthermore in association with the fifth embodiment, explained are the editing-format hierarchical object data structure memory unit 19 and the display-format hierarchical object data structure memory unit 24.

Figure 4:
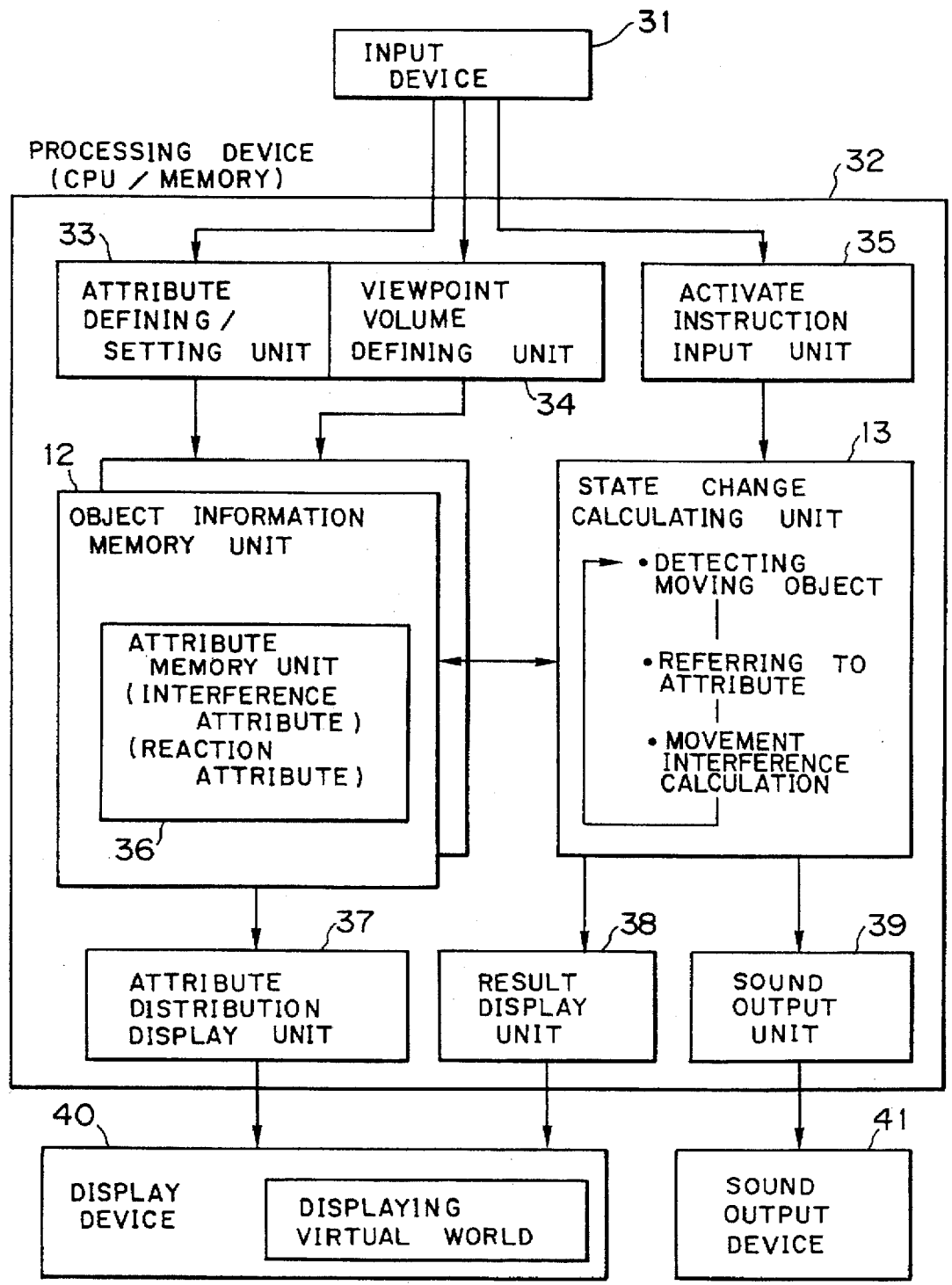
FIG. 4 is the block diagram showing the configuration of the first embodiment.

FIG. 4 is a block diagram showing an example of a configuration according to the first embodiment of the present invention.

In FIG. 4, an input device 31 refers to a key board, a pointing device, etc. A processing device 32 comprises a CPU, a memory, etc. An attribute defining/setting unit 33 defines and sets an attribute designating a condition of a state change of an object in a virtual world. A viewpoint volume defining unit 34 defines a volume of a viewpoint in the virtual world. An activate instruction input unit 35 receives an instruction for activating an object from the input device 31.

The object information memory unit 12 stores form data of an object, position information and other physical information for each object in the virtual world. According to the first embodiment, the object information memory unit 12 comprises an attribute memory unit 36 for storing an interference attribute or a reaction attribute of an object.

The state change calculating unit 13 calculates a state change of an object according to the attribute of an associated object stored in an attribute memory unit 36 as a reaction of the movement of the object in the virtual world or in response to an external activate instruction. An attribute distribution display unit 37 displays the attribute information of each object stored in the attribute memory unit 36. A result display unit 38 displays a result of the calculation performed by the state change calculating unit 13. A sound output unit 39 outputs a sound or a voice when a sound output is defined as a reaction attribute of an object.

A display device 40 is a graphic display device for displaying the virtual world. A sound output device 41 is an output device comprising a speech synthesizing device or a speaker.

The attribute defining/setting unit 33 defines an attribute relating to the interference or reaction between the objects in the virtual world and sends the definition to the attribute memory unit 36. The state change calculating unit 13 calculates a position of movement of an object for each time step, and obtains an interference result through an attribute of the object stored in the attribute memory unit 36 if the object interferes with another object. The result display unit 38 displays a result calculated by the state change calculating unit 13 on the display device 40.

An interference attribute and a reaction attribute are typical attributes set by the attribute defining/setting unit 33. The interference attribute indicates the interaction between a first object in the virtual world and a second object in contact with the first object. A state change calculating unit 13 calculates the movement of an object movable in each time step. If it is determined that an object has moved and come in contact with another object (interference), the state change calculating unit 13 refers to the interference attribute set in the attribute memory unit 36 and calculates a result after the interference.

If a first object interferes with a second object, then the attribute defining/setting unit 33 defines an interference attribute indicating the restrictions as the constraint condition on the movement of the second object. For example, if an attribute of a "wall" is defined, then another object (including a user's viewpoint) that may interfere the wall can be included in a movement interference calculation such that the interfering object cannot pass through an object assigned the wall attribute.

Upon receipt of an input from the input device 31, the viewpoint volume defining unit 34 defines a size and a form of a volume of a viewpoint around the user's viewpoint. The viewpoint volume is regarded as space surrounding the position of user's eyes, and processed in a movement interference calculation. The state change calculating unit 13 allows the user's viewpoint to move around at a constant height in a virtual world by calculating the movement of the viewpoint based on the correlation between the viewpoint volume and the attribute of another object.

The attribute defining/setting unit 33 defines and sets an attribute indicating an average slope angle which is a constraint condition set when a viewpoint or a specific object passes over an object having an interference restriction attribute of, for example, steps. If the attribute is defined, the state change calculating unit 13 calculates based on the average slope angle the movement of the viewpoint or the specific object moving over the object assigned the attribute.

The attribute defining/setting unit 33 also defines and sets an attribute, using a restriction at the time of an interference as a contact force parameter function, indicating restriction information depending on the contact force generated by an interference. The state change calculating unit 13 calculates not only the existence of an interference but also the contact force generated by the interference so that an attribute of, for example, a paper partition, which indicates no influence if a small contact force is given but is broken by a large contact force, can be realized.

Furthermore, the attribute defining/setting unit 33 defines and sets as a reaction attribute a reaction movement of an object having an interference as an activation switch. The reaction attribute determines the moment or the method of a state change of an object in a movement interference calculation on the object performed by the state change calculating unit 13.

The attribute defining/setting unit 33 also defines and sets a reaction attribute indicating a state change of an object at an instruction from the input device 31 so as to enable a reaction attribute defined and set for the object to be activated on an occasion other than an interference. At an activate instruction from the activate instruction input unit 35, the state change calculating unit 13 checks the reaction attribute of the object, and changes the state of the object in accordance with the reaction attribute.

Furthermore, the attribute defining/setting unit 33 defines and sets as one of reaction attributes a sound output attribute indicating an output of a specified sound or voice. When an object having a sound output attribute comes in contact with another object, or when an activate instruction is issued to the object having the sound output attribute, the sound output unit 39 outputs a specified sound or voice through the sound output device 41.

The attribute distribution display unit 37 refers to the attribute memory unit 36 and displays the information about the attribute defined and set for an object in the virtual world with the object in the virtual world.

The present invention can speed up a movement interference calculation of an object and realize the feeling of a realistic movement in a virtual world by introducing the concept of an interference attribute and a reaction attribute to an object in a virtual world. That is, post-interference states of objects can be easily calculated and realized by referring to, for example, a predetermined interference attribute. Therefore, a viewpoint or a moving object can be prevented from being buried in a wall or other objects. Furthermore, the movement of a user's viewpoint can be realistically realized in a walk-through simulation, and a common user not familiar with CG can smoothly move in the virtual world.

According to the present invention, a restriction can be defined and set on an object as an interference attribute when objects interferes with each other in a virtual world. For example, if an object is assigned an attribute of a "wall" and if it is also defined that a user's viewpoint, that is, an interfering object, cannot pass through the object assigned the attribute of a wall, then the user's viewpoint determines a contact with the wall at a walk-through simulation. The viewpoint does not pass into the wall when it comes in contact with the wall, but it moves along the wall, thereby solving the problem that the viewpoint passes through the wall and gets lost.

Especially, the viewpoint volume defining unit 34 defines the size, form, etc. for a user's viewpoint volume and performs an interference calculation using size, form, etc. of the viewpoint so that the user can walk around at a constant height or a user's height on an object having an attribute of a "floor" as an interference attribute. Although, a user walks through a fence according to the conventional technologies, the present invention enables the fence to be set such that a user cannot pass through it by defining the user's viewpoint volume. Thus, a more realistic viewpoint movement can be realized.

For example, an attribute of "steps" can be defined as an interference restriction attribute, and an average slope angle can be defined and set so that a user goes smoothly up and down on them at a specified slope angle. Although a user could not go up or down the steps or has unrealistically walked up and down the steps, the present invention easily realizes a realistic walking up and down the steps.

Furthermore, a restriction at the time of an interference can be defined and set as a parameter function of a contact force, and the contact force (physical quantity of, for example, a collision force product) between objects associated with the interference is calculated so that an attribute of a "paper partition", which is not affected at a small contact force but is broken at a large contact force, can be defined.

As a result of an interference, not only a constraint condition on the movement of an interfering object associated with an interference but also the reaction movement with the interference as a trigger of an activate switch is defined and set as one of attributes. Thus, defined is an "object movable upon interference" as a type of attribute. For example, realized are an attribute of an "automatic door" to be moved by a switch of another object's interference and an attribute of a "variation" which starts a varying animation operation such as a free form deformation (FFD). Therefore, a realistic simulation world can be easily realized with a larger number of variations.

A reaction attribute assigned to an object can also be defined for a moment other than the time of an interference. For example, defined is an object reacting as being triggered by a switch at an external activate instruction, for example, a user's mouse click on a screen. Thus, an attribute of an "automatic door" to be started only by an interference can be easily extended to a door opened by a user's click depending on the definition of a switch. Therefore, a very realistic and fantastic walk-through simulation can be easily realized.

Furthermore, a sound as well as a movement can be set as a reaction attribute. The attribute defining/setting unit 33 defines a sound output attribute as a reaction attribute, and edits as to what kind of sound is used. The state change calculating unit 13 displays an image movable according to an activated reaction attribute, and activates the sound output unit 39 if a sound output attribute is specified, outputs the sound, and displays dynamic images.

Thus, an attribute of a "sound" is realized as a reaction with a switch, and can be defined as a kind of attribute in an increasing number of multimedia systems in recent simulation fields.

The attribute distribution display unit 37 displays a reaction attribute defined and set for an object and a switch activated by the attribute so as to practically indicate what is set in a world, for example, a virtual world in which a number of objects exist. Thus solved is the problem that a common user sets a switch for a wrong object or forgets as to which object an activation switch is assigned.

Figure 5:
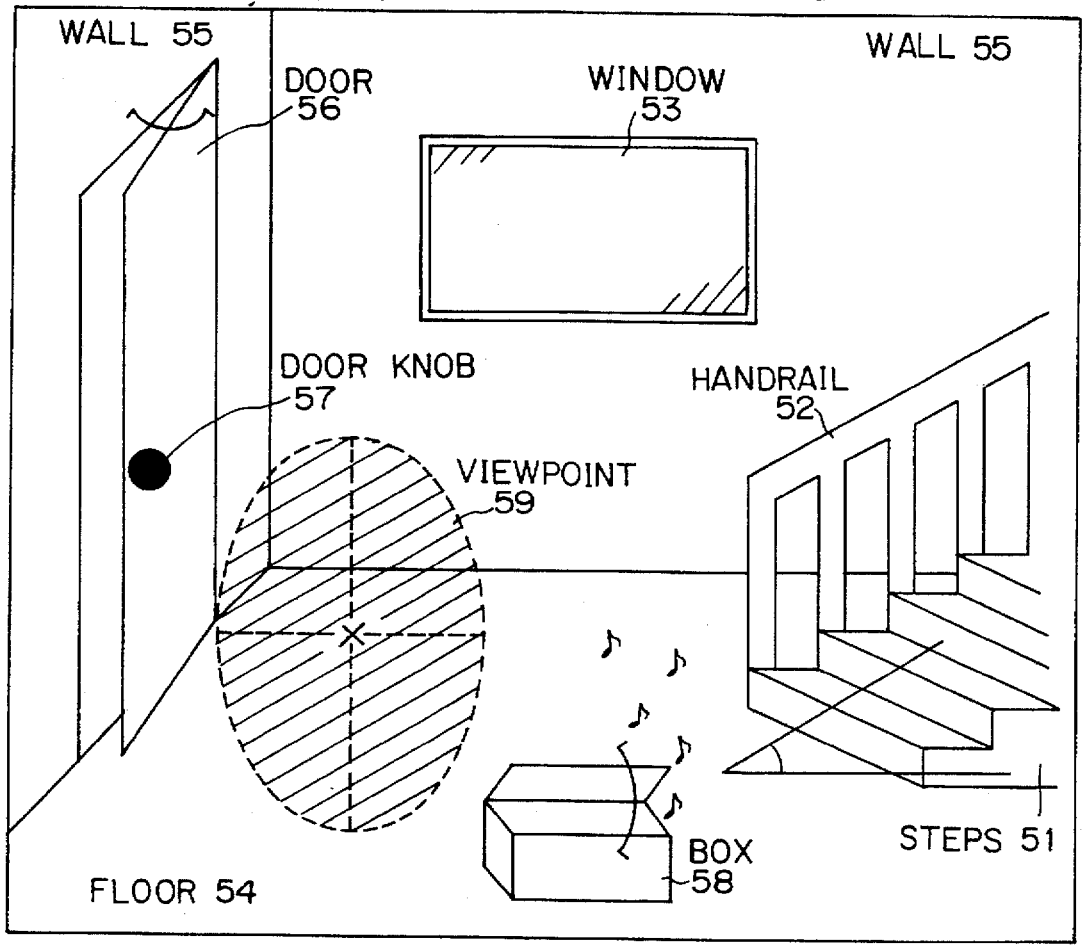
FIG. 5 shows an example of a virtual world illustrating the first embodiment of the present invention.

FIG. 5 shows an example of a virtual world for use in explaining the first embodiment. FIGS. 6 through 13 show examples of the information of objects forming the virtual world shown in FIG. 5.

In the first embodiment, the following typical attributes are used. The names and contents of the attributes are examples only and referred to for easier explanation. It is obvious that the present invention is not limited to these attributes but can simultaneously assign various attributes.

A wall, steps, a paper partition, and a floor are provided as interference attributes in the present example shown in FIG. 5.

The attribute of a wall refers to the feature of an object that the viewpoint cannot walk on the object having this attribute which permits nothing to pass through the object even if the object is sloping. When an object is defined in a virtual world, the default interference attribute is a "wall".

The attribute of "steps" has a parameter of an average slope angle calculated using real form of steps and the information about the lowest plane in the gravity direction.

The information about the lowest plane indicates the information about a horizontal plane in contact with the floor among a lot of planes forming a staircase. For example, the information refers to a plane number of the lowest plane. The viewpoint can go up and down along the slope angle.

The attribute of a paper partition refers to the feature of an object that the viewpoint cannot walk on the object having this attribute even if the object is sloping. The attribute can be defined with a parameter indicating the pressure at which another object passes through the object. Another object is permitted to pass through the object of a paper partition only when another object clashes into the object with a pressure larger than a predetermined pressure.

The attribute of a "floor" refers to the feature of an object that the viewpoint can walk on the object having this attribute however steep or even vertical the object is. Variations of walks (for example, a walking at a constant height from the floor) can be realized by appropriately setting the viewpoint (height of the viewpoint or eyes).

The reaction attributes in the first embodiment indicate a reaction movement and sound, or indicate an activation switch. The reaction attributes indicating a movement refer to rotation, parallel movement, and sound.

The attribute of "rotation" refers to the feature of an object that the object automatically starts rotating as being triggered by a switch. Using this attribute, specified are a start/end position, the type of rotation such as a fixed direction, a reverse direction, etc. For example, needles of a clock, a door knob, a rotating door, an opening/closing of a book, a drawbridge, etc. can be realized using the attribute.

The attribute of "parallel movement" refers to the feature of an object that the object starts automatic parallel movement by being triggered by a switch. With this attribute, specified are a plane on which a movement is made, a start/end position of the movement, the type of movement such as one-way, two-way, etc. For example, the attribute can be used to realize a sliding door, a window, a a drawer, etc.

The attribute of a "sound" (sound output attribute) refers to the feature of an object that the object outputs a sound or a voice by being triggered by a switch according to sound data preliminarily stored in the object.

For example, a virtual world comprises the objects shown in FIG. 5. First, the objects are defined. Since the form, position, etc. of an object can be defined as in the prior art technologies, the detailed explanation about them is omitted here. Described below in detail is the data structure after the definition of the objects. According to the first embodiment, an attribute can be assigned to each object on an attribute edit screen.

Figure 6:
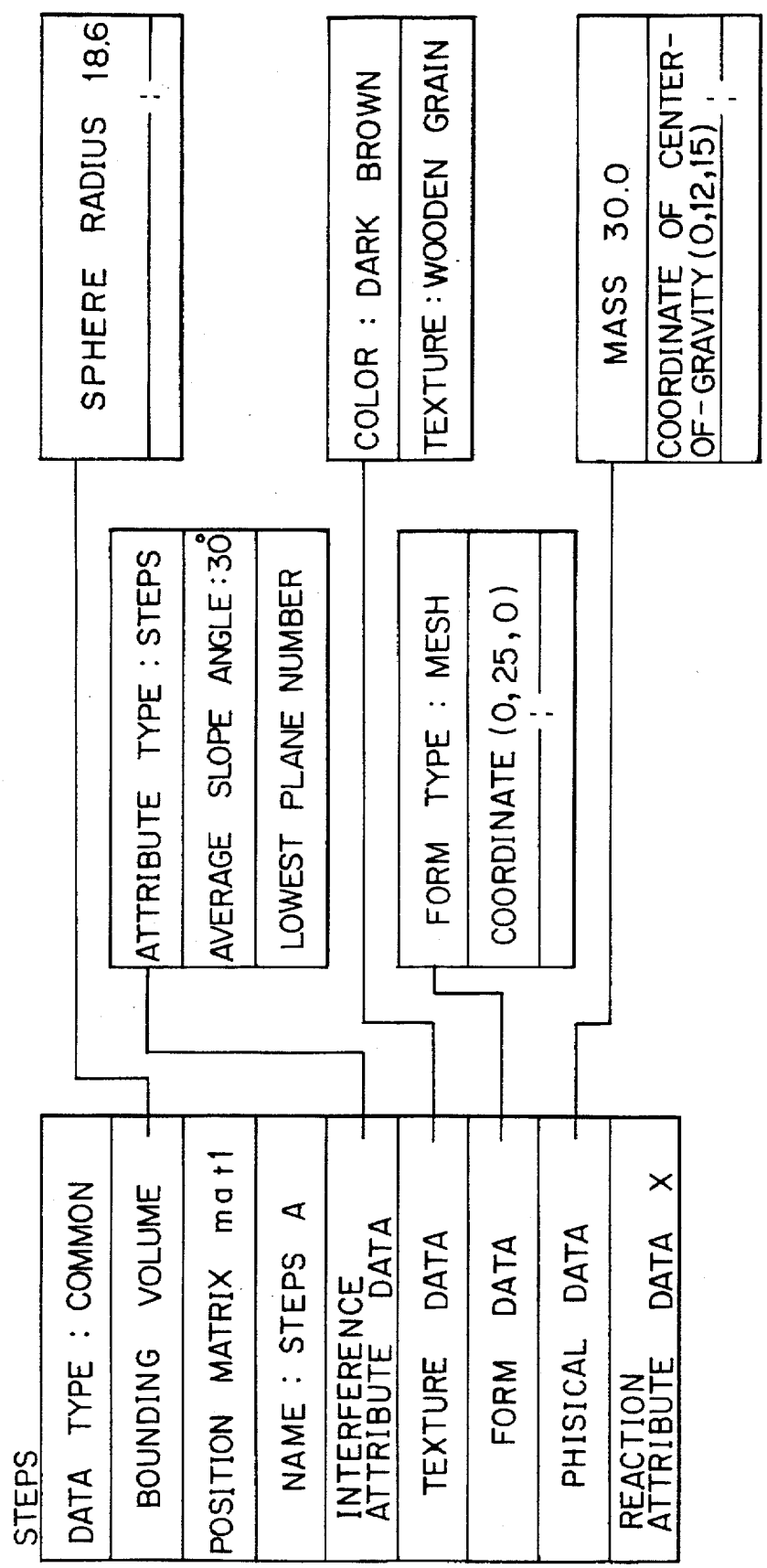
FIG. 6 shows an example of the object information about a steps forming part of the virtual world.

The object information about steps 51 shown in FIG. 5 is managed as the data as shown in FIG. 6. The information refers to data of a common type and therefore common objects. The bounding volume refers to a size of a space including the object and is determined for easier cross over calculation. The position matrix refers to the position of the object in a three-dimensional space of the virtual world. The name refers to the identifier of the object. In this case, the name is "steps A". The interference attribute data are attribute information set by the attribute defining/setting unit 33 shown in FIG. 4. The attribute type is "steps". The data include a parameter of the average slope angle of 30° and the information about the lowest plane in the gravity direction (plane number of the lowest plane). The viewpoint can go up and down the steps at the slope angle. The texture data refer to the color, pattern (texture), etc. of the object. The color of the steps is defined as dark brown, and the texture is defined as the grain of wood. Additional data are the form data indicating the type of form (mesh), and coordinates, and physical data including the mass and the coordinates of the gravity. No reaction attribute is assigned to the steps 51.

Figure 7:
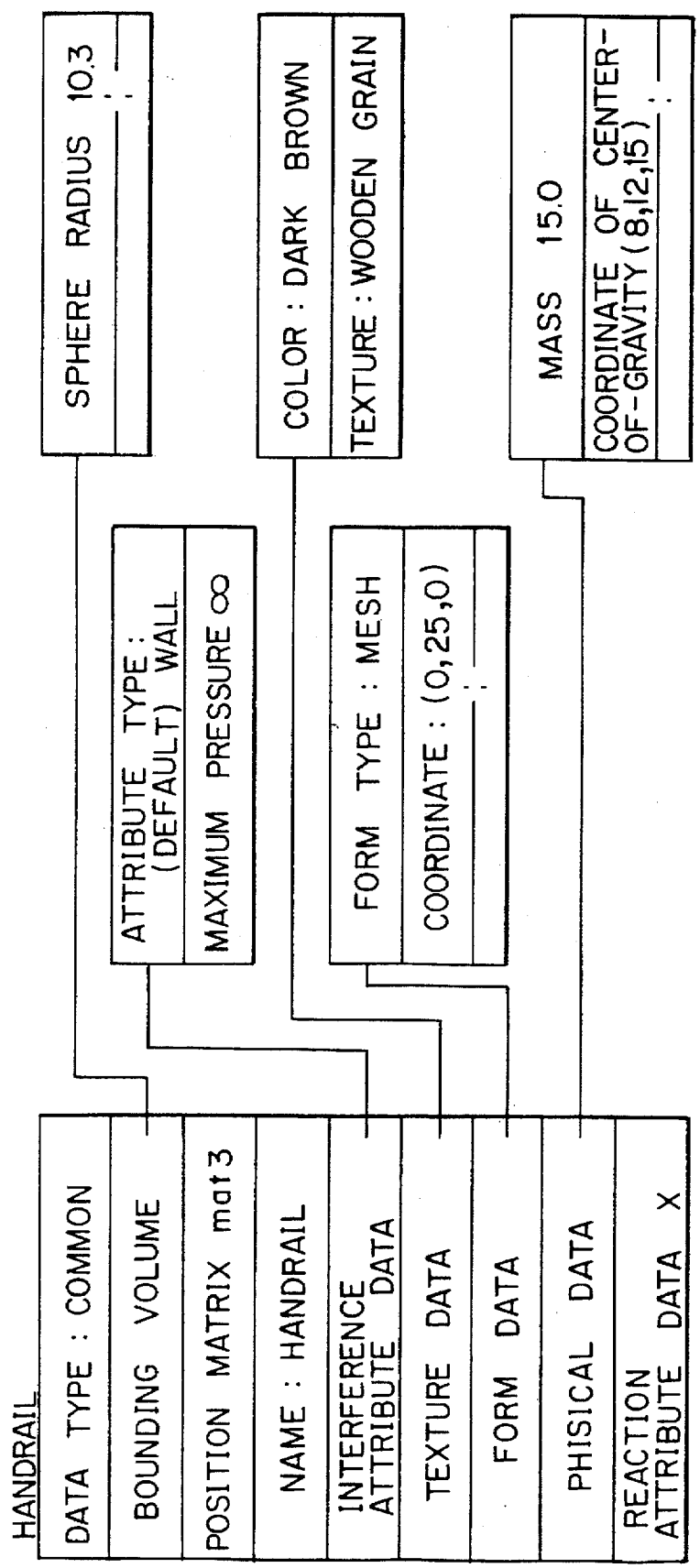
FIG. 7 shows an example of the object information about a handrail forming part of the virtual world.

The object information about handrail 52 shown in FIG. 5 is managed as the data as shown in FIG. 7. Since the contents of the common data are similar to those of the steps 51, described below is the attribute information about the present invention. The attribute type of the handrail 52 is defaulted at "wall". Therefore, the viewpoint cannot move on or pass through the handrail 52. No reaction attribute is assigned to the handrail 52.

Figure 8:
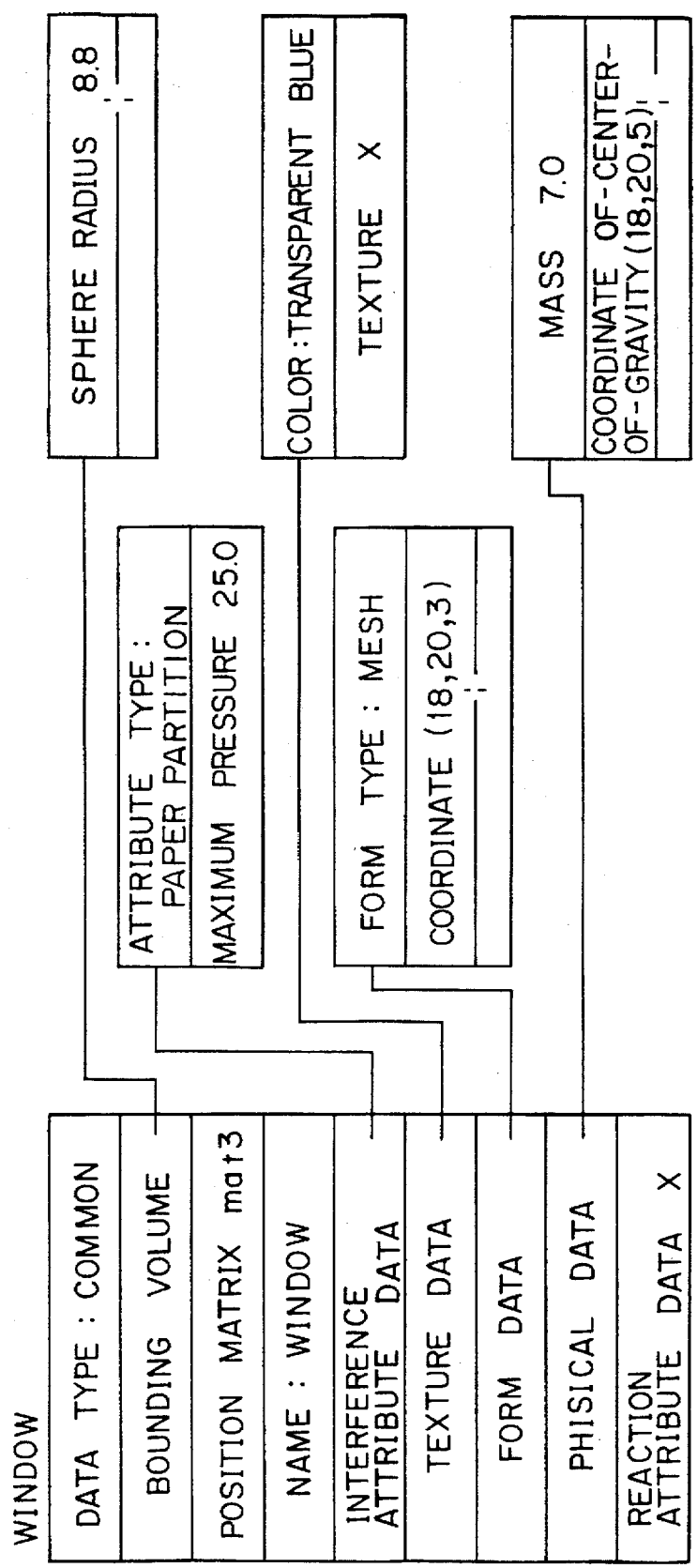
FIG. 8 shows an example of the object information about a window forming part of the virtual world.

The object information about window 53 shown in FIG. 5 is managed as the data shown in FIG. 8. The attribute type of the interference attribute of the window 53 is a "paper partition" with the maximum pressure of 25.0. It indicates the durable pressure, and the window 53 permits an object to pass through it only when it receives a clash force equal to or larger than the pressure of 25.0. No reaction attribute data are defined for the window 53.

Figure 9:
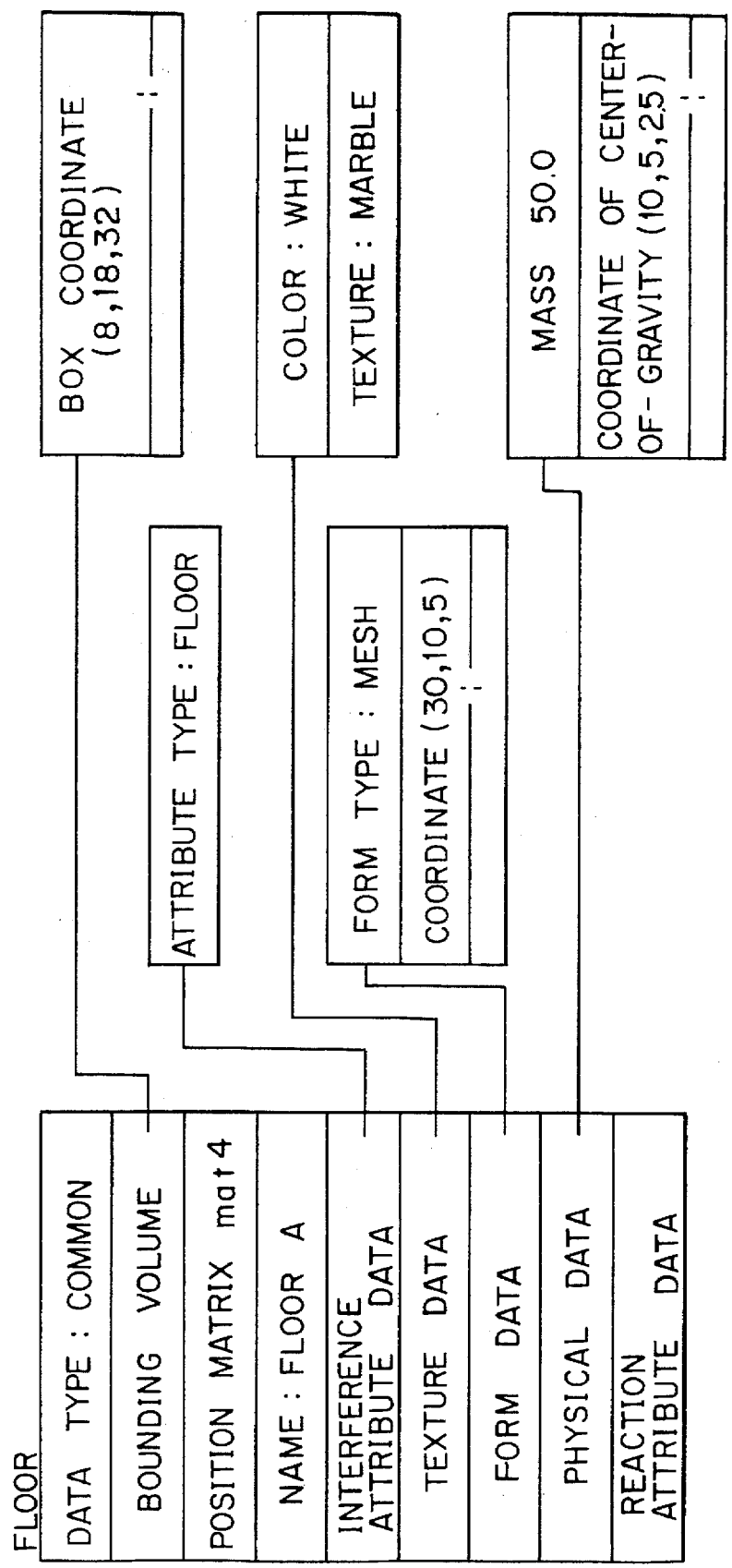
FIG. 9 shows an example of the object information about a floor forming part of the virtual world.

The object information about a floor 54 shown in FIG. 5 is managed as, for example, the data shown in FIG. 9. The attribute type of the interference attribute of the floor 54 is "floor". Therefore, the viewpoint can walk on this object. No reaction attribute data are defined. The object information of a wall 55 shown in FIG. 5 is defined similarly. The interference attribute of the wall 55 is defaulted at "wall".

Figure 10:
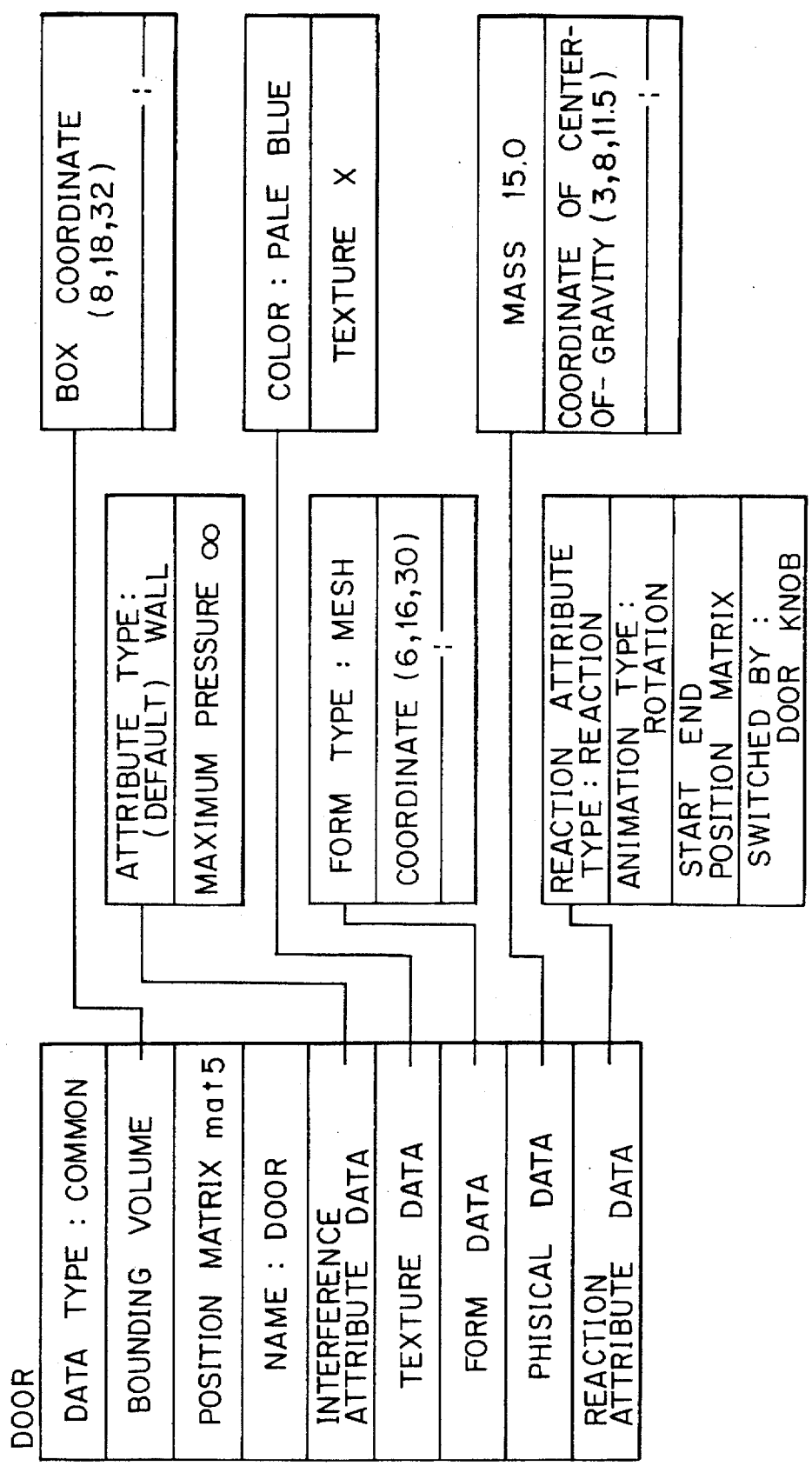
FIG. 10 shows an example of the object information about a door forming part of the virtual world.

The object information about a door 56 shown in FIG. 5 is managed as, for example, the data shown in FIG. 10. The attribute type of the interference attribute of the door 56 is "wall". Furthermore, the door 56 is assigned a reaction attribute, and the type of the attribute is "reaction". Its animation type is "rotation" and a rotation start/end position matrix is defined. It has a door knob as a switch and starts its rotation by the click on a door knob 57.

Figure 11:
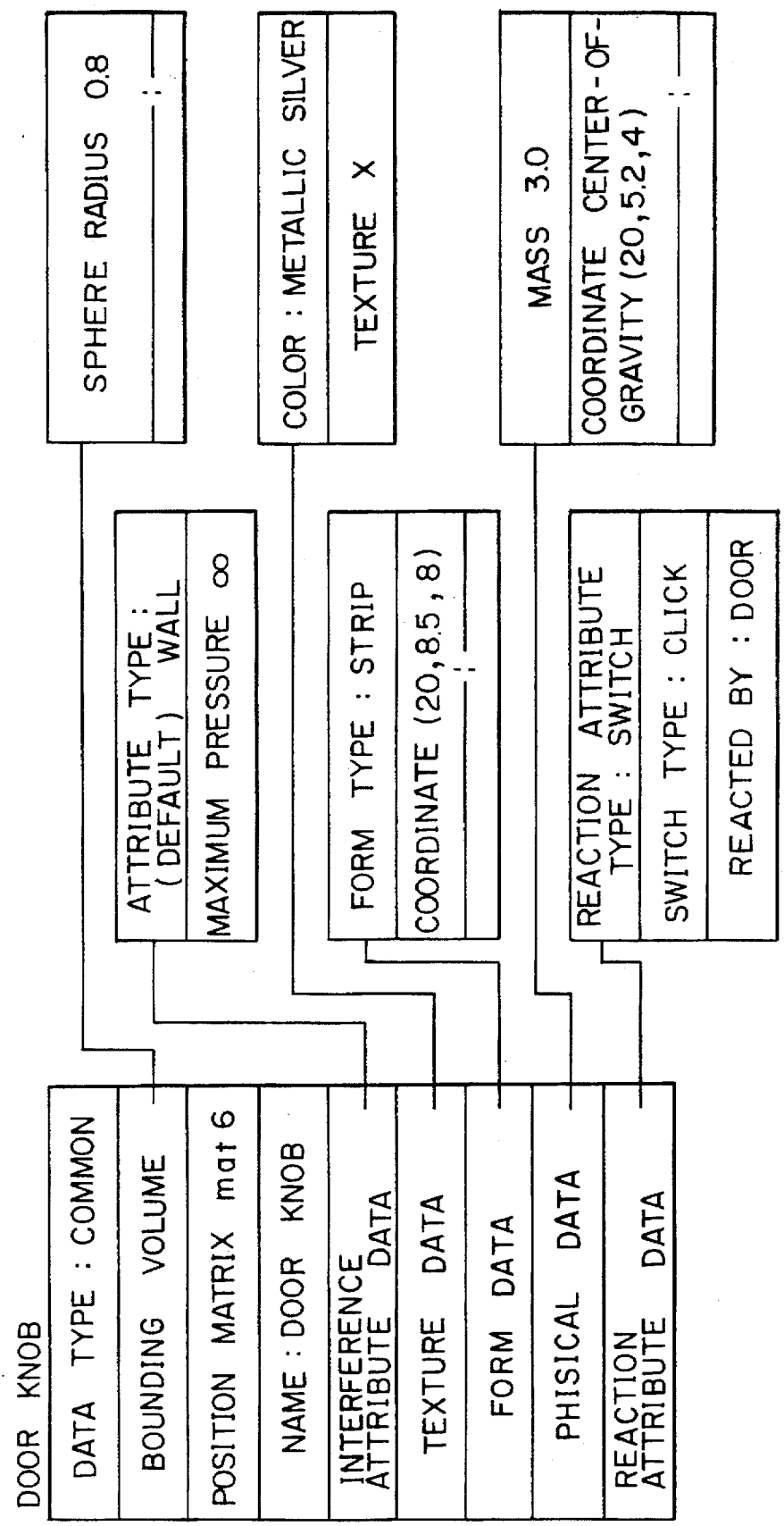
FIG. 11 shows an example of the object information about a door knob forming part of the virtual world.

The object information about the door knob 57 shown in FIG. 5 is managed as, for example, the data shown in FIG. 11. The attribute type of the interference attribute of the door knob 57 is "wall". "Switch" is defined as the attribute type of the interference attribute of the door knob 57. The switch type is "click". The "click" indicates a clicking operation of, for example, a mouse on a screen, and permits a reacting object to be operated. In this example, the reacting object is the door 56.

Figure 12:
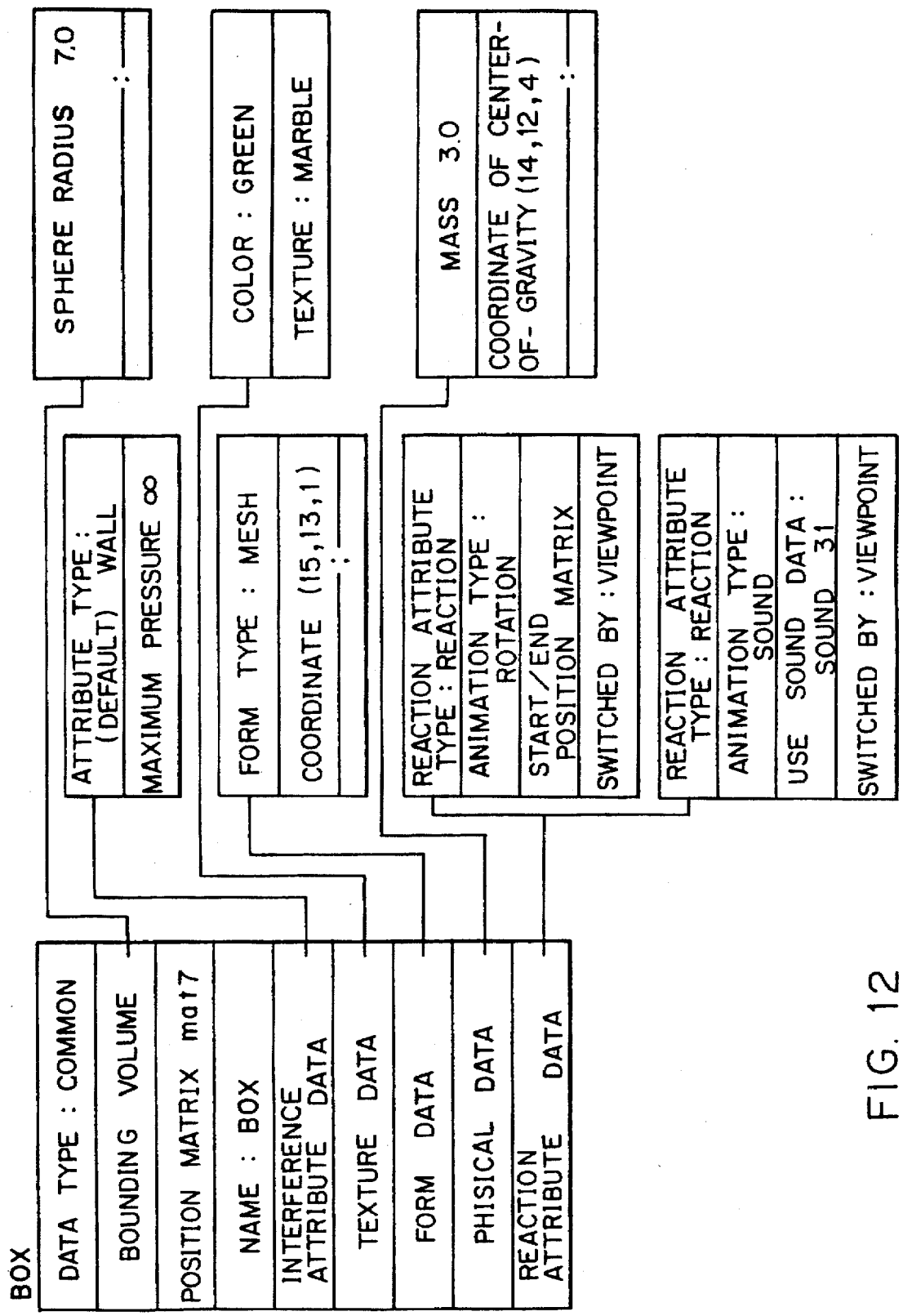
FIG. 12 shows an example of the object information about a box forming part of the virtual world.

The object information about a box 58 shown in FIG. 5 is managed as, for example, the data shown in FIG. 12. The attribute type of the interference attribute of the box 58 is "wall" which prohibits the viewpoint from walking over. Two attributes of "reaction" are defined as reaction attributes. One is the animation type "rotation" and associated with the viewpoint as a switch. When the object comes in contact with the viewpoint as described later, it starts a predetermined rotation. The other attribute is the animation type "sound" and indicates a reaction of outputting a sound. A use sound data used when the sound is output are preliminarily stored in an area managed by the identification information "sound 31". It is switched by the viewpoint. When the object comes in contact with the viewpoint as described later, it outputs the predetermined sound data.

Figure 13:
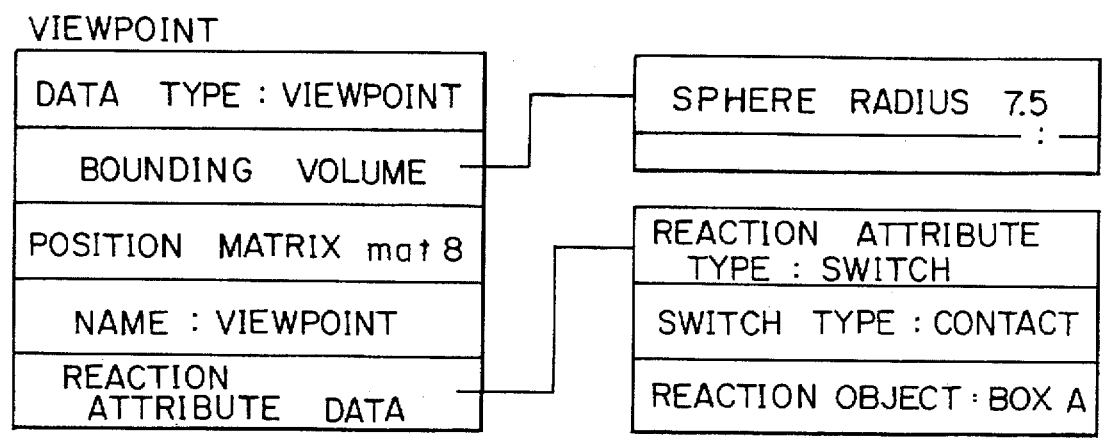
FIG. 13 shows an example of the object information about a viewpoint forming part of the virtual world.

The object information about a viewpoint 59 shown in FIG. 5 is managed as, for example, the data as shown in FIG. 13. The data type of the viewpoint is "viewpoint". The viewpoint 59 indicates the position and direction of the eyes of a user who is supposed to walk in a virtual world. There are no physical data of the form, but the viewpoint is processed in the same manner as a common object for standardization. The viewpoint volume defining unit 34 defines the volume of the viewpoint for the viewpoint 59 as in the definition of the bounding volume of a common object. The volume of the virtual viewpoint is determined as, for example, an ellipsoid or a sphere, according to the bounding volume of the viewpoint. In FIG. 5, the viewpoint 59 has an elliptic viewpoint volume. FIG. 13 shows a special case of an elliptic viewpoint having a bounding volume of a sphere with 7.5 in radius. Any other forms can be optionally specified as a viewpoint volume. The attribute of "switch" is defined as a reaction attribute to the viewpoint 59, and the switch type is "contact". The reacting object is the above defined "box". It indicates that when the viewpoint 59 comes in contact with the box 58, a process is activated according to the reaction attribute defined for the box 58.

Figure 14:
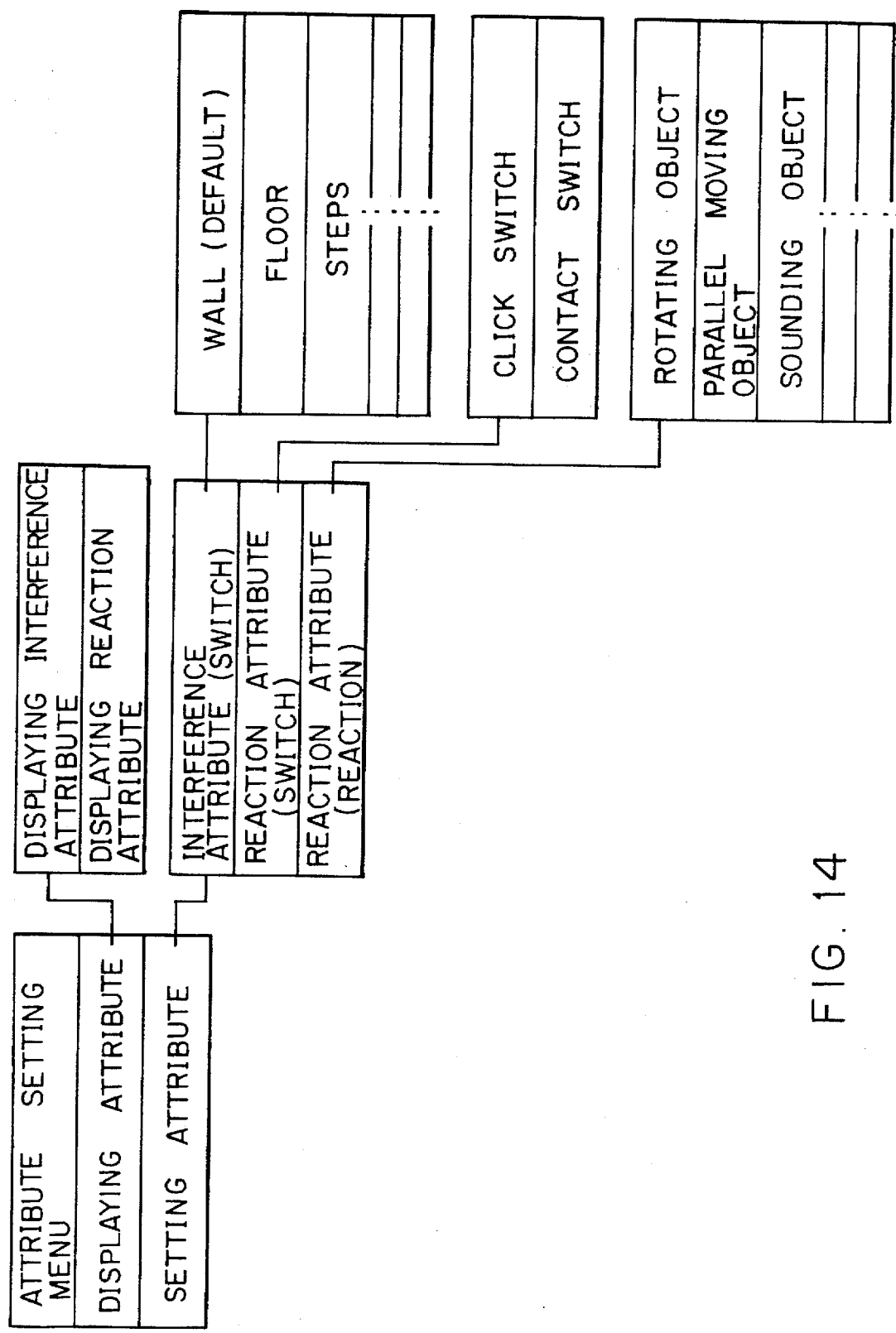
FIG. 14 shows the structure of the attribute setting menu according to the first embodiment of the present invention.

The attribute defining/setting unit 33 shown in FIG. 4 defines and sets an attribute when a virtual world is edited or simulated. FIG. 14 shows the structure of the attribute setting menu processed by the attribute defining/setting unit 33. The "display of an attribute" or the "setting of an attribute" can be selected from the initial menu. In an "attribute display" menu, either "interference attribute display" or "reaction attribute display" can be selected.

Figure 15:
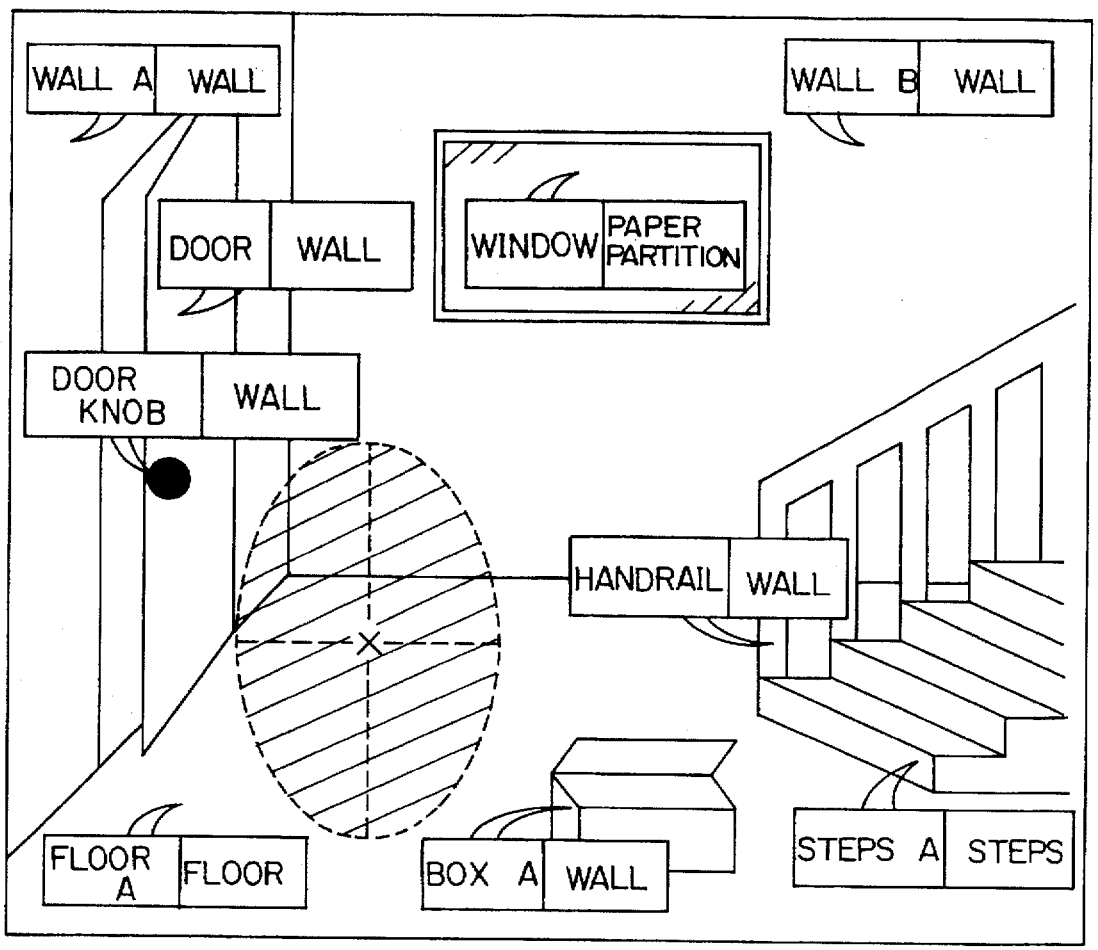
FIG. 15 shows an example of a display of the interference attribute according to the first embodiment of the present invention.

FIG. 15 shows an example of a display of an interference attribute after being selected from the "interference attribute display" menu. If the "interference attribute display" menu is selected, an interference attribute of each object in the object information shown in FIGS. 6 through 13 is referred to. As shown in FIG. 15, for example, the name of an object and an interference attribute name already set are displayed in the virtual world. Thus, a user is informed of the set interference attribute.

Figure 16:
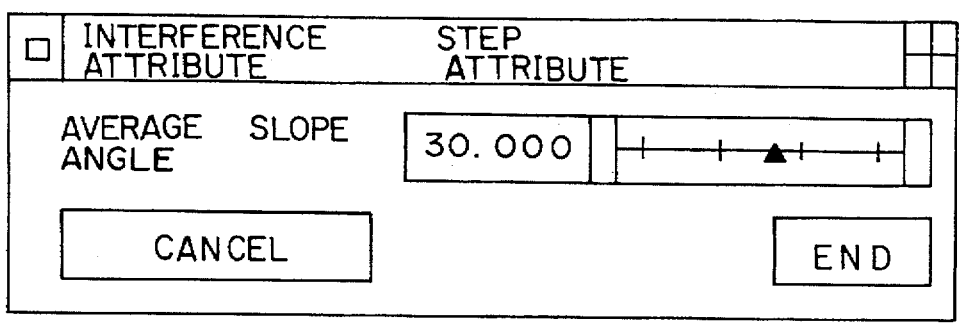
FIG. 16 shows an example of a display of the attribute of the steps according to the first embodiment of the present invention.

Clicking a mouse at the displayed attribute on a screen opens a small window as shown in FIG. 16 for more detailed parameters. FIG. 16 shows a window displayed when the mouse is clicked at the attribute of the steps.

Figure 17:
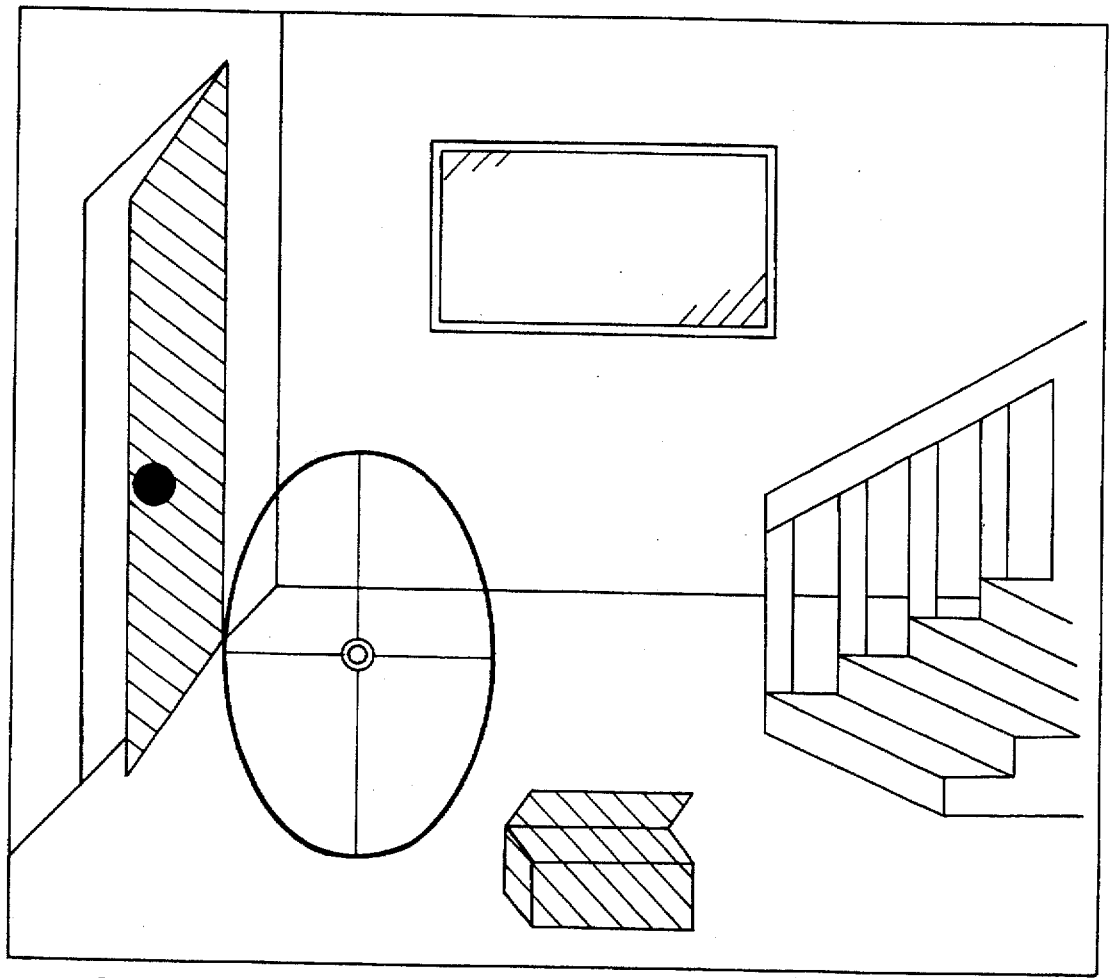
FIG. 17 shows an example of a display of the reaction attribute according to the first embodiment of the present invention.

FIG. 17 shows an example of the display of reaction attributes displayed when the "reaction attribute display" menu is selected. When the "reaction attribute display" menu is selected, the reaction attributes of each object in the object information shown in FIGS. 6 through 13 are referred to. For example, as shown in FIG. 17, the reaction attributes set for each object are represented in respective colors. Otherwise, the distribution of the reaction attributes can be represented by letters "switch", "rotating object", etc. as in the example of the display of interference attributes. In this example, an object having the attribute of a switch is represented in pink, an object having the reaction attribute in pale blue, and the other objects in white depending on the type of reaction attribute. Thus, all objects assigned a reaction attribute are represented in respective colors. Then, clicking an optional switch, for example, the "door knob" displays the reaction attribute object group ("door" in this example) switched by the "door knob" in an emphasized manner. That is, for example, pink is emphasized into red, pale blue is emphasized into blue, and so forth.

If the "interference attribute" setting menu is selected in the attribute setting menu as shown in FIG. 14, then displayed is the menu listing the interference attributes which can be set for a object to be set. For example, if a step attribute is selected, then the window shown in FIG. 16 which is referred to in association with the example of the display of interference attributes is displayed. In the window, an average slope angle is automatically calculated and displayed according to the predetermined form data of an object. The angle can be modified by dragging the mark indicating the default value of the average slope angle. The setting can be deleted using the cancellation button (CANCEL). The termination button (END) terminates the setting of an attribute.

Figure 18A:
FIG. 18A shows an example of a setting screen of the reaction attribute of the contact switch according to the first embodiment of the present invention.
Figure 18B:
FIG. 18B shows an example of a setting screen of the reaction attribute of the rotating object according to the first embodiment of the present invention.
Figure 18C:
FIG. 18C shows an example of a setting screen of the reaction attribute of the sound generating object according to the first embodiment of the present invention.

FIGS. 18A, 18B, and 18C show examples of setting screens. If the "reaction attribute (switch)" setting menu is selected in the attribute setting menu shown in FIG. 14, a reaction attribute setting screen is displayed. On this screen, "click switch" and "contact switch" can be selected. The "click switch" indicates that a switch type reacts with an external activate instruction, while the "contact switch" indicates that a switch type reacts when the object comes in contact with another object in the virtual world. If the "contact switch" is selected, for example, a window shown in FIG. 18A is displayed. Adding, deleting, entering, and editing a reacting object in the list is performed by clicking the button after selecting a corresponding item in the list.

There are two methods of opening a window for use in setting the movement of an actual reacting object as shown in FIGS. 18B and 18C. One is to click the button at a corresponding object in the reacting objects to be activated. The other is to directly select on a screen a reacting object to be edited and to select a reaction attribute in the menu.

FIG. 18B shows an example of the display of a window when the "rotating object" menu is selected in setting a reaction attribute. The rotation angle, the type of rotation, etc. can be set in the window. Likewise, the movement start/end position and the type of movement can be set for "displacing object" using a similar screen.

FIG. 18C shows an example of the display of a window when the "sound output object" menu is selected. The list of a file storing an acoustic performance time, a sound source, and sound data called "mididata" can be optionally set.

Described below is the process performed by the state change calculating unit 13 shown in FIG. 4 by referring to FIG. 19. Process steps S1 through S19 in the following explanation correspond to steps S1 through S19 shown in FIG. 19.

S1: A display instruction is issued to the result display unit 38 to display the initial screen or the image of a calculation result on the display device 40.

S2: If there are sound data to be output, then the sound data is output through the sound output unit 39.

S3: Present time t is set to t' by adding a predetermined time value $\Delta t$ ($t' = t + \Delta t$).

S4: On the screen displaying a virtual world, it is determined whether or not the button has been clicked at an object, that is, whether or not an activate instruction has been issued from the activate instruction input unit 35. If no, control is passed to step S7.

S5: If the button has been clicked at an object, the reaction attribute of the clicked object is checked to determine whether or not its switch attribute is defined. If no, the process in the next step S6 is omitted.

S6: If the switch attribute is defined, then searched and activated is a reacting object triggered by the clicked object.

S7: Next, it is determined whether or not there is an object moving in the virtual world. If no, control is returned to step S1. An object moving in FIG. 5 is an object which has been already activated among the viewpoint 59, the door 56, and the box 58.

S8: If there are objects moving in the virtual world, one (hereinafter referred to as obselected and temps selected and temporarily updated at present time. A temporary update indicates a process in which the position of object A at time t' is temporarily calculated on the assumption that object A does not interfere with another object. If it actually does not interfere with another object, the result is validated.

S9: It is checked whether or not any other object has its data type of "common type" (not a viewpoint, a light source, etc. but an object having a certain form). If yes, the interference (contact/clash or collision) between the object (hereinafter referred to as object B) and object A is determined.

S10: Unless there is object B interfering with object A, then control is returned to step S7 and to the process of the next moving object. If there is object B interfering with object A, the following process is performed.

S11: Calculated is the movement amount at interference, that is, the contact pressure at the clash between objects A and B. It is calculated based on the mass, etc. defined as object information and a given movement speed.

S12: It is determined whether or not object A is a viewpoint. If yes, control is passed to step S14. If no, the process of step S13 is performed.

S13: Unless object A is a viewpoint, the type of the interference attribute of object B is checked and the following movement interference calculation is performed depending on the interference attribute of object B.

If the attribute of object B is "wall", then the common object (object A) clashes with the wall (object B). Since object B prohibits other objects from passing through it, the temporary update of the movement of object A is canceled.

If the attribute of object B is "steps", a step attribute is processed as a wall attribute in principle because object A is not a viewpoint. Therefore, the temporary update of the movement of object A is canceled. However, a size of a common object can be regarded as a volume of a viewpoint so that the common object as well as the viewpoint can go up and down the steps.

If the attribute of object B is "floor", the temporary update of the movement of object A is canceled because the floor works on a common object as having a wall attribute. However, the size of the common object can be regarded as the volume of a viewpoint so that the common object as well as the viewpoint can move on the floor.

If the attribute of object B is "paper partition", then the contact pressure calculated in the process in step S11 is compared with the parameter (maximum pressure) of the interference attribute (paper partition) of object B. If the contact pressure is larger, the temporary update of the movement of object A is determined as an actual position. If the contact pressure is smaller, the temporary update is canceled.

S14: If object A is a viewpoint, it is determined whether or not the viewpoint is assigned a viewpoint volume. If yes, control is passed to step S15. If no, control is passed to step S16.

S15: If object A is a viewpoint and a viewpoint volume is assigned to the viewpoint, then the type of interference attribute of object B is checked and the following movement interference calculation is performed depending on the interference attribute of object B.

If the attribute of object B is "wall", then object B prohibits other objects from passing through it, and the temporary update of the movement of object A (viewpoint) is canceled.

If the attribute of object B is "steps", then object A (viewpoint) can go up and down the steps. Accordingly, the temporary update of object A is canceled, and the position of the viewpoint is calculated such that the height of the viewpoint volume can be maintained at a constant level in the direction of the gravity of the virtual world. The calculation is performed according to the parameter of the interference attribute (steps) of object B and the information about the lowest plane (plane number). The calculation result is determined as an actual position.

If the attribute of object B is "floor", then object A (viewpoint) moves on the floor. Therefore, the temporary update of object A is canceled, and the position of the viewpoint is calculated such that the height of the viewpoint volume can be maintained at a constant level in the direction of the gravity of the virtual world. The calculation is performed using the form of object B, and the result is determined as an actual position.

If the attribute of object B is "paper partition", then the contact pressure calculated in the process in step S11 is compared with the parameter (maximum pressure) of the interference attribute (paper partition) of object B. If the contact pressure is larger than the maximum pressure, the temporary update of object A is determined as an actual position. If it is smaller, then the temporary update is canceled.

S16: If object A is a viewpoint and a viewpoint volume is not assigned to the viewpoint, then the type of the interference attribute of object B is checked and the following movement interference calculation is performed depending on the interference attribute of object B.

If the attribute of object B is "wall", then object B prohibits other objects from passing through it, and the temporary update of the movement of object A (viewpoint) is canceled.

If the attribute of object B is "steps", since no viewpoint volume is defined for object A (viewpoint), then, the attribute of steps of object B works on object A as if it were an attribute of a wall, and the temporary update of the movement of object A is canceled.

If the attribute of object B is "floor", since no viewpoint volume is defined for object A (viewpoint), then, the attribute of a floor works on object A as if it were an attribute of a wall, and the temporary update of the movement of object A is canceled.

If the attribute of object B is "paper partition", then the contact pressure calculated in the process in step S11 is compared with the parameter (maximum pressure) of the interference attribute (paper partition) of object B. If the contact pressure is larger than the maximum pressure, the temporary update of object A is determined as an actual position. If it is smaller, then the temporary update is canceled.

S17: After the results of the movement interference calculations performed in the processes of the above described steps S13, S15, and S16 have been stored in a notification area for the result display unit 38, the reaction attribute of object A is checked and it is determined whether or not a switch attribute of a contact switch is set. If no, control is returned to step S7.

S18: If a switch attribute of a contact switch is assigned to object A, then it is determined whether or not a reacting object is object B and whether or not the reaction attribute (reaction) of object B is associated with object A as a switch. If object B is a reacting object and is switched by object A, then the process of the next step S19 is performed. Otherwise, control is returned to step S7.

S19: Object B is activated and added to a group of the moving objects as one of them. Then, control is returned to step S7 and the process is repeated on the next moving object.

Next, the process in step S15 shown in FIG. 19 is explained in detail by referring to FIGS. 20 through 25, where object A is a viewpoint assigned a viewpoint volume.

Figure 20:
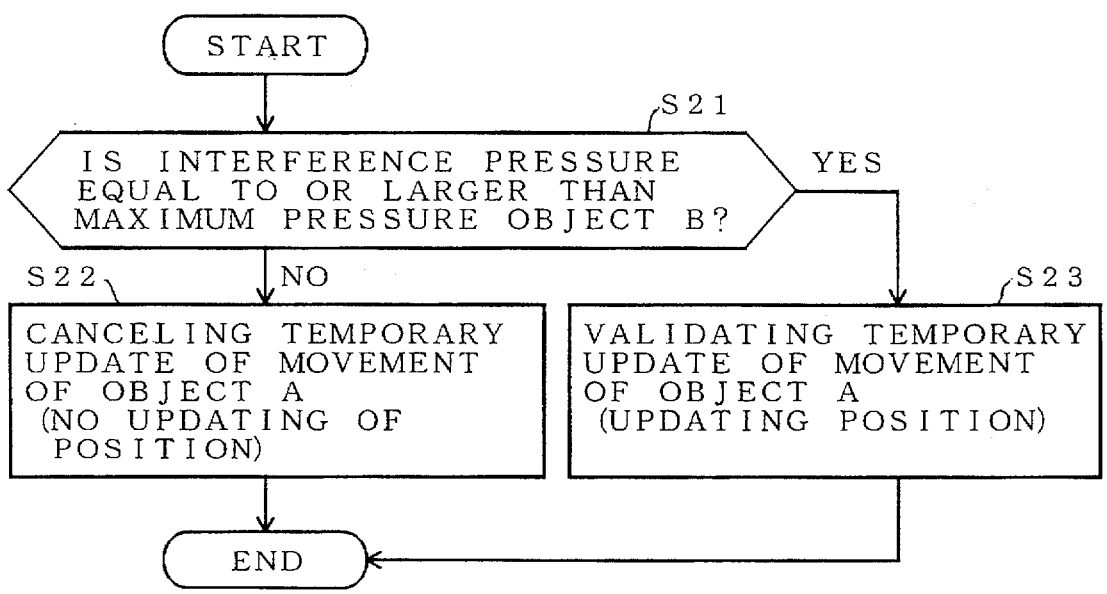
FIG. 20 is the flowchart showing the movement interference calculation process between an object and a wall.

FIG. 20 is the flowchart showing the movement interference calculation in which the attribute of object B is "wall". In FIG. 20, the state change calculating unit 13 determines whether or not the interference pressure of object A is larger than the maximum pressure of object B (step S21). If yes, the temporary update of the movement of object A is validated and the position of object A is updated (step S23). If it is smaller than the maximum pressure of object B, then the temporary update of the movement of object A is canceled (step S22). In this case, the position of object A is not updated.

Figure 21:
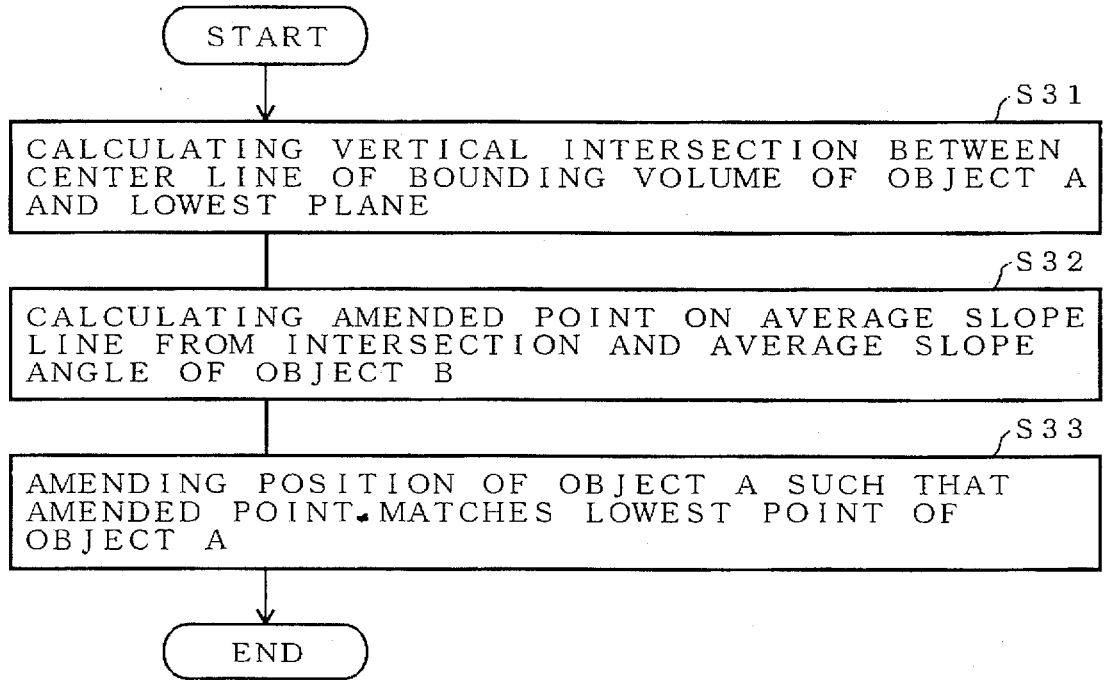
FIG. 21 is the flowchart showing the movement interference calculation process between the object and the steps.
Figure 22:
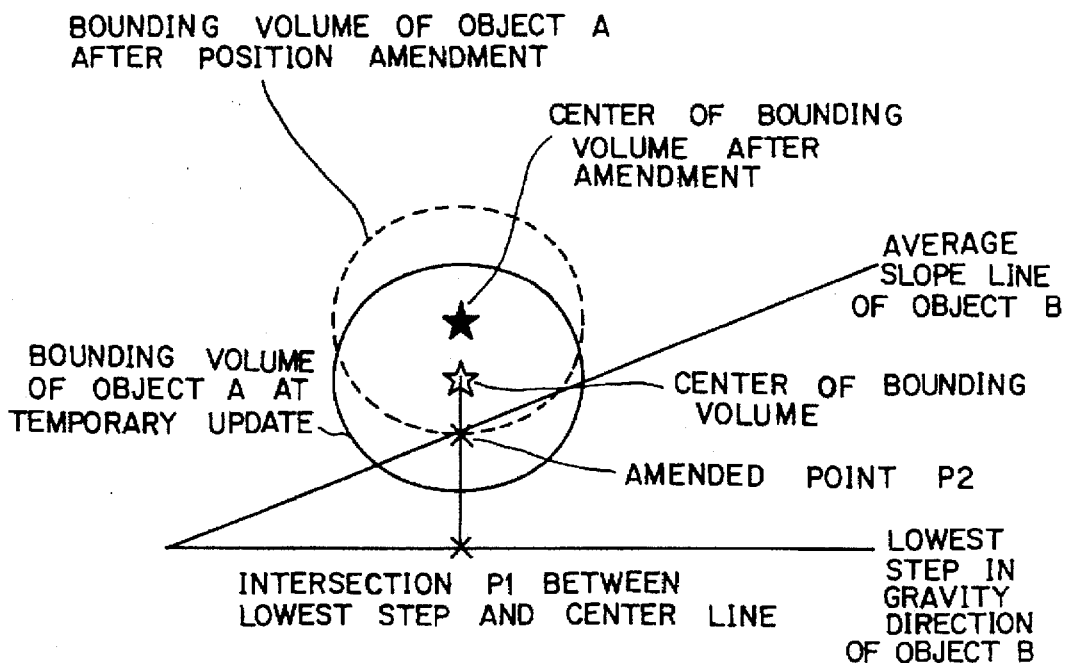
FIG. 22 shows an example of the amendment to the position of the object interfering with the steps.

FIG. 21 is the flowchart of the movement interference calculation performed when the attribute of object B is "steps". FIG. 22 shows the position of object A amended as a result of the calculation.

In FIG. 21, the state change calculating unit 13 obtains the intersection between the center line in the gravity direction of the bounding volume of temporarily updated object A and the lowest plane of object B, that is, the intersection P1 between the vertical line from the center of object A to the lowest plane of object B and the lowest plane of object B (step S31). Obtained next is the amended point P2 on an average slope line according to the intersection P1 and an average slope angle of object B (step S32). Then, the position of object A is amended such that the lowest point of the bounding volume of object A matches the amended point P2, and then object A is moved (step S33).

Thus, as shown in FIG. 22, the bounding volume of the temporarily updated object A is moved onto the average slope line of object B.

Figure 24:
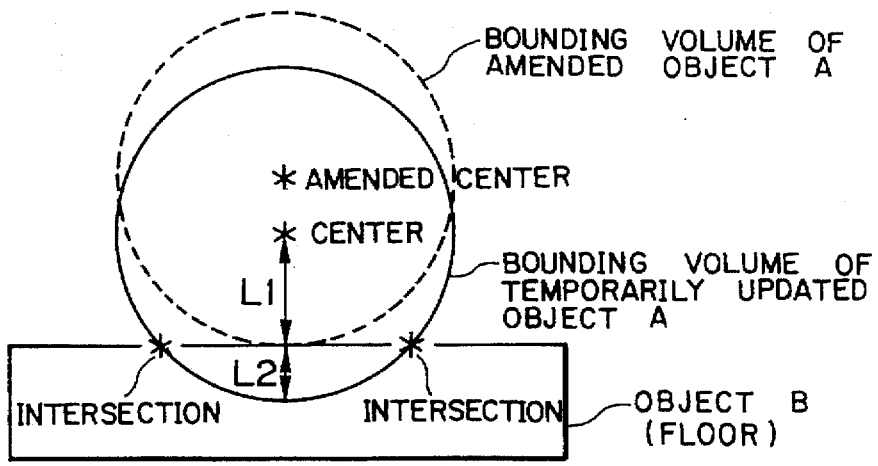
FIG. 24 shows an example of the amendment to the position of the object interfering with the floor.
Figure 23:
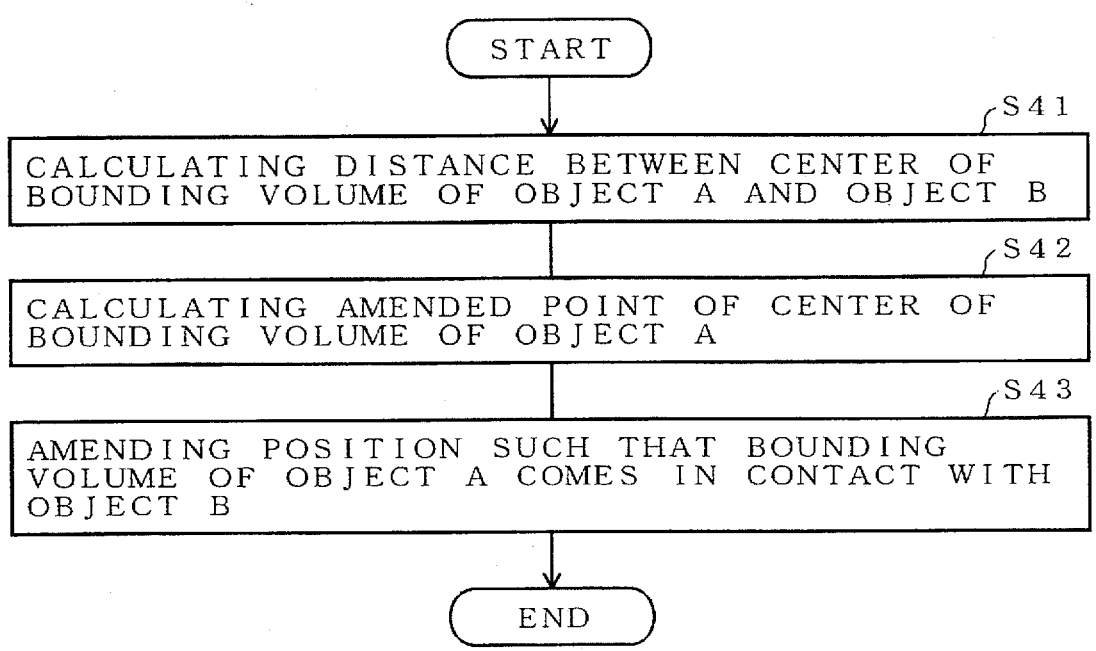
FIG. 23 is the flowchart showing the movement interference calculation process between the object and the floor.

FIG. 23 is a flowchart of the movement interference calculation performed when the attribute of object B is "floor". FIG. 24 shows a position of object A amended as a result of the calculation.

In FIG. 23, the state change calculating unit 13 obtains the distance L1 between the center of the bounding volume of the temporarily updated object A and object B (step S41). Obtained next is the depth L2 of the bounding volume of object A sinking into object B by subtracting L1 from the radius of the bounding volume of object A. L2 is added to the height of the center of the bounding volume of object A to obtain an amended point of the center (step S42). Then, the position of object A is amended such that the bounding volume of object A comes in contact with object B, and object A is moved (step S43).

Thus, as shown in FIG. 24, the bounding volume of the temporarily updated object A is moved onto object B.

Figure 25:
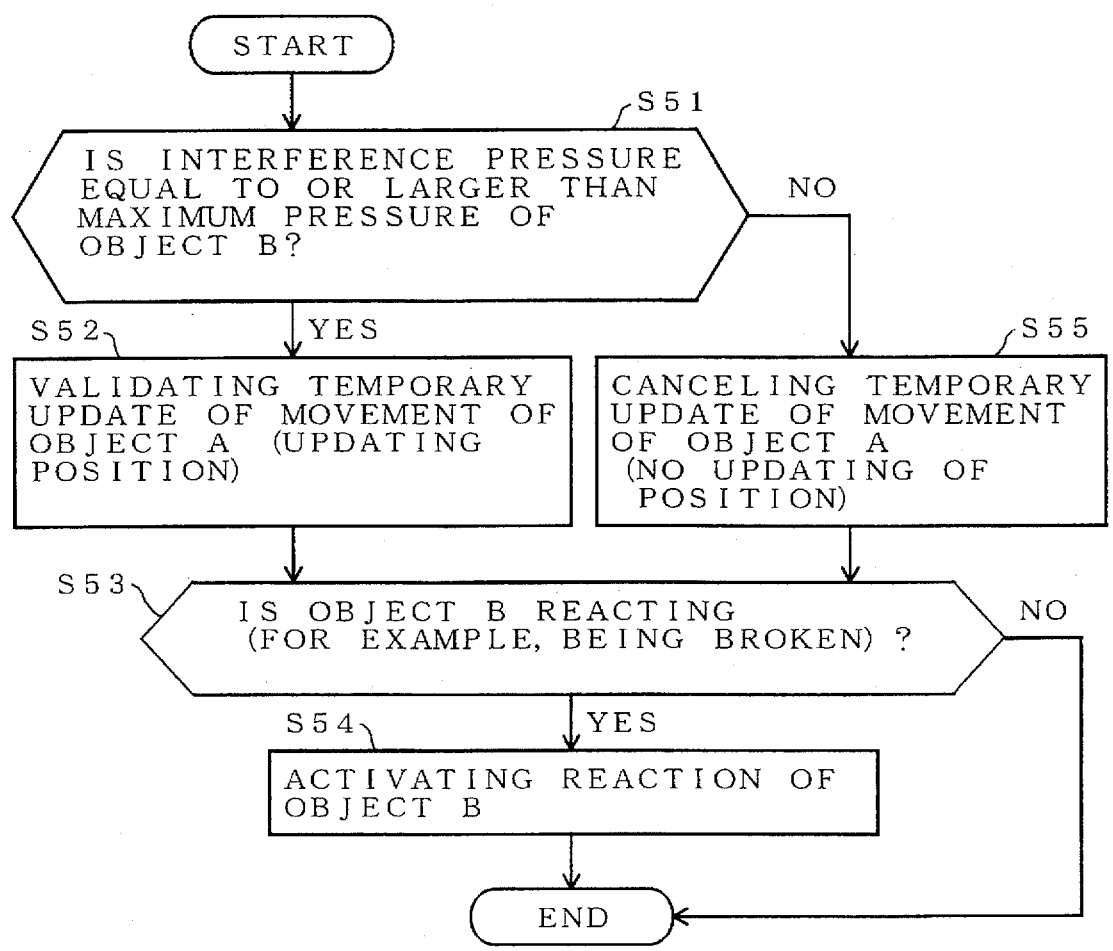
FIG. 25 is the flowchart showing the movement interference calculation process between the object and a sliding door.

FIG. 25 is the flowchart of the process performed in the movement interference calculation if the attribute of object B is "paper partition". In FIG. 25, the state change calculating unit 13 determines whether or not the interference pressure of object A is larger than the maximum pressure of object B (step S51).

If yes, the temporary update of the movement of object A is validated and the position of object A is updated (step S52). Next, it is determined whether or not there is a reaction movement as a result of which object B is broken (step S53).

If yes, then the reaction movement of object B is activated (step S54). If no, the process terminates.

If the interference pressure of object A is smaller than the maximum pressure, then the temporary update of the movement of object A is canceled (step S55), and the processes of and after step S53 are performed. At this time, the position of object A is not updated.

To obtain an exact movement interference, an interference calculation should be performed between all intersecting planes of object A with object B, and the contact force at each intersection is calculated to obtain the direction of the movement of object A and the distance of the movement. In this method, a large amount of calculation is required to determine for each plane the intersection and the contact force. Furthermore, to realize the state after a contact, a precise physics calculation should be performed using a contact force and a friction force.

On the other hand, according to the first embodiment, it is not necessary to determine an intersection for all planes of object A. Furthermore, the amount of movement is used to determine the state after a contact, and reaction information is stored for each attribute, thereby eliminating a precise and complex physics calculation. As a result, the large amount of calculation in the precise movement interference calculation can be considerably reduced.

The above explanation of the processes refers to the typical attributes. If a new attribute is defined, then a process routine can be entered depending on its attribute. Similarly, the calculation can be easily performed depending on the attribute. The movement interference calculation for the new attribute can be optionally set. Various methods, for example, a method of generating a subroutine, a method using a branch table, etc. can be used depending on the system of a CG simulation.

As described above, the first embodiment introduces a concept of an attribute, and defines and sets the attribute for an object in a virtual world in a walk-through simulation. Then, the movement interference calculation of the object is performed at a high speed and the conventional problem that the object undesirably sinks into another object can be successfully solved. Thus, the movement of the viewpoint of a user can be performed easily and realistically.

Figure 26:
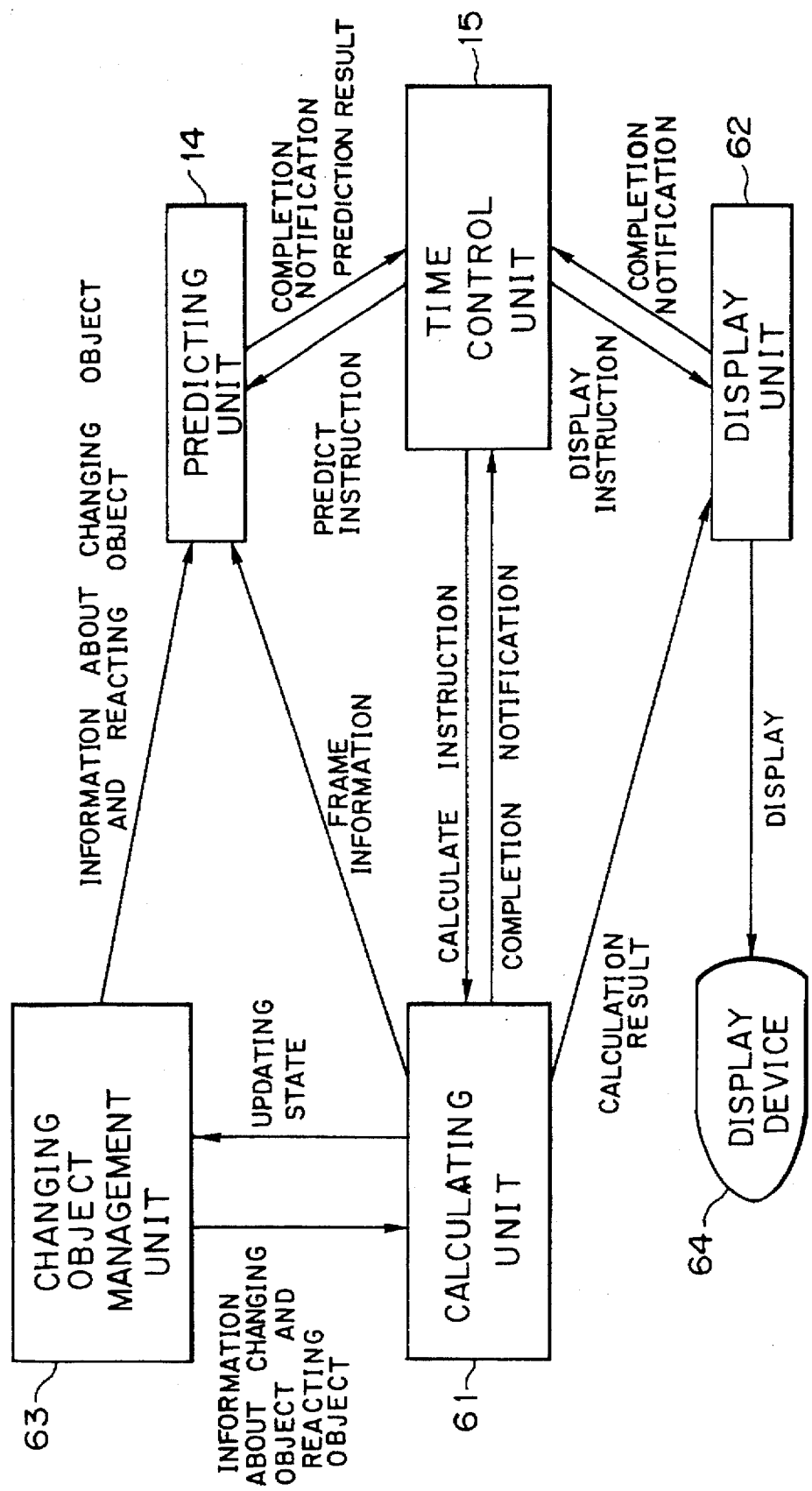
FIG. 26 shows the configuration according to the second embodiment of the present invention.

FIG. 26 shows the configuration of the second embodiment of the present invention.

The second embodiment is a CG data display system for generating and displaying image frames which change one after the other as time passes. The system comprises a calculating unit 61 for calculating CG data to be displayed, a display unit 62 for displaying a calculation result performed by the calculating unit 61, a predicting unit 14 for predicting the time at which a calculated frame is displayed, and a time control unit 15 for controlling the calculating unit 61 and the display unit 62 based on the prediction output by the predicting unit 14, and controlling time relating to the display of dynamic images.

The time control unit 15 controls the calculation of the n-th frame performed by the calculating unit 61 and the display of the (n−1)th frame on the display unit 62 such that these processes are concurrently performed. It changes the interval of the display of frames according to the prediction output by the predicting unit 14.

The time control unit 15 predicts the frame display time using the predicting unit 14 before actual calculation to set time of a world to be displayed through computer graphics corresponding to the logically described actual time. Setting the time of the displayed world corresponding to the actual time means that an image generated through CG data corresponding to a time is displayed at the time when the CG data corresponding to the time is obtained through calculation.

The time control unit 15 determines a frame display time before actual calculation according to the calculation process time and display process time predicted according to a past calculation process time and display process time.

Additionally, the time control unit 15 compares for each step a prediction result with an actual time, and amends the discrepancy between the display time and the actual time by a display delaying process or a display skipping process.

The time control unit 15 also checks for each step the reversion of the time correlation between the predicted display time of the previous frame and the present frame. If it detects the reversion, the prediction is amended and the reversion of the time correlation through the calculation error of a prediction process can be amended.

The system in FIG. 26 further comprises a changing object management unit 63 for managing a changing object which dynamically changes and a reacting object which starts changing triggered by a changing object. The calculating unit 61 performs a state calculation according to the information received from the changing object management unit 63 about an object to be displayed.

In the CG data display method according to the second embodiment, the process of calculating dynamic image data to generate the n-th frame and the process of displaying the calculation result for the (n−1)th frame are performed in parallel. Before the calculation for each frame, the display time of the frame is predicted, and the time of the world to be displayed through computer graphics becomes to correspond to the actual time.

According to the second embodiment, to make the time of the CG-display world correspond to the time of the real world, the time taken for calculation and display is preliminarily predicted when data are calculated for frames so that appropriate pictures in the CG world can be generated for a predicted display time. At this time, a prediction is made with the frames arranged at shortest possible intervals such that smooth pictures can be generated. The calculation and display processes are concurrently performed.

Figure 27:
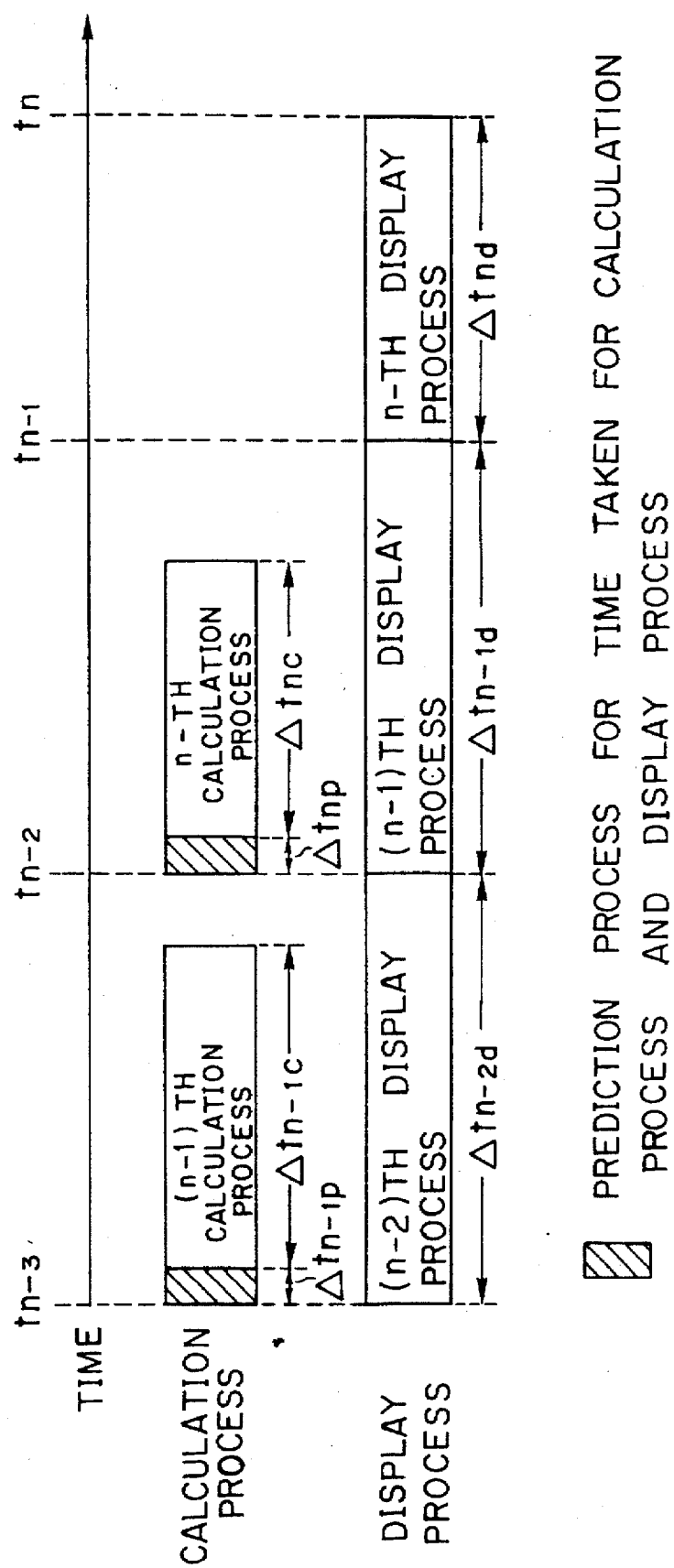
FIG. 27 shows the time relationship between the calculation process and the display process according to the second embodiment.

The horizontal axis in the time chart shown in FIG. 27 indicates the passing of actual time. As shown in FIG. 27, parallel processing can be performed by calculating data of a second forward frame of each frame at completion of displaying each frame. Thus, the frames can be displayed at the shortest possible intervals.

The correspondence to the real time can be maintained by predicting the calculation process time and the display process time. The calculation process time is predicted based on the number of objects, the complexity of a calculation method, etc. The display process time can be predicted based on the complexity of a frame, for example, the number of polygonal faces (polygons) of an object to be displayed, the number of textures, etc.

Dynamically managing a changing object which changes with time and a reacting object which starts changing with time as being triggered by another object efficiently accesses an object requiring calculation, thereby shortening the time taken for a calculation process.

Dynamically managing a changing object and a reacting object also efficiently accesses these objects when a calculation time is predicted, thereby considerably shortening the time taken for a prediction process.

As described above, according to the second embodiment, a calculation process and a display process are performed in parallel, and the display time of the calculated frame can be predicted before actual calculation. Therefore, frames can be arranged at as short interval as possible, and images can be displayed corresponding to the actual passing of time.

Described below is the method of predicting the time at which a frame is displayed according to the second embodiment.

In the present invention, the display process for the (n−1)th frame waits for the completion of the calculation of the frame and the completion of the display process of the (n−2)th frame as shown in FIG. 27. The calculation process for the n-th frame waits until the (n−1)th frame is calculated and calculated data of the frame is transferred to the display process for the frame. That is, the display process of (n−1)th frame and the calculation of the n-th frame are simultaneously started and performed in parallel. The calculation process time of the n-th frame and the display process time of the (n−1)th and n-th frames are predicted immediately before starting the calculation of the n-th frame.

The following symbols are used in the explanation below.

$t_n$: actual time at which the n-th frame is displayed $t'_n$: predicted value of $t_n$ $\Delta t_{nc}$: actual calculation process time of the n-th frame $\Delta t_{nd}$: actual display process time of the n-th frame $\Delta t'_{nc}$: predicted value of $\Delta t_{nc}$ $\Delta t'_{nd}$: predicted value of $\Delta t_{nd}$ $\Delta t_{np}$: process time taken for predicting the calculation process time of the n-th frame and the display process time of the (n−1)th and n-th frames At time $t_{n-2}$ at which the (n−2)th frame is displayed, obtained is the predicted value $t'_n$ for the display time $t_n$ of the n-th frame. $t_n$ indicates the time at which the display process of the n-th frame is completed. Since the n-th display process waits for the completion of the display process of the (n−1)th frame and the completion of the calculation process of the n-th frame the prediction equation for $t'_n$ is as n follows.

$$t'_n = t_{n-2} + \max(\Delta t'_{n-1d}, \Delta t_{np} + \Delta t'_{nc}) + \Delta t'_{nd} \quad (1)$$

where max (X, Y) indicates X or Y whichever is larger.

The predicted value $\Delta t'_{nc}$ of time needed for n-th frame calculation can be predicted according to the number of objects which change in the frame, and to the complexity of the calculation determined by the complexity of the calculation rules used in the frame. The predicted value $\Delta t'_{n-1d}$ of time needed for (n−1)th frame display is predicted according to the complexity of the frame determined based on the number of polygons, textures, etc. included in the (n−1)th frame. For example, in the animation operated by a key frame method, the position (X, Y, Z) between the position $(X_a, Y_a, Z_a)$ and the position $(X_b, Y_b, Z_b)$ of a moving object in the three-dimensional XYZ space is often calculated by linear interpolation. At this time, the position (X, Y, Z) is calculated by the following equation with a parameter $\lambda (0<\lambda<1)$ which can be defined using a time.

$$(X,Y,Z) = (X_a + [X_b - X_a]\lambda, Y_a + [Y_b - Y_a]\lambda, Z_a + [Z_b - Z_a]\lambda) \quad (2)$$

Subtractions, multiplications, and additions should be performed three times each to process equation (2).

Assuming the number of objects operated by the animation method in the n-th frame to be I, and the process time for each subtraction, multiplication, and addition to be T1, T2, and T3 respectively, $\Delta t'_{nc}$ can be calculated as follows.

$$\Delta t'_{nc} = 3 \cdot I \cdot T1 + 3 \cdot I \cdot T2 + 3 \cdot I \cdot T3 \quad (3)$$

Assume that the (n−1)th frame obtained in a calculation process contains three different types of textures, that is, I1 pieces of texture TX1, I2 pieces of texture TX2, and I3 pieces of texture TX3, that the process time for each texture is T4, T5, and T6 respectively, and that the number of polygons per frame is P and the process time per polygon is TP. If the display process time for the (n−1)th frame simply depends on the above described number of textures and polygons, then $\Delta t'_{n-1d}$ is calculated by the following equation (4).

$$\Delta t'_{n-1d} = P \cdot TP + I1 \cdot T4 + I2 \cdot T5 + I3 \cdot T6 \qquad (4)$$

$\Delta t'_{nd}$ cannot be predicted according to the complexity of the n-th frame because the calculation process for the n-th frame has not been completed. Therefore, it should be approximated by any appropriate method. For example, the display time of serial frames are approximated to be equal, and the predicted value $\Delta t_{n-1d}$ for the display process time of the previous frame is used as $\Delta t'_{nd}$.

The prediction process is performed as described above. An easier method does not obtain a predicted value in accordance with the complexity of a frame or the complexity in calculation, but determines the display time of the n-th frame using a past display process time and a past calculation time. For example, the following equation (5) can be used instead of equation (1).

$$t'_n = t_{n-2} + \max(\Delta t_{n-2d}, \Delta t_{n-1c}) + \Delta t_{n-2d} \qquad (5)$$

where $\Delta t_{n-2d}$ and $\Delta t_{n-1c}$ are the latest actual values of the display process time and calculation process time respectively obtained at $t_{n-2}$. In equation (5), $\Delta t_{n-1c}$ can be replaced with $\Delta t_{n-1p} + \Delta t_{n-1c}$.

Appropriately weighting the actual value of the past display process time and the actual value of the past calculation process time can also provide the display time of the n-th frame. The CG data corresponding to the predicted display time $t'_n$ of the n-th frame is calculated by the calculation process of the n-th frame. If the actual display time $t_n$ is nearly equal to the predicted display time $t'_n$, then dynamic images are displayed correspondingly to the actual time.

Thus, the display time of the n-th frame is predicted, and the discrepancy between the predicted value and the actual time value is amended as follows. That is, since the calculation process fop the (n−1)th frame has been completed at time $t_{n-2}$, the display process time of the (n−1)th frame can be estimated at time $t_{n-2}$ more precisely than at time $t_{n-3}$. When the reestimated value for the display process time of the (n−1)th frame is $\Delta t''_{n-1d}$ and the value predicted using $\Delta t''_{n-1d}$ for the display time of the (n−1)th frame is $t''_{n-1}$, the following equation holds.

$$\Delta t''_{n-1} = t_{n-2} + \Delta t''_{n-1d} \qquad (6)$$

Then, the discrepancy between the $t''_{n-1}$ and the time $t'_{n-1}$ used in the calculation process is calculated. If the newly predicted display time $t''_{n-1}$ for the (n−1)th frame is earlier than the time $t'_{n-1}$, that is $t''_{n-1} < t'_{n-1}$, then the display of the (n−1)th frame is delayed by $\Delta t_{gain}$, where $\Delta t_{gain}$ is defined as follows.

$$\Delta t_{gain} = t'_{n-1} - t''_{n-1} \qquad (7)$$

On the other hand, if it is later than the time $t'_{n-1}$, that is, then $t''_{n-1} > t'_{n-1}$, then it is determined whether or not $\Delta t_{lose}$ defined by the following equation is equal to or larger than a predetermined threshold.

$$\Delta t_{lose} = t''_{n-1} - t'_{n-1} \qquad (8)$$

If yes, the (n−1)th frame is not displayed and the display of the next n-th frame is prepared.

Figure 28:
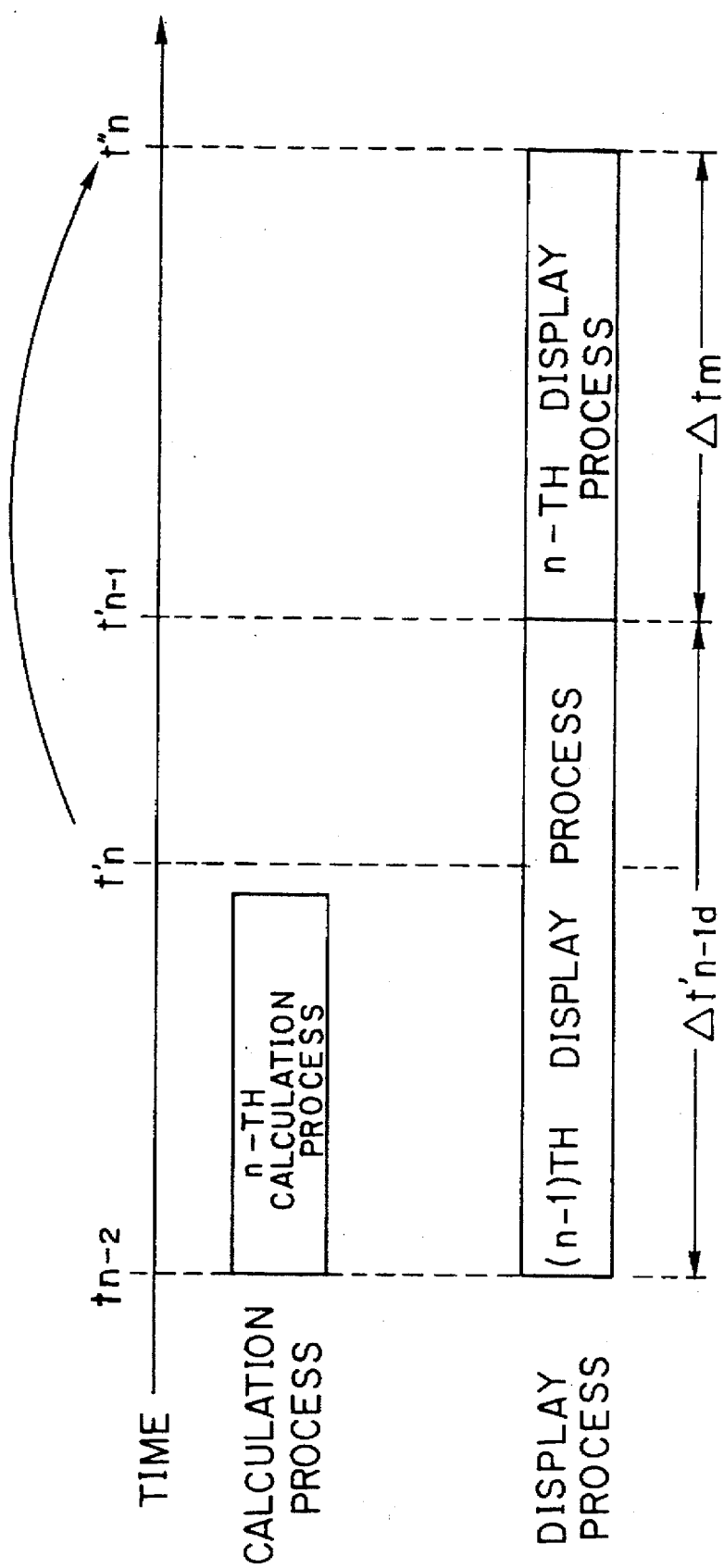
FIG. 28 shows an example of a process performed when a prediction error generates the inversion of time in the second embodiment.

The reversion of time can arise as shown in FIG. 28 due to a prediction error resulting in $t'_n < t'_{n-1}$. At this time, $t'_n$ should be amended into $t''_n$ so that $t'_n > t'_{n-1}$ can hold. The value of $t''_n$ can be calculated by the following equation.

$$t''_n = t'_{n-1} + \Delta t_m \qquad (9)$$

where $\Delta t_m$ is, for example, a predicted value $\Delta t'_{nd}$ of the time taken for the display of the n-th frame.

With the configuration shown in FIG. 26, dynamic images are generated and displayed using the above described prediction result under the control as follows. In each process cycle, a calculation process is performed on the second forward frame from the frame which has just been displayed, while a display process is performed on the next frame to the frame which has just been displayed as shown in FIG. 27. That is, at time $t_{n-2}$ when the (n−1)th calculation process and the (n−2)th display are completed, the prediction process for the n-th calculation process, the n-th calculation process, and the (n−1)th display process can be concurrently performed in the next cycle.

The time control unit 15 issues to the predicting unit 14 a predict instruction to predict the calculation and display process time, and receives a prediction result and a completion notification. At the completion notification, the time control unit 15 obtains the time $\Delta t_{np}$ taken for the prediction by the predicting unit 14. The time control unit 15 calculates, according to the prediction result for the calculation and display process time, the time $t'_n$ at which the n-th frame is displayed. Then, it issues to the calculating unit 61 a calculate instruction to perform a calculation process on the frame at the time $t'_n$, and receives a completion notification at the completion of the calculation. Thus, the time control unit 15 obtains the actual time $\Delta t_{nc}$ taken for the calculation of the n-th frame.

The time control unit 15 issues to the display unit 62 a display instruction to display the (n−1)th frame, and receives a completion notification from the display unit 62 upon completion of the display. Thus, the time control unit 15 obtains the actual time $\Delta t_{n-1d}$ taken for the display of the (n−1)th frame.

The changing object management unit 63 manages a changing object and a reacting object, and notifies the predicting unit 14 and the calculating unit 61 of the information about the changing and reacting objects.

Upon receipt of a predict instruction from the time control unit 15, the predicting unit 14 predicts the calculation process time for the n-th frame and the display process time for the (n−1)th and the n-th frames, and transmits to the time control unit 15 the prediction results and the prediction process completion notification. The predicting unit 14 obtains from the changing object management unit 63 the information about a changing object and a reacting object for use in predicting calculation process time, and obtains from the calculating unit 61 the frame information about, for example, the number of polygons for use in predicting display process time.

The calculating unit 61 performs a calculation process for a frame at a time specified by the time control unit 15, and transmits the calculation result to the display unit 62. If the display process has not been completed yet by the display unit 62, then the calculating unit 61 waits for the completion of the display process to transmit the calculation result. If the calculation result has been transmitted, the calculating unit 61 sends the completion notification to the time control unit 15. During the calculation process, the calculating unit 61 receives from the changing object management unit 63 a list of changing and reacting objects, performs a trigger check on reaction objects, adds a triggered object as a changing object into a changing object list, and calculates the change of CG data of changing objects.

Upon receipt of a display instruction from the time control unit 15, the display unit 62 displays on the display device 64 the result received from the calculating unit 61. When the display process is completed, the display unit 62 transmits a completion notification to the time control unit 15.

Described below in detail is the processes performed by each of the units shown in FIG. 26.

Figure 29:
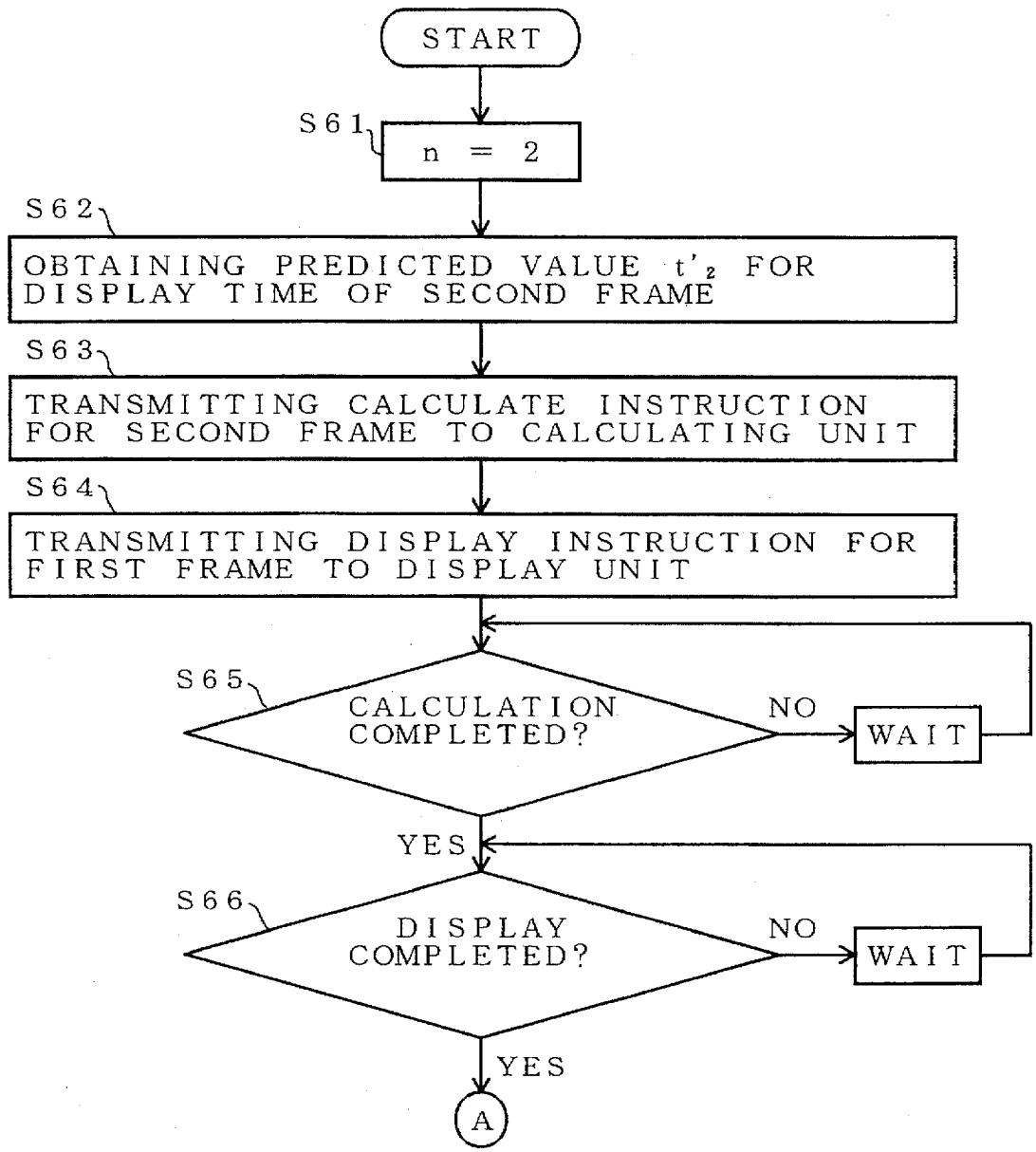
FIGS. 29 and 30 are the process flowchart of the time control unit.
Figure 30:
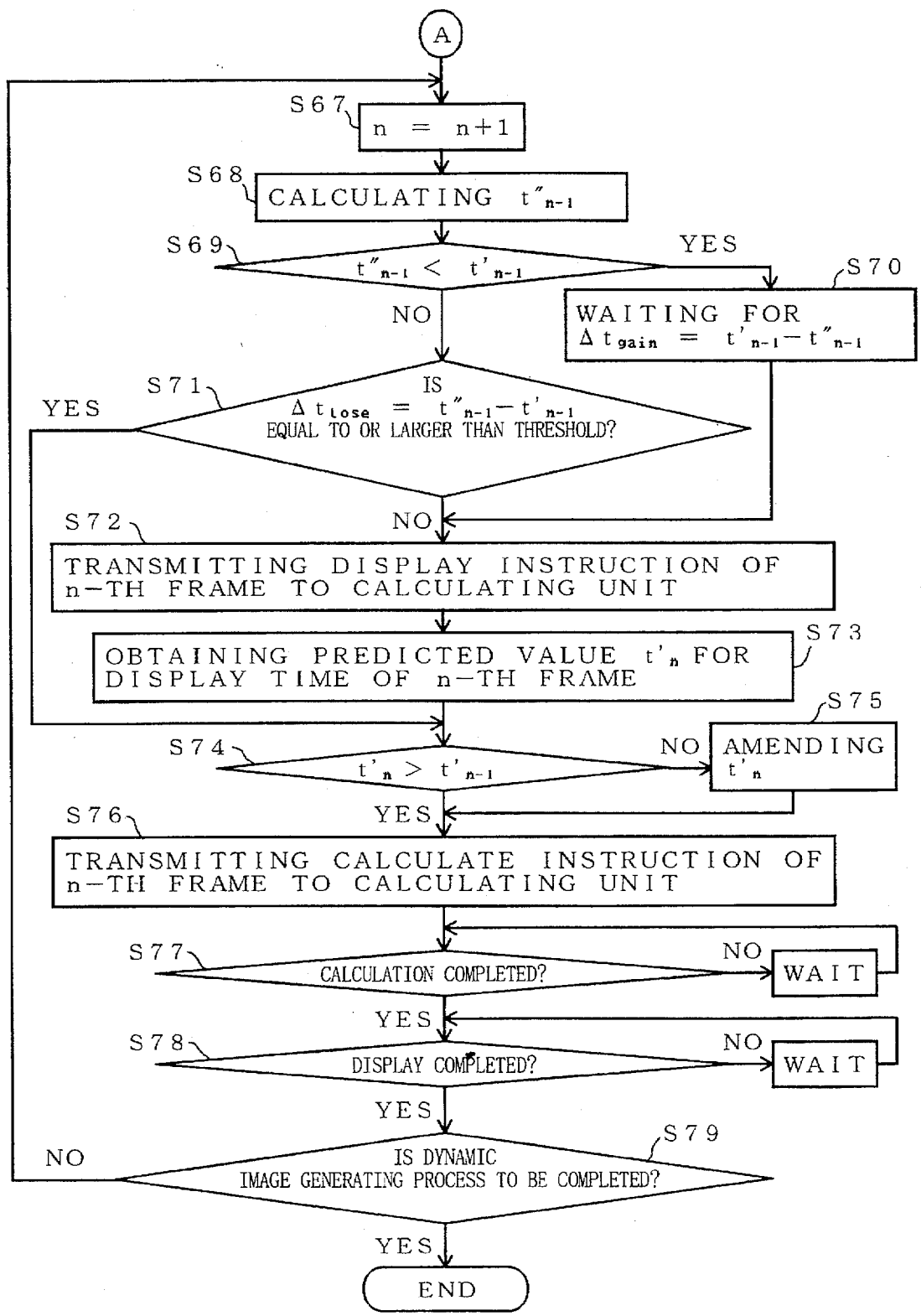

FIGS. 29 and 30 show the flowchart of the process performed by the time control unit 15.

The following processes are performed in steps S61 through S79 shown in FIGS. 29 and 30. The first frame is assumed to have been displayed already.

S61: The value of the ordinal number n of a frame is initialized to two "2".

S62: A predict instruction is transmitted to the predicting unit 14 to obtain a prediction result ($\Delta t'_{1d}$ and $\Delta t'_{2d}$ predicted for the display process time of the first and second frames respectively, and $\Delta t'_{2c}$ predicted for the calculation process time of the second frame). The time $\Delta t_{2p}$ taken for the prediction process is measured. The obtained values are applied to equation (1) to calculate the predicted display time $t'_2$ of the second frame. The current time $t_0$ is assumed to be zero (0).

S63: The calculate instruction for the second frame is transmitted to the calculating unit 61.

S64: The display instruction for the first frame is transmitted to the display unit 62.

S65: It is checked whether or not the calculation for the second frame has been completed. If yes, control is passed to step S66. If no, it is checked again whether or not the calculation has been completed after a predetermined time passes.

S66: It is checked whether or not the display of the first frame has been completed. If yes, control is passed to step S67 shown in FIG. 30. If no, it is checked again whether or not the display has been completed after a predetermined time passes.

S67: n is incremented by one.

S68: $t_{n-2}$ indicates the time at which the display process of the (n−2)th frame is completed. Then, the display time $t'_{n-1}$ predicted in the previous cycle for the (n−1)th frame is reestimated by equation (6) to amend the discrepancy between the actual time $t_n$ at which the n-th frame is actually displayed and the predicted display time $t'_n$. The reestimated time is $t''_{n-1}$.

S69: It is determined according to the reestimated value $t''_{n-1}$ and the previously predicted value $t'_{n-1}$ whether the predicted value is earlier or later than the actual time. If the actual process is completed earlier than the predicted time (if $t''_{n-1} < t'_{n-1}$), then control is passed to step S70. If the actual process takes a longer time than it is predicted (if $t''_{n-1} > t'_{n-1}$), then control is passed to step S71.

S70: The waiting time $\Delta t_{gain} = t'_{n-1} - t''_{n-1}$ up to the start of the (n−1)th display process is calculated. When the waiting time has passed, control is passed to step S72.

S71: The delayed process time $\Delta t_{lose} = t''_{n-1} - t'_{n-1}$ is calculated, and it is compared with a predetermined threshold. If it is smaller than the threshold, then control is passed to step S72. If it is larger than the threshold, then control is passed to step S73.

S72: An instruction to display the (n−1)th frame is transmitted to the display unit 62.

S73: A predict instruction is transmitted to the predicting unit 14 and obtains a prediction result ($\Delta t'_{n-1d}$ and $\Delta t'_{nd}$ predicted for the display process time of the (n−1)th and n-th frames respectively, and $\Delta t'_{nc}$ predicted for the calculation process time of the second frame). The time $\Delta t_{np}$ taken for the prediction process, and the time $t_{n-2}$ are measured. The obtained values are assigned to equation (1) to calculate the predicted display time $t''_n$ of the n-th frame.

If the time control unit 15 waits for the display process by time $\Delta t_{gain}$ in step S70 then $t'_n$ is calculated by the following equation instead of equation (1).

$$t'_n = t_{n-2} + \max(\Delta t'_{n-1d} + \Delta t_{gain}, \Delta t_{np} + \Delta t'_{nc}) + \Delta t'_{nd} \quad (10)$$

In step S71, if $\Delta t_{lose}$ is larger than the threshold, then the (n−1)th frame is not displayed, and $t'_n$ is calculated by the following equation instead of equation (1).

$$t'_n = t_{n-2} + \Delta t_{np} + \Delta t'_{nc} + \Delta t'_{nd} \quad (11)$$

S74: $t'_n$ is compared with $t'_{n-1}$ as to which is larger or smaller. If $t'_n > t'_{n-1}$, then control is passed to step S76. If $t'_n < t'_{n-1}$, then control is passed to step S75.

S75: Since the n-th frame should be displayed after the (n−1)th frame, $t'_n$ should be amended to $t''_n$ by equation (9) such that $t'_n > t'_{n-1}$ holds S76: An instruction to calculate the n-th frame is transmitted to the calculating unit 61.

S77: It is determined whether or not the calculation for the n-th frame has been completed. If yes, then control is passed to step S78. If no, it is checked again after a specified time has passed whether or not the calculation has been completed.

S78: It is determined whether or not the display of the (n−1)th frame has been completed. If yes, control is passed to step S79. If no, it is checked again after a specified time has passed whether or not the display has been completed.

S79: If the calculation and the display have been completed, it is checked whether or not the dynamic image generating process should be completed. If not, control is passed to step 67, and the processes are repeated for the next frame.

If $\Delta t_{lose}$ is equal to or larger than the threshold in step S71, then the display process of the (n−1)th frame is omitted by skipping step S72 and the calculation result for this frame is deleted. Accordingly, it is not necessary to wait for the completion of the display process of the (n−1)th frame in step S78, and so control is passed to step S79 immediately upon completion of the calculation process of the n-th frame.

Figure 31:
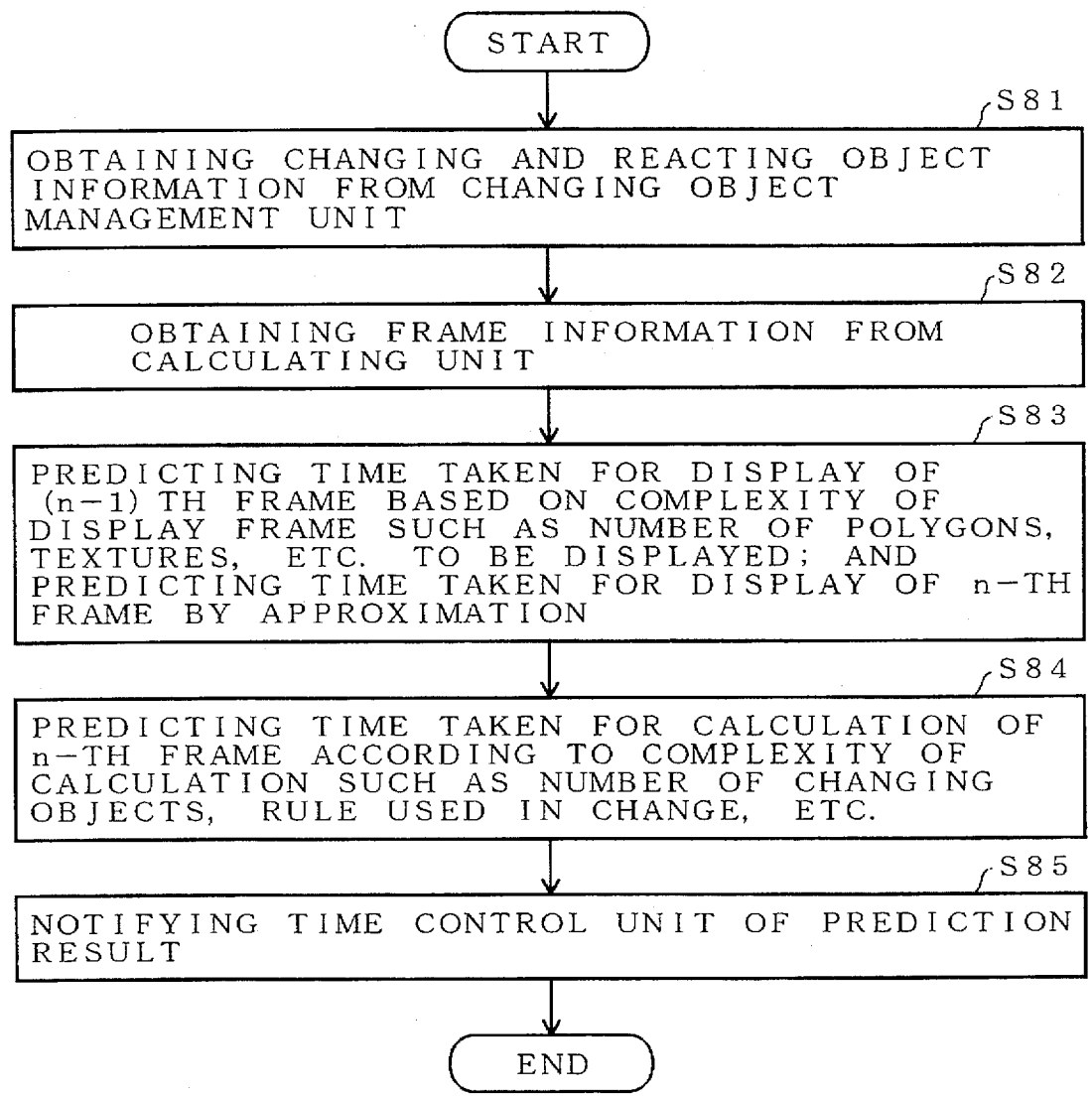
FIGS. 31 is the process flowchart of the predicting unit.

FIG. 31 shows the process performed by the predicting unit 14. Each of the steps S81 through S85 shown in FIG. 31 performs the following processes.

S81: Information about changing and reacting objects is obtained from the changing object management unit 63.

S82: Frame information, for example, the number of polygons, the number and the size of textures, etc. of a displayed object is obtained from the calculating unit 61.

S83: The display process time $\Delta t'_{n-1d}$ of the (n−1)th frame is predicted by estimating the complexity of the frame according to the frame information obtained in step S82. The correlation between the number of polygons, the number and the size of textures, etc. and display process time is preliminarily estimated from the performance of the hardware which performs a display process. The display process time $\Delta t'_{nd}$ of the n-th frame is estimated by, for example, an approximation method using equal display process times for frames.

S84: The time $\Delta t'_{nc}$ taken for the calculation process of the n-th frame is estimated according to the number of changing objects and reacting objects, and the complexity of the rules used in checking a change and a trigger. The correlation between calculation process time and the number of changing objects and reacting objects, and the complexity of the rules is preliminarily estimated from the performance of the hardware which performs a calculation process.

S85: A prediction result is provided for the time control unit 15.

Figure 32:
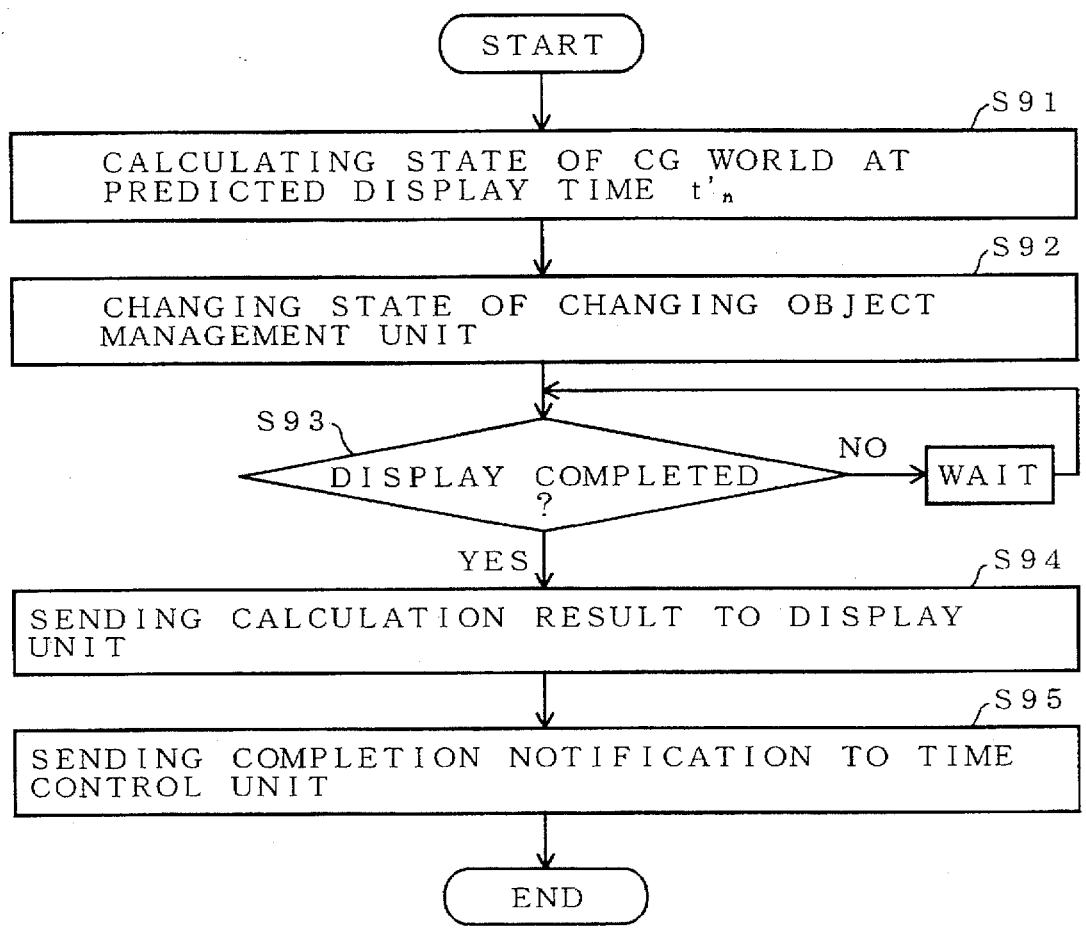
FIG. 32 is the process flowchart of the calculating unit.

FIG. 32 shows the flow of the processes performed by the calculating unit 61. The following processes are performed in steps S91 through S95 shown in FIG. 32.

S91: When a calculate instruction is issued, the state of the CG world at the predicted display time $t'_n$ provided by the time control unit 15 is calculated.

S92: The state of the changing object management unit 63 is changed. Practically, a trigger, for example, a clash arises and a reacting object which starts changing is added to changing objects. An object which has stopped after a change should be deleted from the changing object list.

S93: It is checked whether or not the display of the previous frame has been completed. If yes, control is passed to step 94. If no, it is checked again after a specified time has passed whether or not the display has been completed.

S94: A calculation result is transmitted to the display unit 62.

S95: The time control unit 15 is informed of the completion of the calculation process.

Figure 33:
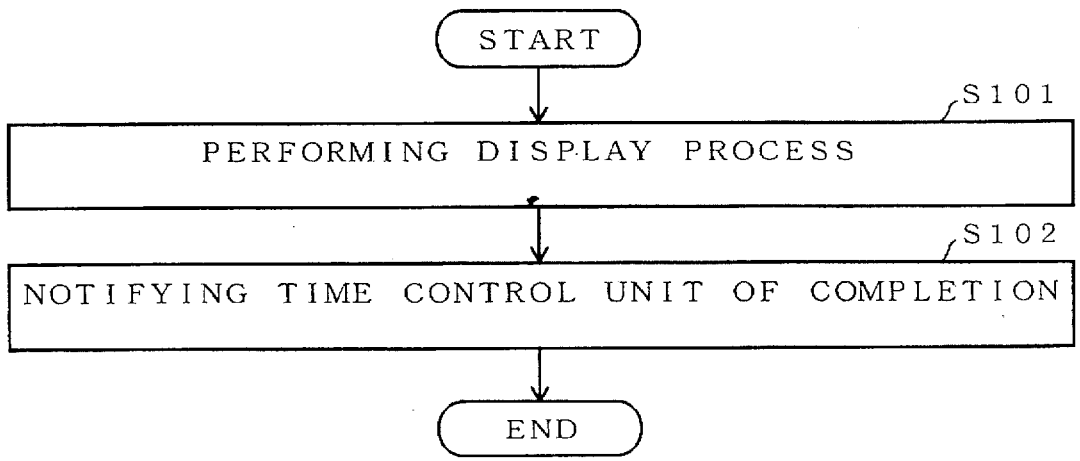
FIG. 33 is the process flowchart of the display unit.

FIG. 33 shows the flow of the processes performed by the display unit 62. In steps S101 and S102 shown in FIG. 33, the following processes are performed.

S101: Data are displayed on the display device 64 based on the calculation result transmitted from the calculating unit 61.

S102: The time control unit 15 is informed of the completion of the display process.

Figure 34:
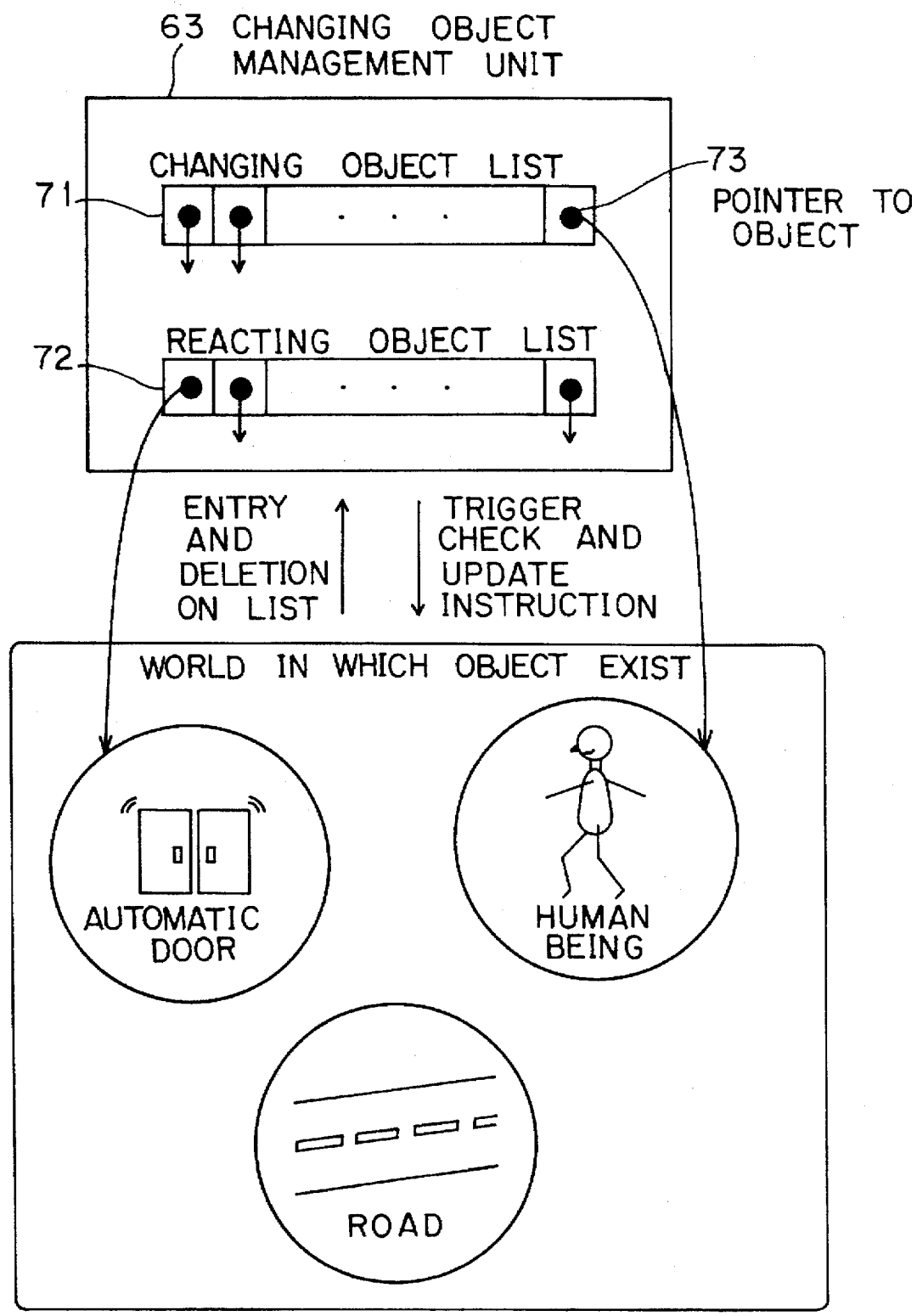
FIG. 34 shows the changing object management unit.

FIG. 34 is the explanatory view of the changing object management unit 63.

The changing object management unit 63 manages a changing object list 71 and a reacting object list 72. Each of the lists 71 and 72 describes objects, that is, its elements. For example, it is realized using a pointer of C language. Each object is, for example, a human being, an automatic door, a road, etc. to be displayed. practically, they are generated by CG data groups, for example, form data, physical data, various attribute data, position data, etc. required to display dynamic images. The changing object list 71 and the reacting object list 72 use pointers 73 to the objects. As described above, the calculating unit 61 performs a trigger check on a reacting object, that is, an element pointed to from the list, and adds a triggered reacting object to the changing object list 71. Then, a state change is calculated on a changing object, that is, an element of the changing object list 71.

Figure 35:
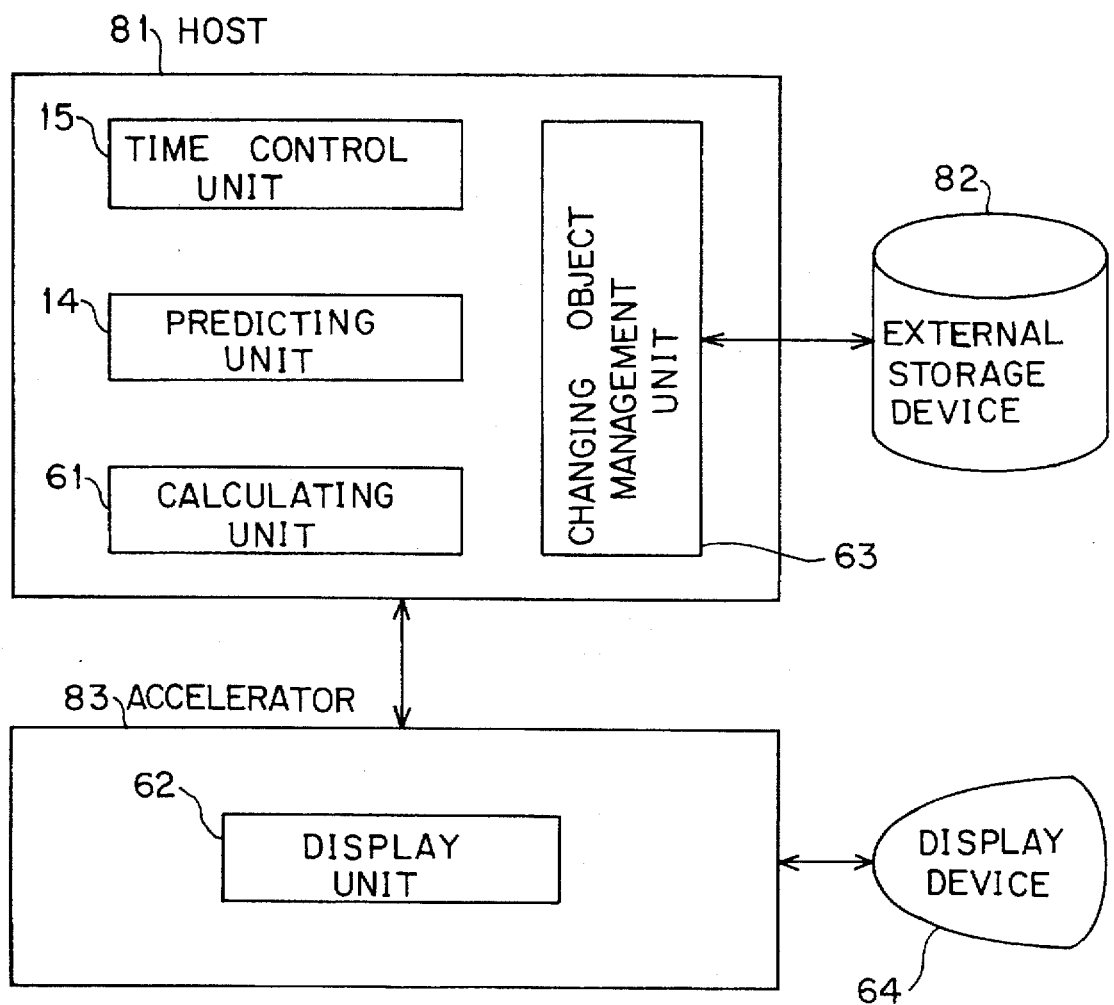
FIG. 35 shows an example of the configuration of the system according to the second embodiment.

FIG. 35 shows a practical example of a system configuration according to the second embodiment.

A host 81 is composed of a single processor or multiple processors. The host 81 comprises the time control unit 15, the predicting unit 14, the calculating unit 61, and the changing object management unit 63. An accelerator 83 is a processor exclusively for graphic display. The display unit 62 is provided in the accelerator 83. An external storage device 82, for example, a magnetic disc storage device stores object information. The changing object management unit 63 manages the object information read from the external storage device 82. The display device 64 is connected to the accelerator 83.

As described above, data can be displayed at shorter intervals according to the second embodiment than the conventional methods by concurrently performing a calculating process and a display process. Furthermore, a display time of a frame can be predicted to obtain CG data to be displayed at the predicted display time, thereby realizing the correspondence between the time in a CG-displayed world and the actual time. A calculating process and a display process do not necessarily have to be performed concurrently. That is, a calculation process of a frame can be started after a display process of the previous frame has been completed. In this case again, the time of the displayed world corresponds to the actual time by predicting the display time. Since a changing object management unit realizes access to a necessary object which requires a calculation process for a states change or a trigger check, an efficient states calculating process and predicting process can also be realized. Thus, a CG-displayed world can be displayed correspondingly to the actual time without affecting the realistic representation on a screen, and realistic images can be generated with an actual time flow regenerated on a display device.

Figure 36:
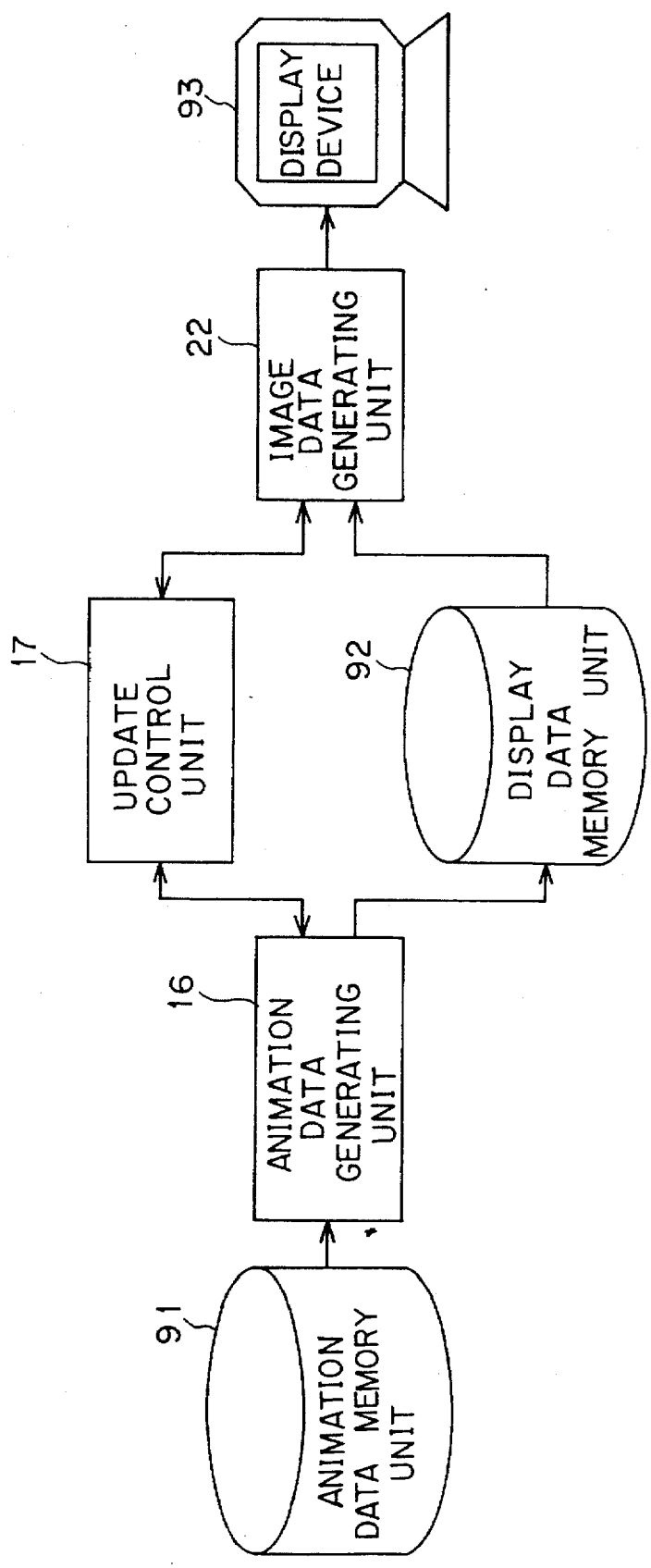
FIG. 36 shows the configuration of the important portion according to the third embodiment of the present invention.

FIG. 36 shows the configuration of the CG data display according to the third embodiment of the present invention. According to the third embodiment, an animation generating device generates dynamic images using a computer system. The animation generating device comprises an animation data memory unit 91 for storing object data for representing the movement and transformation of objects and the types of animation methods based on the rules for processing the object data, an animation data generating unit 16 for calculating the form, position, and attribute of an object in a specified frame at a specified time according to the object data and an animation method, a display data memory unit 92 for storing data calculated by the animation data generating unit 16, an image data generating unit 22 for generating image data from the data stored in the display data memory unit 92, an update control unit 17 for controlling the number of objects simultaneously calculated by the animation data generating unit 16 and outputting to the image data generating unit 22 a request to generate animation images after the animation data generating unit 16 has calculated, for example, the forms of an optional number of objects, and a display device 93 for displaying the generated image data.

According to the third embodiment, the animation data memory unit 91 stores data for the movement and transformation of an object and the types of animation method of changing the movement of an object based on respective rules. The animation data generating unit 16 calculates using these data the states (form and position) of an object at a specified time or in a specified frame. The display data memory unit 92 stores the data calculated by the animation data generating unit 16. The image data generating unit 22 generates image data from the data stored in the display data memory unit 92. The update control unit 17 controls the number of objects simultaneously calculated by the animation data generating unit 16 and outputs to the image data generating unit 22 a request to generate animation images after the animation data generating unit 16 has calculated an optional number of objects. The display device 93 displays the generated image data. Thus, a display is not rewritten at time after calculating the movement and transformation of all objects, but the number of image displays is increased to realize smooth and realistic animation.

Described below is the operation of the CG data display device shown in FIG. 36.

The animation data memory unit 91 stores various object data for animation. The object data contain information about the form, position, and attribute (for example, the color of the surface) of an object, and changes of the object with time.

The animation data generating unit 16 receives the data stored in the animation data memory unit 91 and a specific time T, the number of simultaneously updated objects, and the number of objects already updated at time T from the update control unit 17, and calculates the form, position, and attribute of an object at time T. Then, the animation data generating unit 16 performs calculation processes on the updated objects, and stores the results in the display data memory unit 92.

The display data memory unit 92 stores CG data indicating states of objects in a frame. A state of an object includes data of the form, position, attribute, etc. of an object.

The image data generating unit 22 generates image data from the data stored in the display data memory unit 92, and displays them on the display device 93.

The update control unit 17 obtains time T, the number of simultaneously updated objects, and the number of objects already updated at time T, and issues a request to generate data to the animation data generating unit 16. The update control unit 17 amends (updates) the number of objects updated at time T using the return value from the animation data generating unit 16. Then, it outputs to the image data generating unit 22 a request to generate image data.

Figure 37:
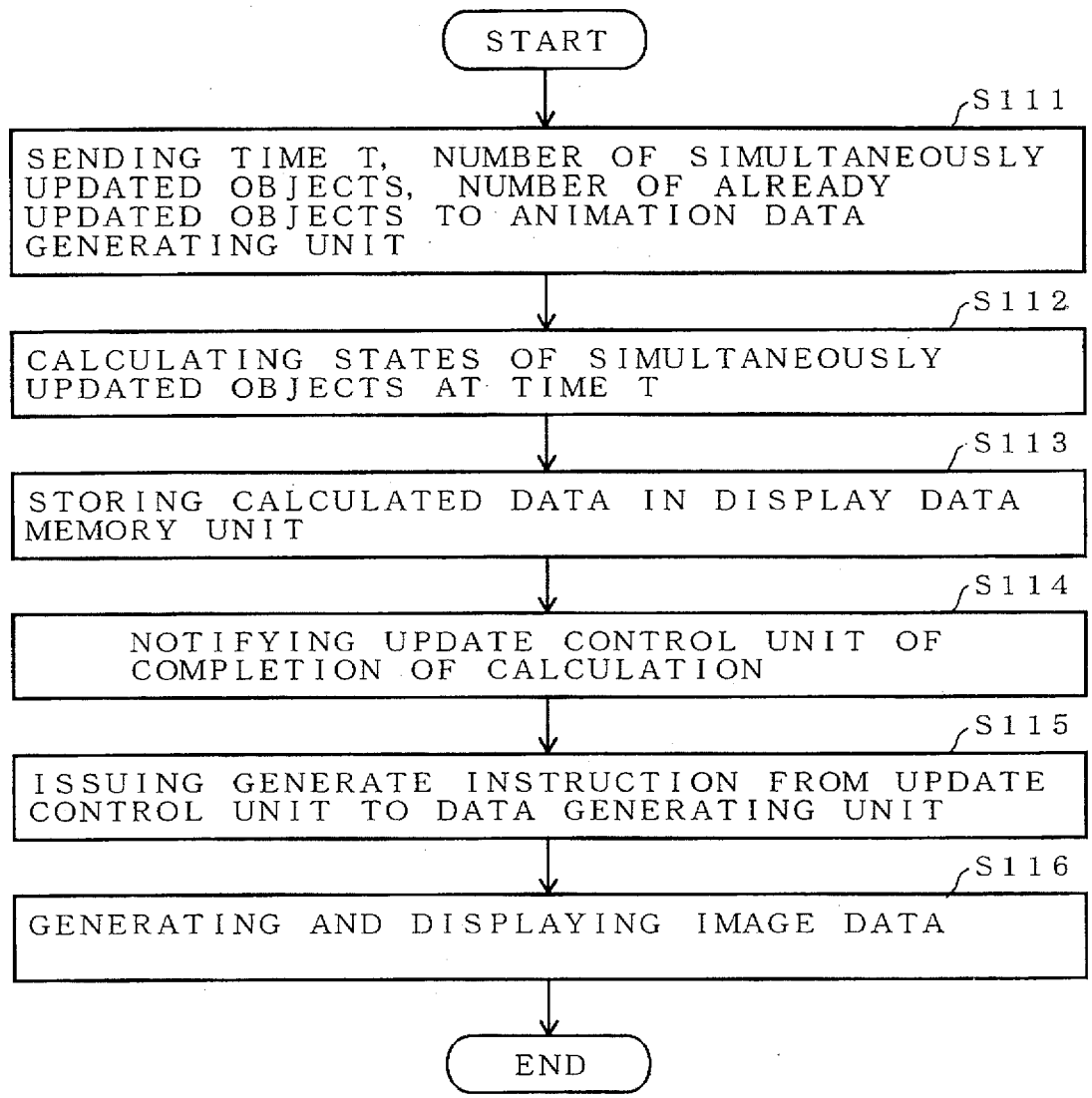
FIG. 37 is the process flowchart of the device according to the third embodiment.

FIG. 37 is the flowchart of the processes performed by the CG data display device shown in FIG. 36. These process steps correspond to the processes performed to output a single image frame. Animation can be displayed by repeating the processes.

The processes in step S111 are performed by the update control unit 17. The update control unit 17 obtains time T, the number of simultaneously updated objects (number of objects to be updated), and the number of objects already updated at time T (number of updated objects). It transmits these data to the animation data generating unit 16, and instructs the animation data generating unit 16 to calculate the status of the object at time T.

The processes in step S112 are performed by the animation data generating unit 16. The animation data generating unit 16 calculates the status of an object at time T received from the update control unit 17. Here, only object data of the number of simultaneously updated objects are calculated. The animation data generating unit 16 has a list of objects changing with time in form, position, or attribute with time, removes the objects already updated at time T from the list, and calculates the state of remaining objects.

The processes in step S113 are performed by the animation data generating unit 16. The animation data generating unit 16 stores the calculated data in the display data memory unit 92. The display data memory unit 92 stores the form, position, and attribute of an object as display data. As information about objects not yet calculated stored data which is not updated.

The processes in step S114 are performed by the animation data generating unit 16. The animation data generating unit 16 checks whether or not the calculation of the status of all objects at time T has been completed with the present data calculation, and informs the update control unit 17 of the checking result.

The processes in step S115 are performed by the update control unit 17. Upon receipt of the completion information about the calculation of the state at time T from the animation data generating unit 16, the update control unit 17 updates time T if the calculation has been completed, and adds the number of simultaneously updated objects to the number of objects already updated at time T if the calculation has not been completed yet. After the process, the update control unit 17 issues a request to generate data to the image data generating unit 22.

Figure 38:
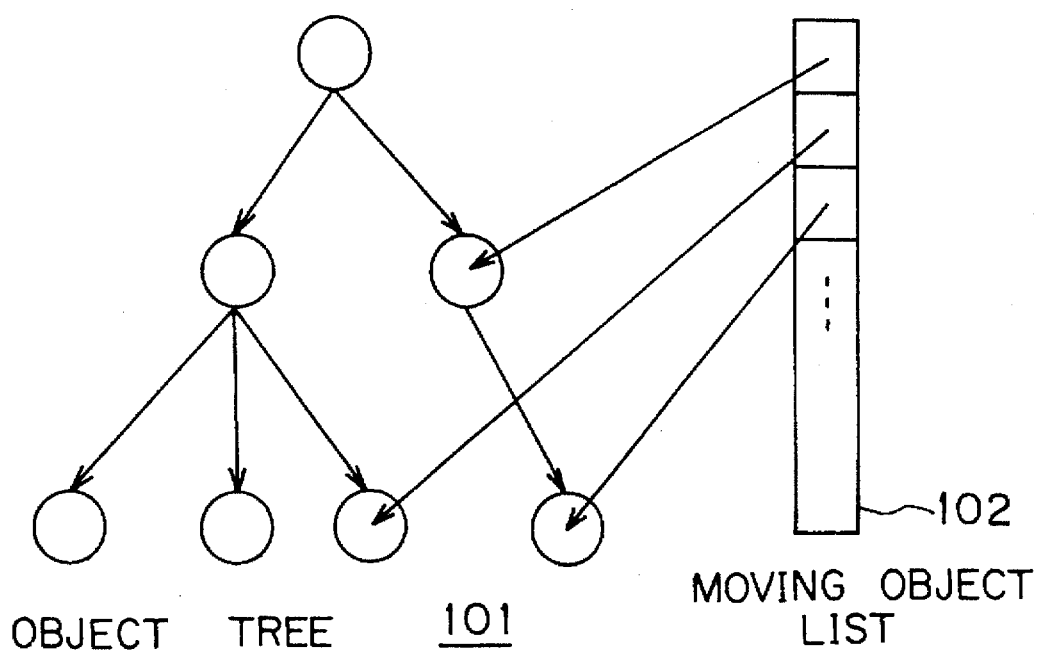
FIG. 38 shows the data structure of the animation data storage unit shown in FIG. 36.

The processes in step S116 are performed by the image data generating unit 22. The image data generating unit 22 generates image data from the display data and displays them on the display device 93. FIG. 38 shows the contents of the data stored in the animation data memory unit 91 shown in FIG. 36. An object tree 101 shown in FIG. 38 is the tree structure of objects in a CG world stored in the animation data memory unit 91. Each object can inherit a surface attribute (color, texture, etc. of the surface) and a position by being provided with its parent object or child object. That is, the surface attribute of a parent is inherited by its child. For example, if a parent is red, then its child is also red unless the color of the child is otherwise specified.

A moving object list 102 lists objects moving or changing in the object tree 101. That is, a calculation process is performed to generate animation data of the objects on the moving object list 102.

Figure 39:
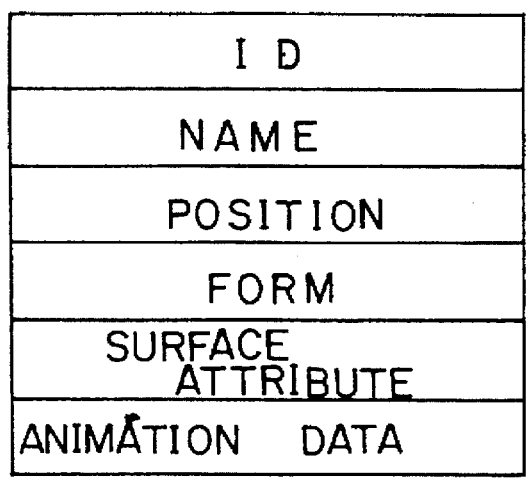
FIG. 39 shows the contents of each object.

FIG. 39 shows the contents of the object data of each object. An ID is an identification number of an object, and a surface attribute is, for example, an attribute of the color of the surface of an object. The position, form, and surface attribute data shown in FIG. 39 are three-dimensional geometric data. The geometric data are the basic data of animation. A moving object is represented by animation data in addition to the above described geometric data.

Figures 40, 41:
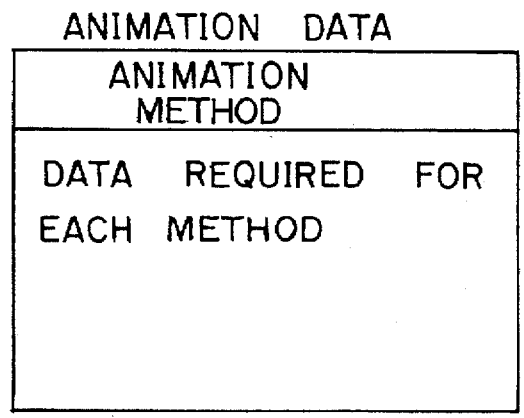
FIG. 40 shows the animation data.
FIG. 41 is the correspondence list of the animation method and the data.

FIG. 40 shows animation data. The animation data for generating dynamic images are composed of animation methods for generating dynamic images and the data required for the methods. FIG. 41 shows the types of animation methods.

FIG. 41 is the correspondence table of animation methods There are a number of animation methods, for example, a dynamics method (a technique according to physics rules), a key frame method, etc. which are well-known. The dynamics method requires gravity data and center-of-gravity data. The key frame method requires position data of an object in a key scene (a key frame). There are generally a plurality of key scenes, and correspondingly a plurality of position data are required.

In addition to these methods, form change data through an FFD and a skeleton can be stored as animation data. The animation data generating unit 16 shown in FIG. 36 generates display data from the animation data. The animation data generating unit 16 generates display data according to an instruction from the update control unit 17. The update control unit 17 controls the number of simultaneously calculated display data and issues to the animation data generating unit 16 an instruction to generate display data.

Figure 42:
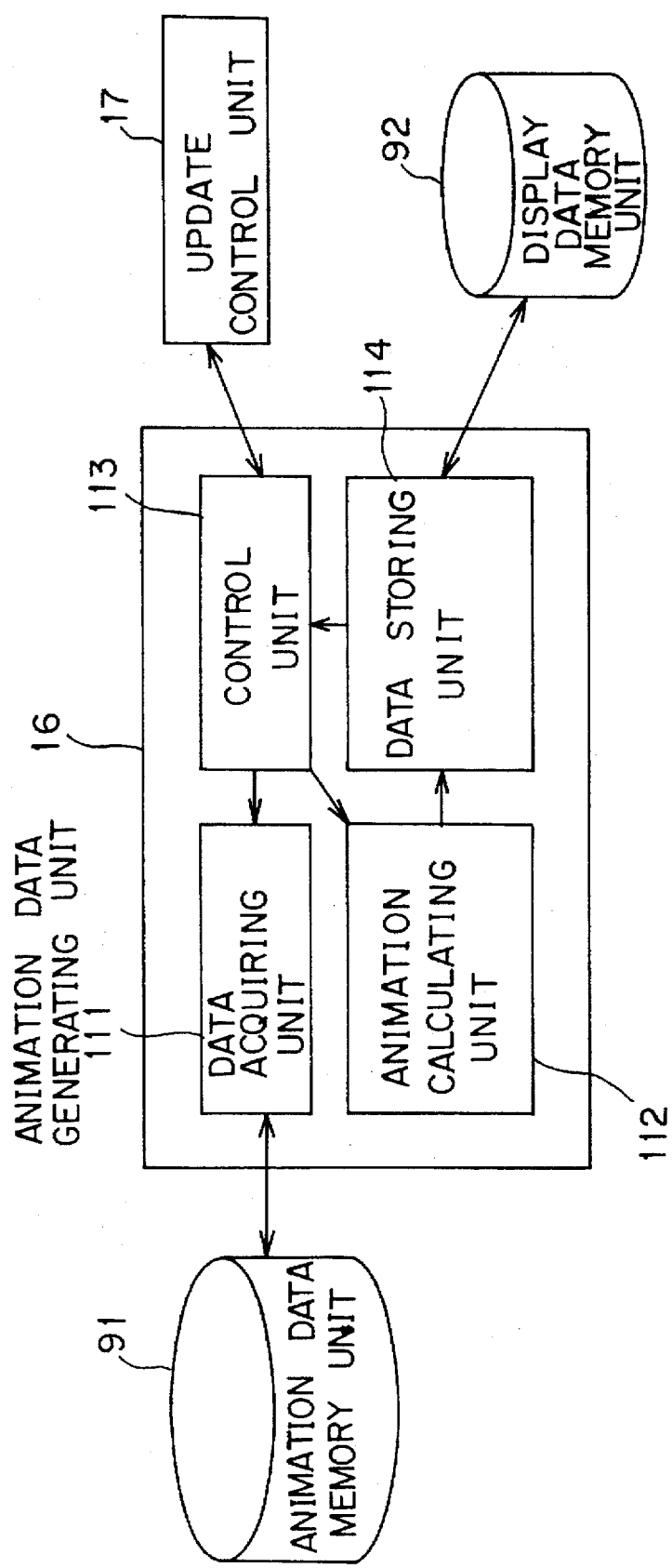
FIG. 42 shows an example of the internal configuration of the animation data generating unit shown in FIG. 36.

FIG. 42 shows an example of an internal configuration of the animation data generating unit 16 shown in FIG. 36.

Figure 43:
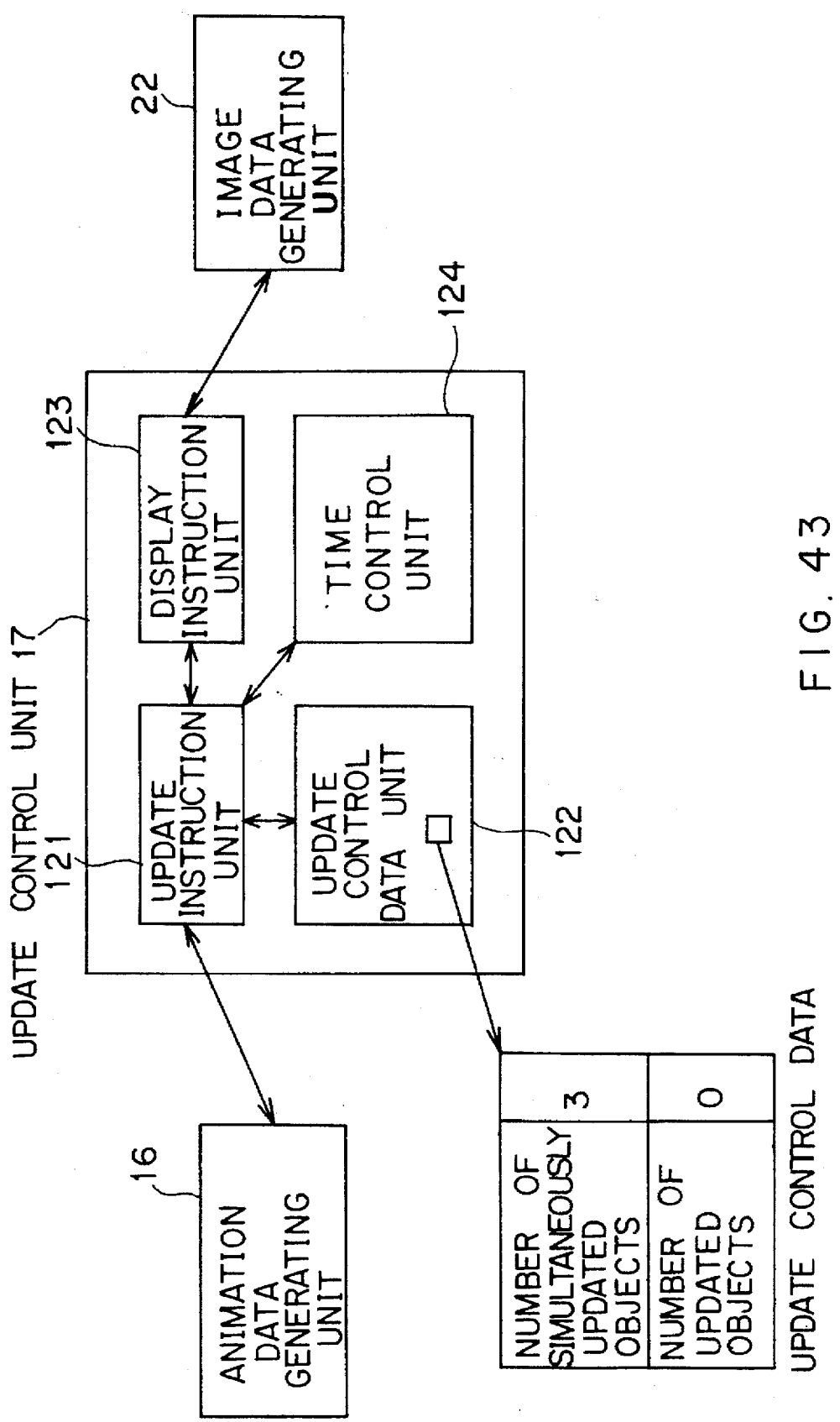
FIG. 43 shows the internal configuration of the update control unit shown in FIG. 36.

FIG. 43 shows an example of the internal configuration of the update control unit 17 shown in FIG. 36.

First, the update control unit 17 comprises an update instruction unit 121 shown in FIG. 43, an update control data unit 122, a display instruction unit 123, and a time control unit 124. The time control unit 15 in the second embodiment shown in FIG. 26 can be used as the time control unit 124. The update control data unit 122 contains the number of simultaneously updated objects as shown in FIG. 43 (for example, 3), and the number of already updated objects (for example, 0). The number of already updated objects corresponds to the data indicating the number from an initial object to the latest calculated object on the moving object list 102 shown in FIG. 38.

Furthermore, the update instruction unit 121 transmits the update control data and time T by which a moving object is updated (the time T indicates a time used for calculating a frame when an animation is displayed) to the animation data generating unit 16, and issues an instruction to generate display data.

The animation data generating unit 16 generates display data according to the received data. Then, it increments the "number of updated objects" of the update control data, and transmits it to the update control unit 17. The animation data generating unit 16 transmits to the update control unit 17 the determination result as to whether the update of moving objects at time T has been completed or is to be continued.

The update instruction unit 121 of the update control unit 17 updates the update control data in the update control data unit 122, requests the time control unit 124 to increment the time if all moving objects have been updated at time T, and receives new time T+ΔT from the time control unit 124. The update instruction unit 121 passes control to the display instruction unit 123 after the process has been completed.

The display instruction unit 123 sends a request to generate image data to the image data generating unit 22 shown in FIG. 36, and passes control to the update instruction unit 121. The update control unit 17 repeats the above described processes and controls the number of simultaneously calculated objects to generate animation.

As shown in FIG. 42, the animation data generating unit 16 comprises a data acquiring unit 111, an animation calculating unit 112, a control unit 113, and a data storage unit 114.

Figure 44:
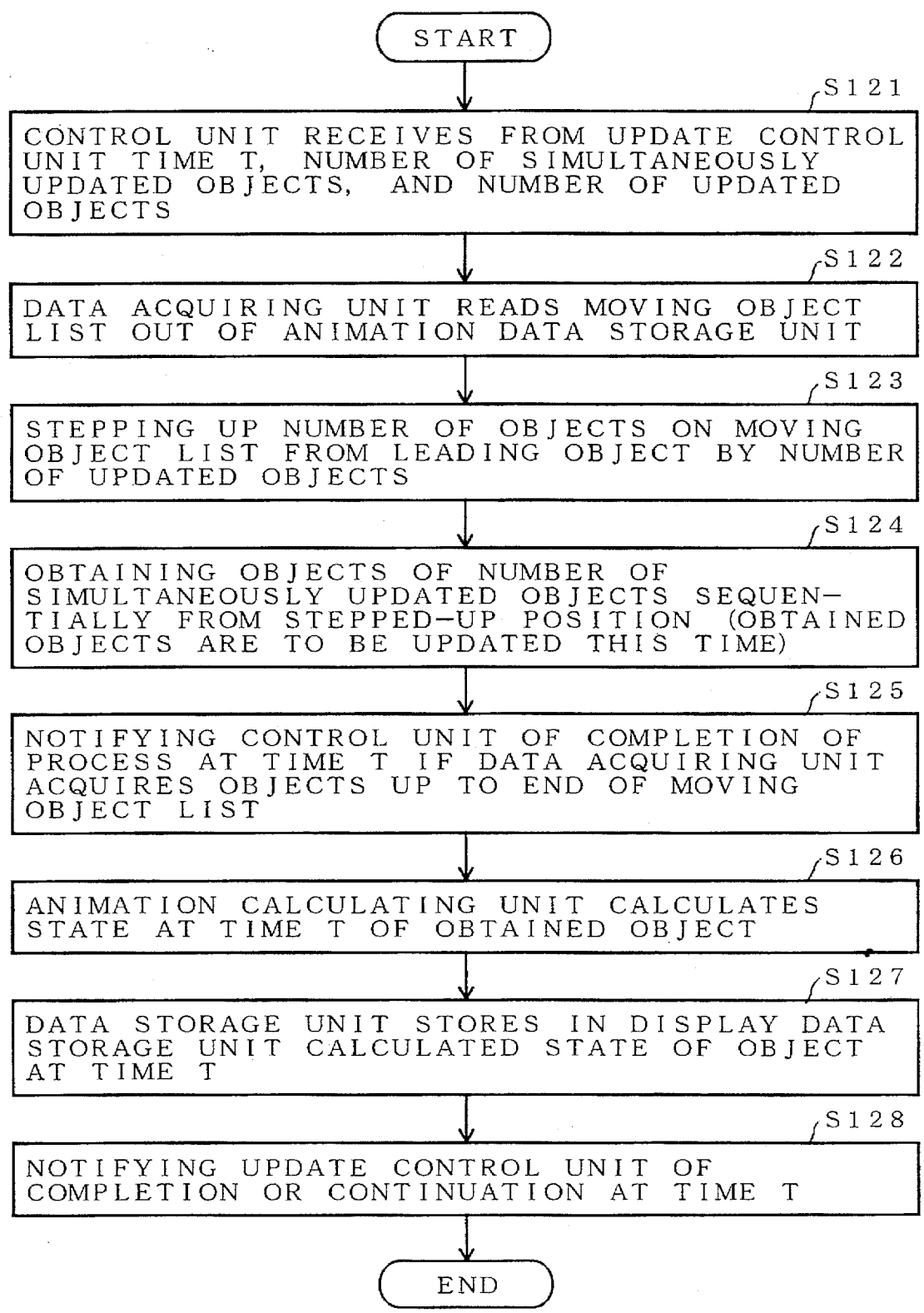
FIG. 44 is the flowchart of the process performed by the animation data generating unit.

FIG. 44 is the flowchart showing the process performed by the animation data generating unit 16.

The animation data generating unit 16 starts its process at a calculation request from the update control unit 17. First, control unit 113 receives update control data and time T from the update control unit 17 and starts its process (step S121). Then, control unit 113 requests the data acquiring unit 111 to acquire animation data. At the issue of the acquisition request, the control unit 113 sends the number of simultaneously updated objects and the number of updated objects which are contained in the update control data. The data acquiring unit 111 can recognize, from the number of updated objects, which object on the moving object list 102 shown in FIG. 38 is the first object to be updated. Upon receipt of an acquisition request from the control unit 113, the data acquiring unit 111 fetches a moving object list from the animation data memory unit 91 (step S122). Next, it obtains the first object from which animation data are to be fetched by stepping up the number of objects from the head of the moving object list by the number of updated objects (step S123). Then, the animation data are acquired for the number of simultaneously updated objects sequentially from the first object (step S124). In FIG. 43, since the number of updated objects is zero (0), data can be acquired sequentially from the leading object. Since the number of simultaneously updated objects is three (3), the data acquiring unit 111 acquires the animation data of the leading three objects from the animation data memory unit 91, sets the number of updated objects to 3, and returns control to control unit 113. If the data acquiring unit 111 has acquired data up to the end of the moving object list 102, then it sets the number of objects of which data are to be acquired to 0 again, sends information of update completion at time T to the control unit 113, and passes control to the control unit 113 (step S125).

Then, the control unit 113 transmits the acquired object data and time T to the animation calculating unit 112. The animation calculating unit 112 calculates a position and a form of the object at the specified time T according to the time T and the object data (step S126). The animation calculating unit 112 contains a calculation routine for each animation method shown in FIG. 41, and performs a calculation process according to the animation method indicated by the animation data of objects.

If the calculation is completed, the animation calculating unit 112 transmits the calculation result to the data storage unit 114 and terminates the process. The data storage unit 114 stores the calculation result in the display data memory unit 92 and passes control to the control unit 113 (step S127).

The control unit 113 examines the number of updated objects. If it is zero (0), the control unit 113 determines that the calculation for all objects in the moving object list 102 has been completed and sends a completion notification to the update control unit 17 (step S128). If the value is not zero (0), then it sends a continuation notification to the update control unit 17 (step S128). Thus, the processes of the animation data generating unit 16 are completed.

Figure 45:
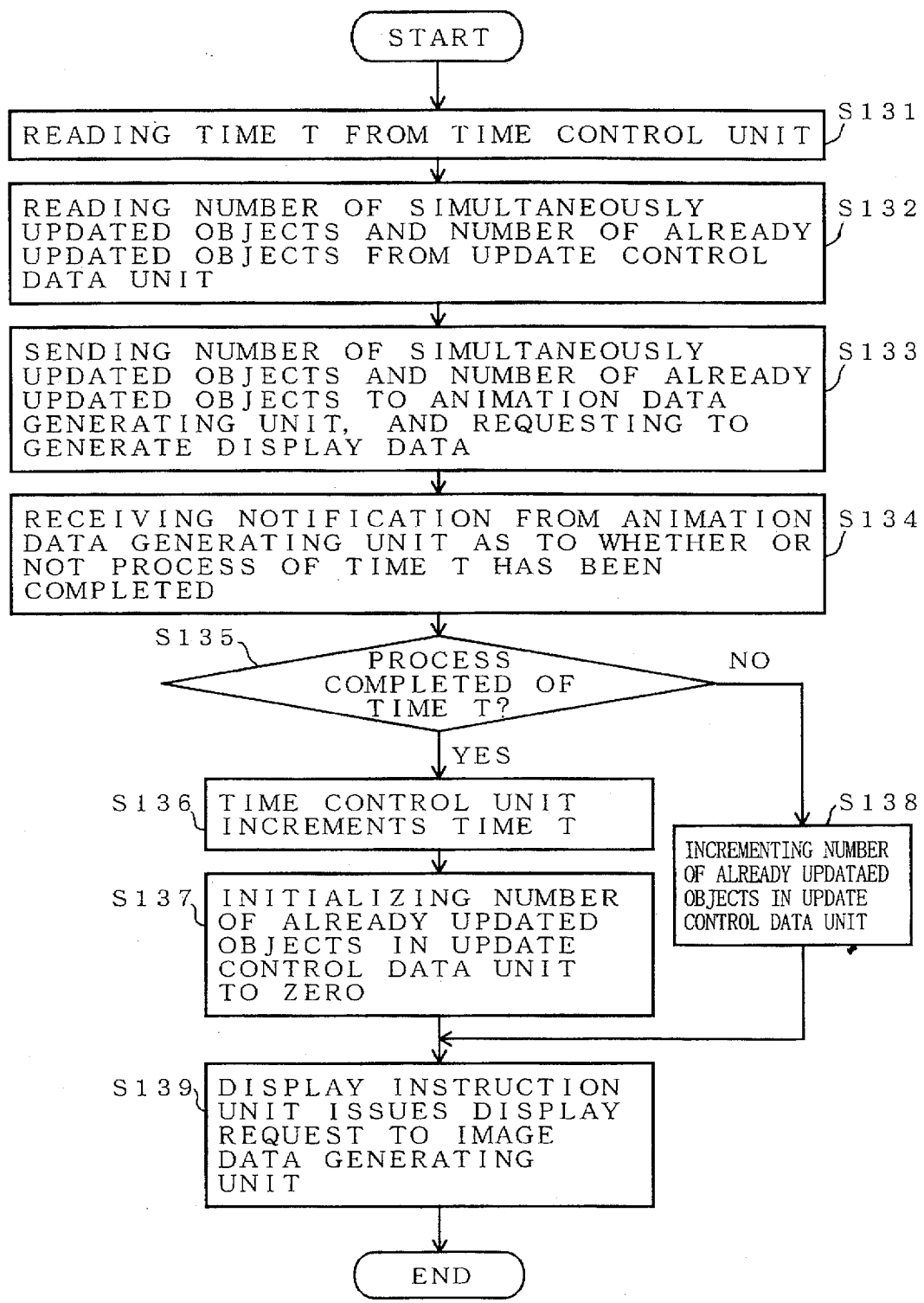
FIG. 45 is the flowchart of the process performed by the update control unit.

The processes performed by the update control unit 17 shown in FIG. 43 is described in detail by referring to the flowchart shown in FIG. 45.

When the update control unit 17 starts its process, the update instruction unit 121 reads from the time control unit 124 time T by which a moving object is updated (step S131), and reads the number of simultaneously updated objects and the number of already updated objects (step S132).

Next, the update instruction unit 121 transmits time T, the number of simultaneously updated objects, and the number of updated objects to the animation data generating unit 16, instructs it to update moving objects, and requests it to generate display data (step S133).

Upon receipt of a notification from the animation data generating unit 16 as to whether or not display data of all objects in the moving object list at time T have been generated (step S134), the update instruction unit 121 performs a process depending on the notification (step S135).

If the display data at time T have been generated by the animation data generating unit 16, the update instruction unit 121 requests the time control unit 124 to increment time T. Thus, the time control unit 124 adds an appropriate value Δt to time T to obtain the next update time (step S136). If the time control unit 15 shown in FIG. 26 is used as the time control unit 124, then Δt can be determined based on the predicted process time value obtained by the predicting unit 14.

The update instruction unit 121 returns to zero (0) for initialization the number of objects updated in the update control data unit 122 (step S137).

If all the display data at time T have not been generated yet and the animation data generating unit 16 continues to update moving objects at time T, then the update instruction unit 121 adds the number of simultaneously updated objects to the number of objects updated in the update control data unit 122. Thus, the number of updated objects is incremented (step S138).

If the process in step S137 or S138 has been completed, then the update instruction unit 121 informs the display instruction unit 123 that an update process has been completed. Thus, the display instruction unit 123 informs the image data generating unit 22 of a display request (step S139).

Upon receipt of the display request, the image data generating unit 22 generates image data from the display data stored in the display data memory unit 92, and displays them on the display device 93.

Figure 46:
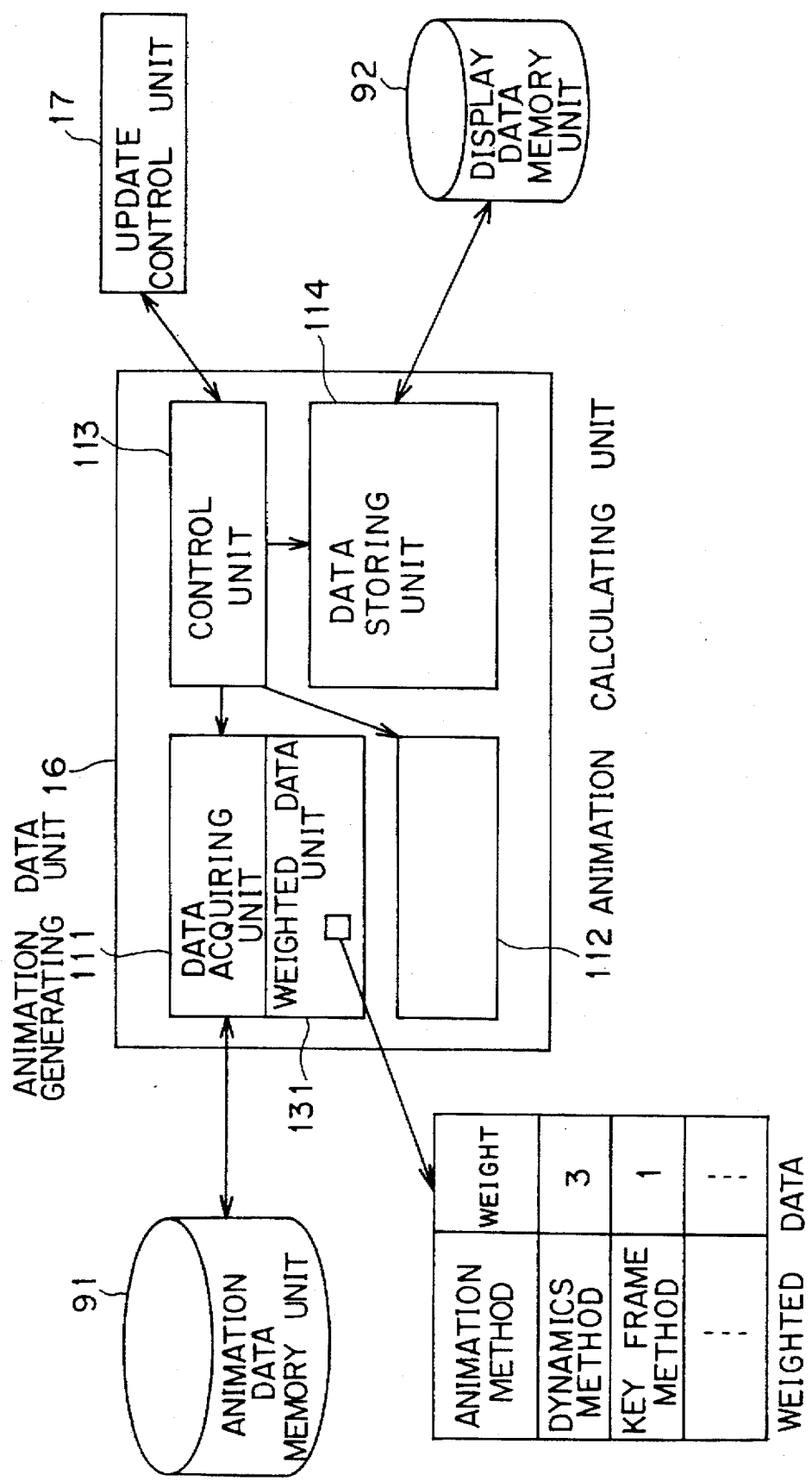
FIG. 46 shows an example of the internal configuration of the animation data generating unit for weighting the animation method.

FIG. 46 shows another example of the internal configuration of the animation data generating unit 16 shown in FIG. 36. As shown in FIG. 46, a weighted data unit 131 is added to the animation data generating unit 16. In animation data generating unit 16, the animation calculating unit 112 allows the weighted data unit 131 to store weighted data of calculation time required to update a single object and classified for each animation method so as to adjust the number of simultaneously calculated objects, thereby generating display data at short and uniform intervals.

Thus, the weighted data unit 131 is added to the animation data generating unit 16. The weighted data refer to data with added weight for the calculation process time for each animation method. The weight refers to the difference in calculation process time due to a difference in animation method. The longer process time an animation method takes, the larger value it is assigned. For example, the key frame method shown in FIG. 46 takes a short process time and is assigned a weight value of 1, while the dynamics method performs a large amount of calculation and takes a longer process time, and therefore is assigned a weight value of 3. An animation method to be used to update a specific object is determined by a user.

The weight is used to keep constant a single process time of the animation data generating unit 16. Described below is the method of keeping a process time constant.

Since the process of the control unit 113 is similar to that described above, and is omitted here. The data acquiring unit 111 can recognize by the number of updated objects 0 from which object on the moving object list 102 shown in FIG. 38 should be updated. In this case, since the number of updated objects is zero (0), data are acquired from the head of the list.

The data acquiring unit 111 acquires object data of objects required in the moving object list 102 and retrieves the animation method of the object. The animation method is then retrieved in the weighted data unit 131 to obtain a weight of a process time of the object. For example, if the animation method is the dynamics method, then the weight of the process time of the object is "3" in a row of the dynamics method. The data acquiring unit 111 adds up weight values each time object data of an object are acquired, and stops acquiring data when a sum of them reaches a predetermined value.

Figure 47:
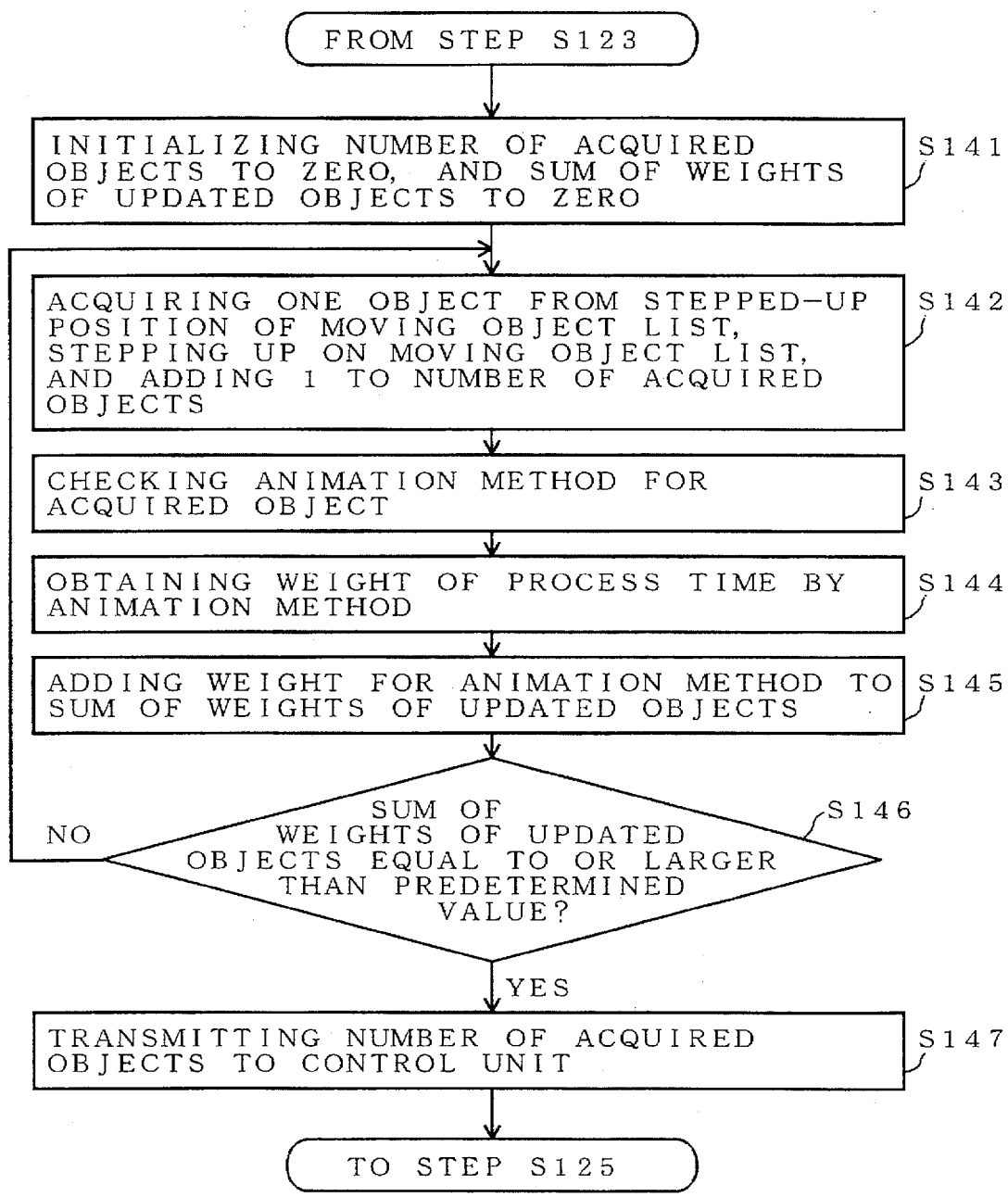
FIG. 47 is the flowchart of the process performed by the data acquiring unit.

FIG. 47 is the flowchart of the process performed by the data acquiring unit 111 when the animation method is weighted as shown in FIG. 46. The data acquiring unit 111 shown in FIG. 46 performs the process shown in FIG. 47 instead of the process in step S124 shown in FIG. 44.

After stepping up the number of object in the moving object list in step S123 shown in FIG. 44, the data acquiring unit 111 initializes the number of acquired objects and a sum of weights of objects to be updated, both to zero (0) (step S141).

Next, the animation data of an object located at a stepped up position in the moving object list is acquired from the animation data memory unit 91, and the position in the moving object list is incremented by 1, and the number of acquired objects is increased by one (1) (step S142). At this time, animation method is checked in the acquired animation data (step S143), and a weight corresponding to the animation method is retrieved from the weighted data unit 131 (step S144).

Then, the data acquiring unit 111 adds the obtained weights to the sum of weights of objects to be updated (step S145), and determines whether or not the sum of the weights is equal to or larger than a predetermined value (step S146). The predetermined value can be the number of simultaneously updated objects transmitted from the update control unit 17.

If the sum of weight values is smaller than a predetermined value, then the processes in and after step S142 are repeatedly performed. If the sum of the weight values is equal to or larger than the predetermined value, then the acquisition of data is stopped and the number of acquired objects is transmitted to the control unit 113 (step S147), and the process in step S125 shown in FIG. 44 is performed.

For example, if a predetermined value of the sum of weight values is three (3), then the predetermined value is reached when data of an object are acquired in the case of the dynamics method shown in FIG. 46. In this case, even if the number of simultaneously updated objects directed by the update control unit 17 is three (3), the data acquiring unit 111 stops acquiring data after acquiring the data of an object updated in the dynamics method. Then, the number of acquired objects 1 is transmitted to the control unit 113.

The control unit 113 notifies the update control unit 17 of the number of acquired objects received from the data acquiring unit 111. Then, in step S138 shown in FIG. 45, the update instruction unit 121 amends the number of updated objects in the update control data unit 122 into the number of acquired objects informed from the animation data generating unit 16.

If an object takes a long process time, then the number of simultaneously updated objects is reduced under a control described above. If an object takes only a short process time, the number of simultaneously updated objects can be increased under the control.

Other components are the same as those shown in FIG. 42.

Figure 48:
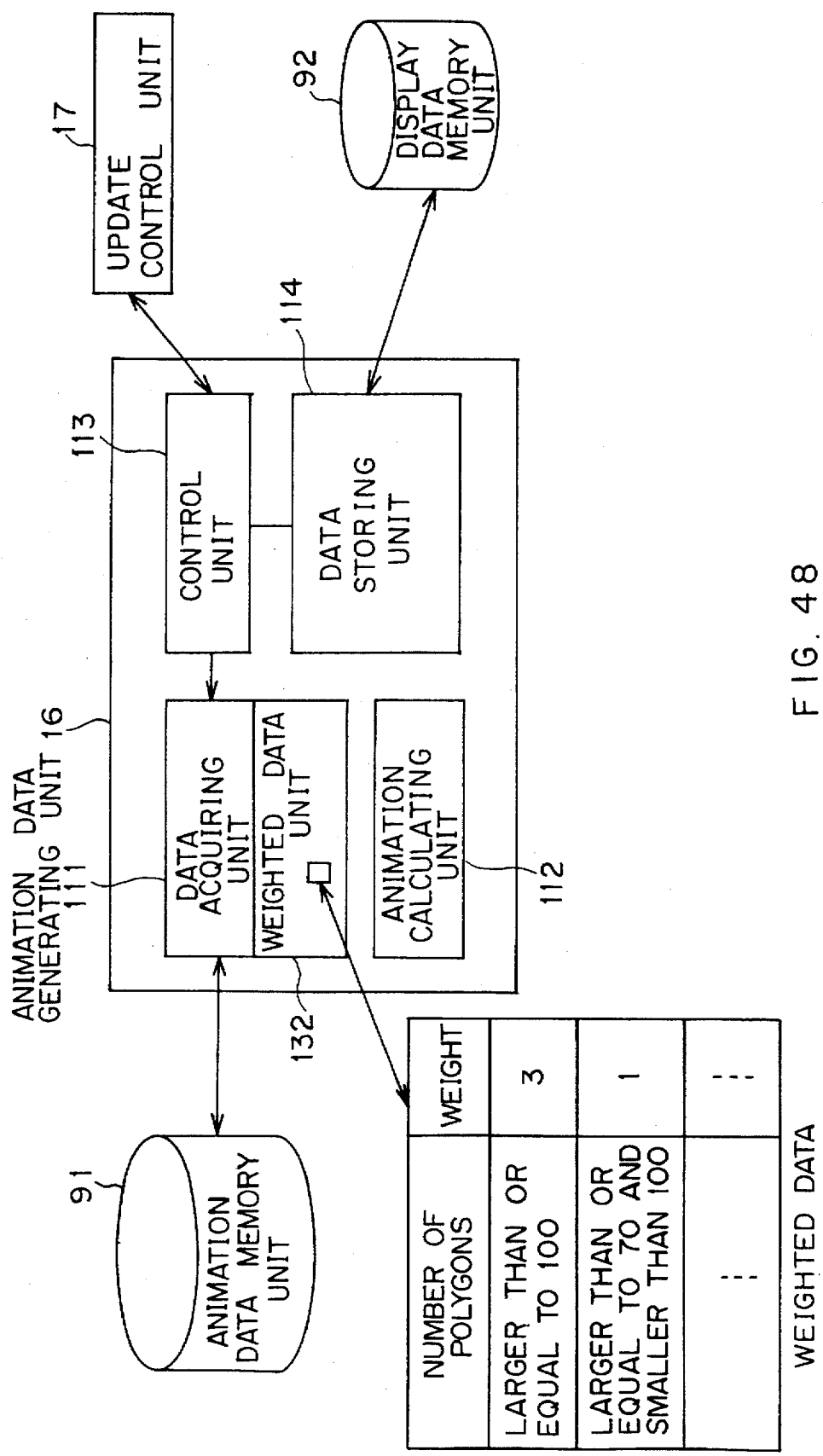
FIG. 48 shows an example of the internal configuration of the animation data generating unit for weighting the number of polygon.

Described below is the animation data generating unit 16 shown in FIG. 48. The weighted data unit 131 shown in FIG. 46 stores data weighted by an animation technique, while the weighted data unit 132 shown in FIG. 48 stores data weighted by the number of polygons. That is, in the animation data generating unit 16 shown in FIG. 48, the weighted data unit 132 stores weighted data indicating the calculation time for an object as being classified by the number of polygons of the object. Display data can be generated at short and uniform intervals by adjusting the number of simultaneously calculated objects. When acquiring data, the data acquiring unit 111 reads the number of polygons in the form data of the object, obtains the weight corresponding to the number of polygons from the weighted data, and adjusts the number of the objects to be acquired based on the sum of the obtained weight. The adjustment is made in the same manner as described in the case shown in FIG. 46.

Other components are the same as those shown in FIG. 42.

Figure 49:
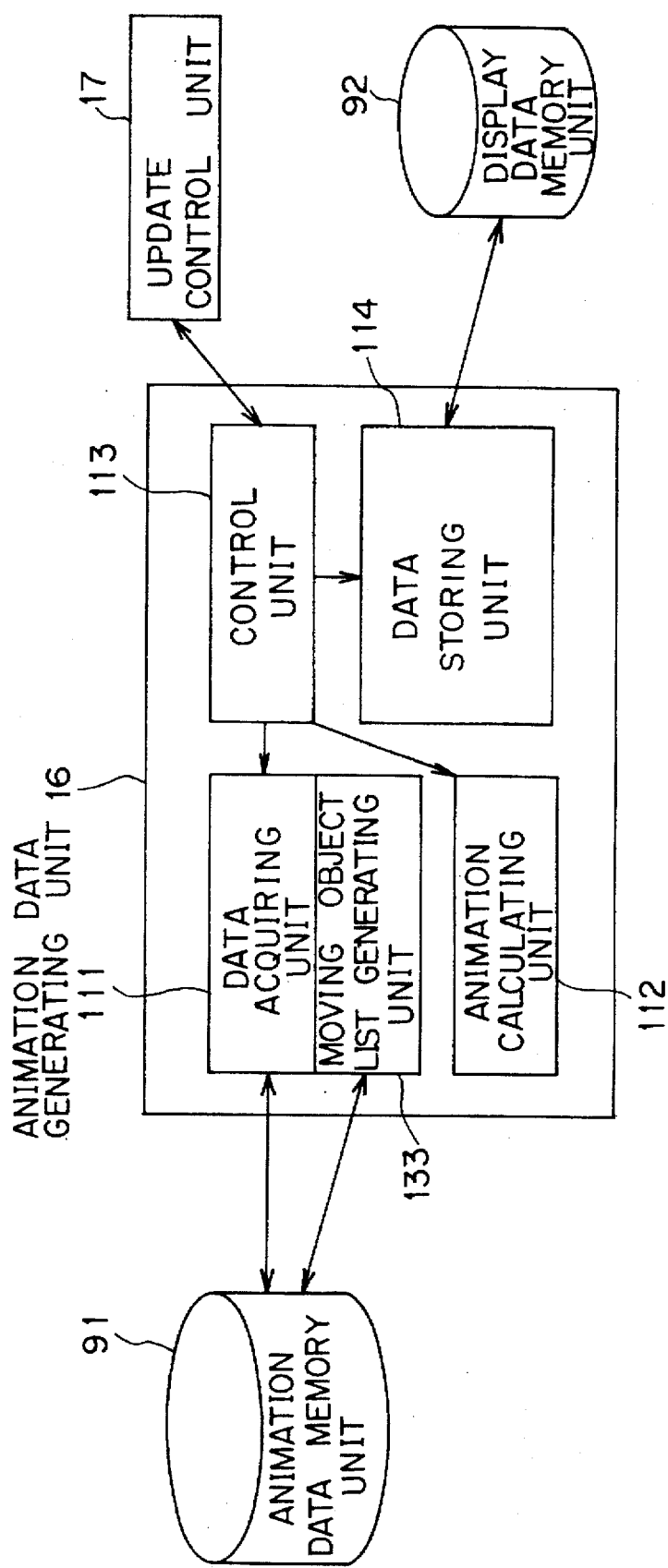
FIG. 49 shows an example of the internal configuration of the animation data generating unit comprising a moving object list generating unit.

FIG. 49 shows another example of the internal configuration of the animation data generating unit 16. As shown in FIG. 49, it is provided with a moving object list generating unit 133. The animation data generating unit 16 shown in FIG. 49 represents a natural movement of images on a screen by selecting simultaneously calculated objects as they are scattered uniformly on the screen. The moving object list generating unit 133 rearranges the moving object list 102 such that objects located in distant places on the screen can be positioned adjacently in the screen.

Figure 50:
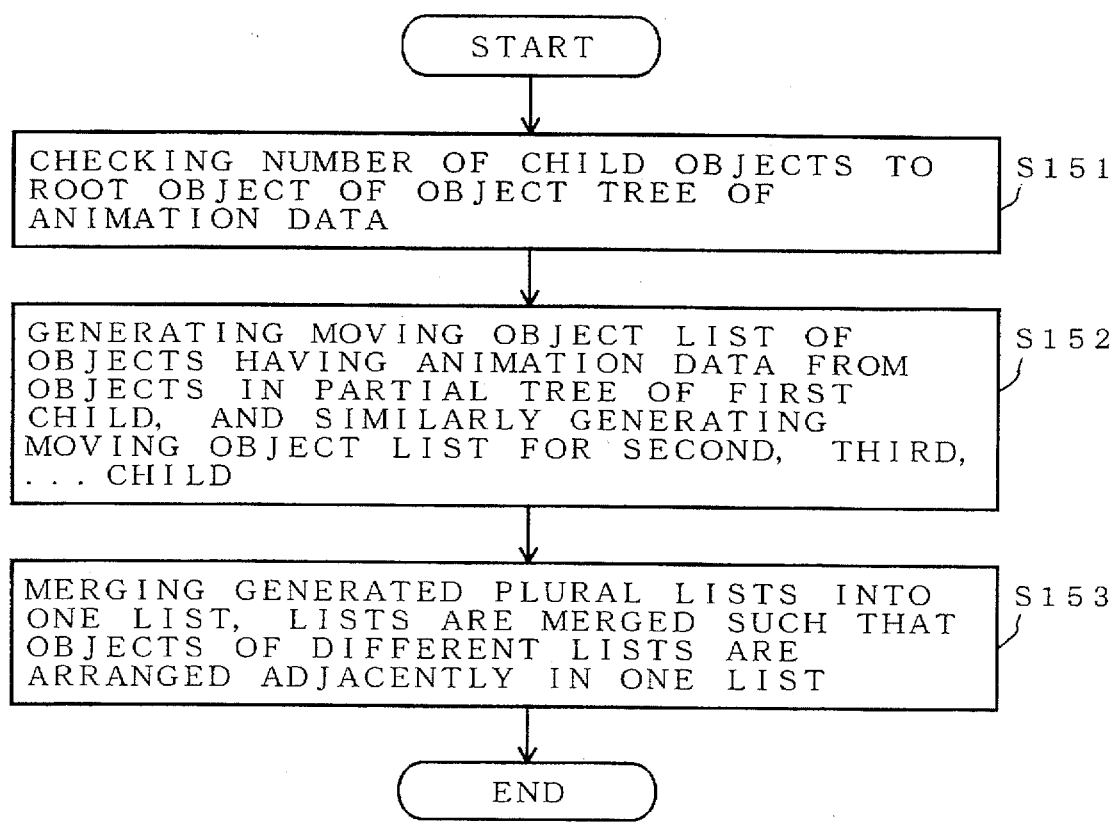
FIG. 50 is the flowchart of the process performed by the moving object list generating unit.
Figure 51:
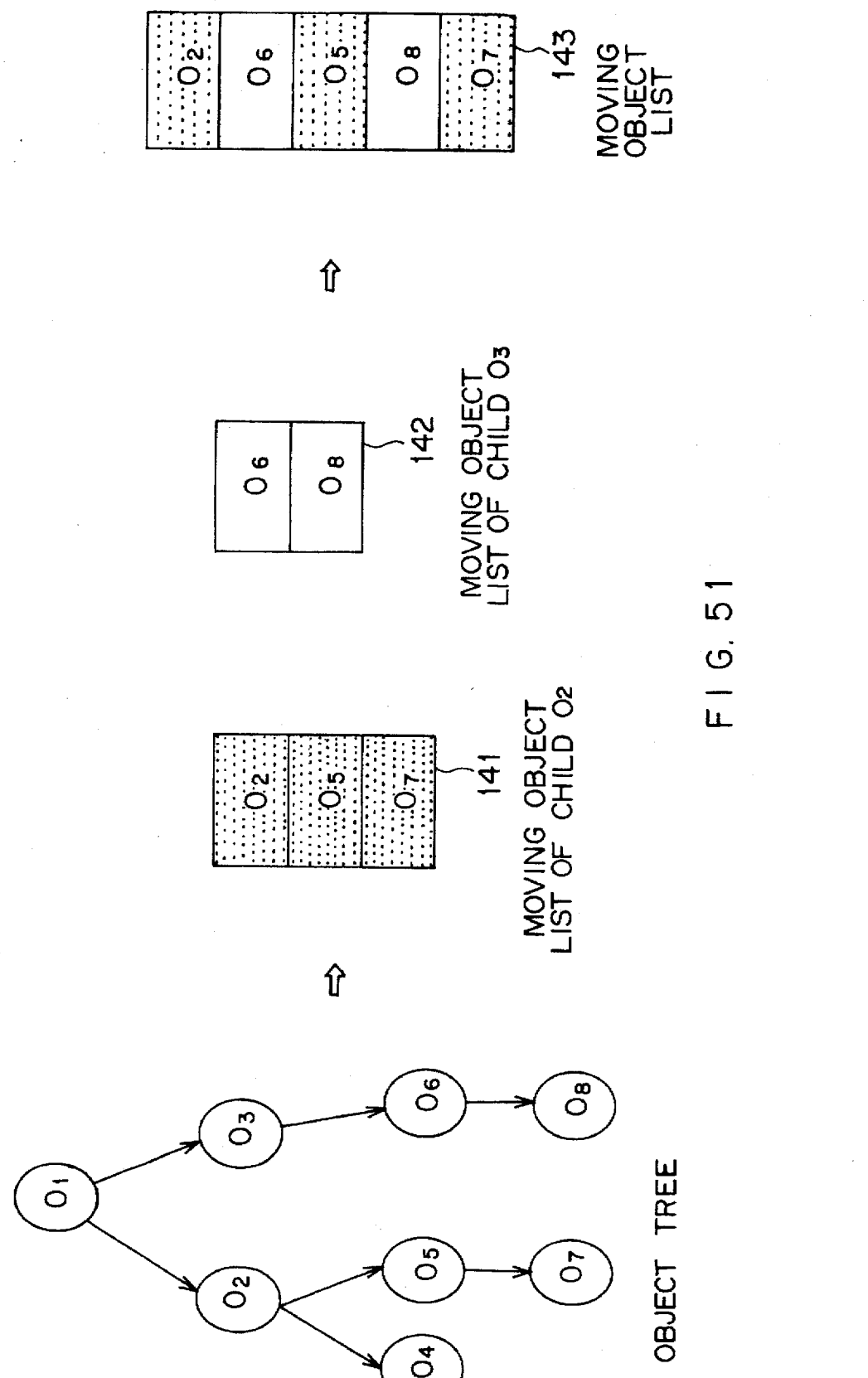
FIG. 51 shows an example of the moving object list.

FIG. 50 is a flowchart of the process performed by the moving object list generating unit 133. FIG. 51 shows an example of a moving object list generated through the process activated by the control unit 113 at the start of the animation. An object $O_1$ on the top of the object tree shown in FIG. 51 is named a route. First, it is checked how many children the route has (step S151). Then, the object list is divided by the number of the children into partial trees (step S152). At this time, the moving objects having animation data are extracted from among the objects in a partial tree starting with the first child. Thus, a moving object list of the first child can be generated. Likewise, the moving object lists of the partial trees can be generated for the second and other children. In the case shown in FIG. 51, since route $O_1$ has two children $O_2$ and $O_3$, the moving object list is divided into two object lists, that is, one for the left object tree and the other for the right object tree. In this case, two lists are generated. They are a moving object list 141 of child $O_2$ and a moving object list 142 of child $O_3$. The moving object list 141 of child $O_2$ contains objects $O_2$, $O_5$, and $O_7$. The moving object list 142 of child $O_3$ contains objects $O_6$ and $O_8$. The child $O_3$ is, for example, a static object and is not contained in the moving object list 142. Likewise, child $O_4$ is not contained in the moving object list 141.

Then, a plurality of divided lists are merged into a single moving object list (step S153). The list is generated such that the objects in the plural lists are entered alternately. In the case shown in FIG. 51, the two moving object lists 141 and 142 are merged into a single moving object list 143.

Thus, in the case shown in FIG. 51, generated is a moving object list 143 alternately pointing to an object in the right object tree and an object in the left object tree.

The data acquiring unit 111 in the animation data generating unit 16 shown in FIG. 49 sequentially reads object data through the generated moving object list. Accordingly, in the case shown in FIG. 51, the data of an object in the right and left object trees are alternately retrieved. Thus, the simultaneously rewritten (updated) objects can be adjusted.

Since position information of an object can also be inherited in the structure of an object tree, objects having the same parent are positioned closely. Therefore, regenerating a moving object list as described above controls the generation of display data such that simultaneously calculated objects can be uniformly scattered on a screen.

FIG. 52 shows another example of the configuration of the third embodiment. As shown in FIG. 52, an image editing unit 151 is connected to the animation data generating unit 16 and the update control unit 17. Providing the image editing unit 151 enables a user to change update control data and weighted data.

As described above, since the number of image displays is increased and the images can be displayed at a high speed according to the third embodiment, smoother, easier, and more realistic animation can be successfully realized.

Figure 53:
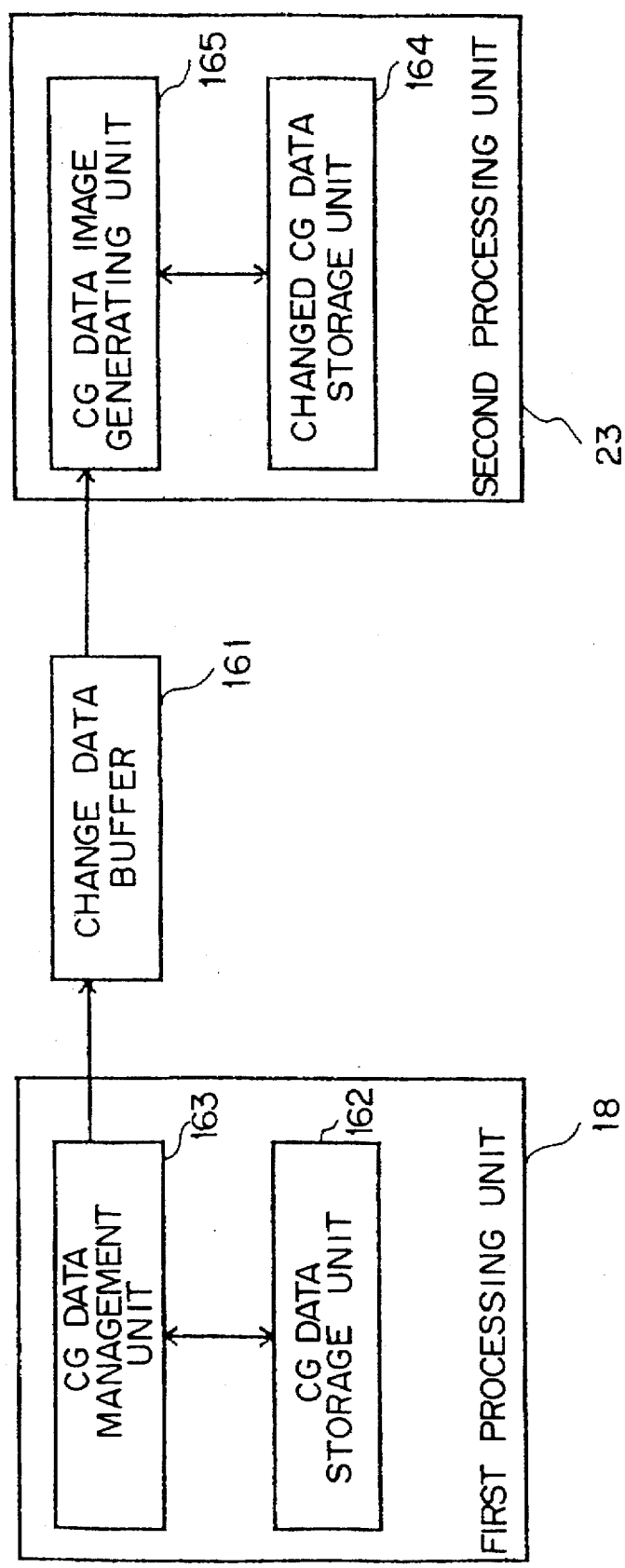
FIG. 53 is the block diagram according to the fourth embodiment of the present invention.

FIG. 53 is a block diagram showing the fourth embodiment of the present invention. The CG data display device according to the fourth embodiment is provided in the graphic display device for displaying CG data, that is, graphic information generated by a computer system.

The first processing unit 18 comprises a CG data storage unit 162 and a CG data management unit 163, manages CG data, and, if a change has arisen in the CG data, outputs as change data the CG data relating to the change.

The second processing unit 23 comprises a changed CG data storage unit 164 and a CG data image generating unit 165, stores CG data to be displayed and generates image data using the input change data.

A change data buffer 161 is provided between the first processing unit 18 and the second processing unit 23, and stores the change data.

For example, the first processor 18 and the second processing unit 23 are processor systems and the change data buffer 161 is a shared memory which can be accessed by the processor systems.

The CG data storage unit 162 stores CG data.

The CG data management unit 163 receives external information, calculates its influence on CG data stored in the CG data storage unit 162, and changes CG data to be changed.

The changed CG data storage unit 164 stores CG data to be displayed.

The CG data image generating unit 165 updates CG data stored in the changed CG data storage unit 164 based on the change data, and generates image data from the updated CG data.

When external information associated with display is provided for the first processing unit 18, the CG data management unit 163 in the first processing unit 18 calculates its influence on CG data stored in the CG data storage unit 162, and obtains changed CG data, that is, change data. Then, the CG data management unit 163 in the first processing unit 18 stores the change data in the change data buffer 161. It also stores the change data in the CG data storage unit 162.

The change data stored in the change data buffer 161 are read by the CG data image generating unit 165 in the second processing unit 23. The CG data image generating unit 165 updates the CG data stored in the changed CG data storage unit 164 based on the change data, and generates image data from the updated CG data.

Since CG data are stored in the first processing unit 18 and the second processing unit 23, the CG data can be changed or updated by transmitting only the change data from the first processing unit 18 to the second processing unit 23, and the amount of information to be transmitted can be reduced with improved throughput at a high speed.

Practically, CG data are composed of form data and viewpoint data, for example. They are stored in the first processing unit 18 and the second processing unit 23. If the angle of the viewpoint data is changed from 15° to 45° by 30°, the change data indicating that the viewpoint data have changed into 45° are transmitted from the first processing unit 18 to the second processing unit 23. In the second processing unit 23, form data and viewpoint data 45° are stored in changed CG data storage unit 164, and images are generated from the CG data based on the stored data. The data transmission time can be considerably reduced because all CG data in a displayed world are not transmitted but only data relating that the viewpoint data changed into 45°, that is, the viewpoint data 45°, are transmitted from the first processing unit 18 to the second processing unit 23. As a result, both form data and viewpoint data 45° are stored in the first processing unit 18 and the second processing unit 23. In a multiprocessor system, the first processing unit 18 detects that viewpoint data are changed from 15° to 45°, and concurrently the second processing unit 23 generates an image.

Figure 54:
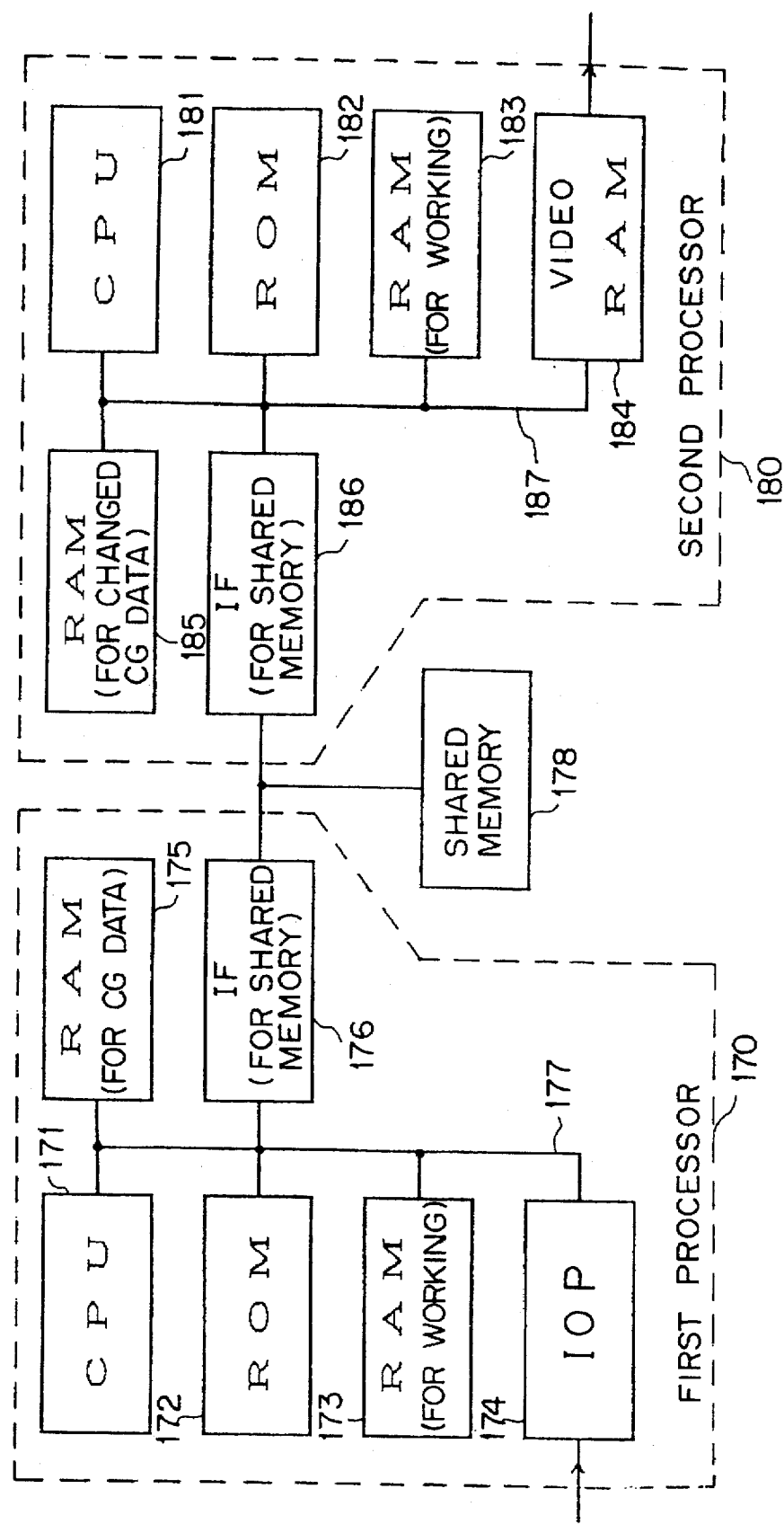
FIG. 54 shows the configuration of the system according to the fourth embodiment.

FIG. 54 shows a practical configuration according to the fourth embodiment. The CG data display device shown in FIG. 54 comprises a first processor 170 and a second processor 180.

The first processor 170 comprises a CPU 171, a read only memory (ROM) 172, a working random access memory (RAM) 173, an input/output processor (IOP) 174, a CG data RAM 175, and a shared memory interface (IF) 176. These circuits are commonly connected to one another via a CPU bus 177.

The CPU 171 executes a program stored in the ROM 72, receives display information from the IOP 174 such as CG data, CG information from an operator, etc., and determines whether or not the currently displayed information should be changed. The working RAM 173 is a working area used when the CPU 171 executes a program in the ROM 172. Additionally, this system is provided with the CG data RAM 175. The CG data RAM 175 stores CG data to be displayed. As described later, the CG data stored in the CG data RAM 175 are also stored in a RAM 185 in the second processor 180.

In the first processor 170, if CG data have been changed, that is, change data have arisen, the first processor 170 stores the change data in a shared memory 178 through the shared memory interface (IF) 176, and stores the change data in the CG data RAM 175. Then, the change data stored in the shared memory 178 are read by the second processor 180 to change the image which has been generated and displayed.

The second processor 180 comprises a CPU 181, a ROM 182, a working RAM 183, a video RAM 184, a changed CG data RAM 185, and a shared memory interface (IF) 186. These circuits are commonly connected to a bus 187 of the CPU 181. The CPU 181 of the second processor 180 executes a program stored in the ROM 182 and generates images using the working RAM 183. The CG data used in the generation of images (that is, changed CG data) are stored in the changed CG data RAM 185.

If change data are stored in the shared memory 178 by the first processor 170, the second processor 180 reads the change data stored in the shared memory 178 through the shared memory interface (IF) 186, and adds them to the CG data in the changed CG data RAM 185. Then, the second processor 180 generates dot data to be displayed from the changed CG data, and writes them into the video RAM 184. The video RAM 184 is a circuit for generating a video signal from the dot data. The video signal is added to, for example, a cathode ray tube (CRT) not shown in the attached drawings and is displayed on the CRT.

CG data are stored in the above described CG data RAM 175 and the changed CG data RAM 185. The storage format can be the same or different in these RAMS. For example, the CG data RAM 175 in the first processor 170 can store the CG data in a format in which a user can easily give his or her instruction (for example, a tree structure). The changed CG data RAM 185 in the second processor 180 can store the data in a format in which images are easily generated (for example, a parallel arrangement in item units).

As described above, the first processor 170 and the second processor 180 separately store CG data, and the first processor 170 transmits only change data and the second processor 180 displays CG data after updating them. Therefore, all CG data are not required to be transmitted in association with a change, thereby performing the process at a high speed. Furthermore, parallel processing can speed up the entire process.

A processor is used in the above described embodiment, but the present invention is not limited to this application. For example, each unit can be structured by hardware other than a processor or by a process of a computer system.

Figure 55:
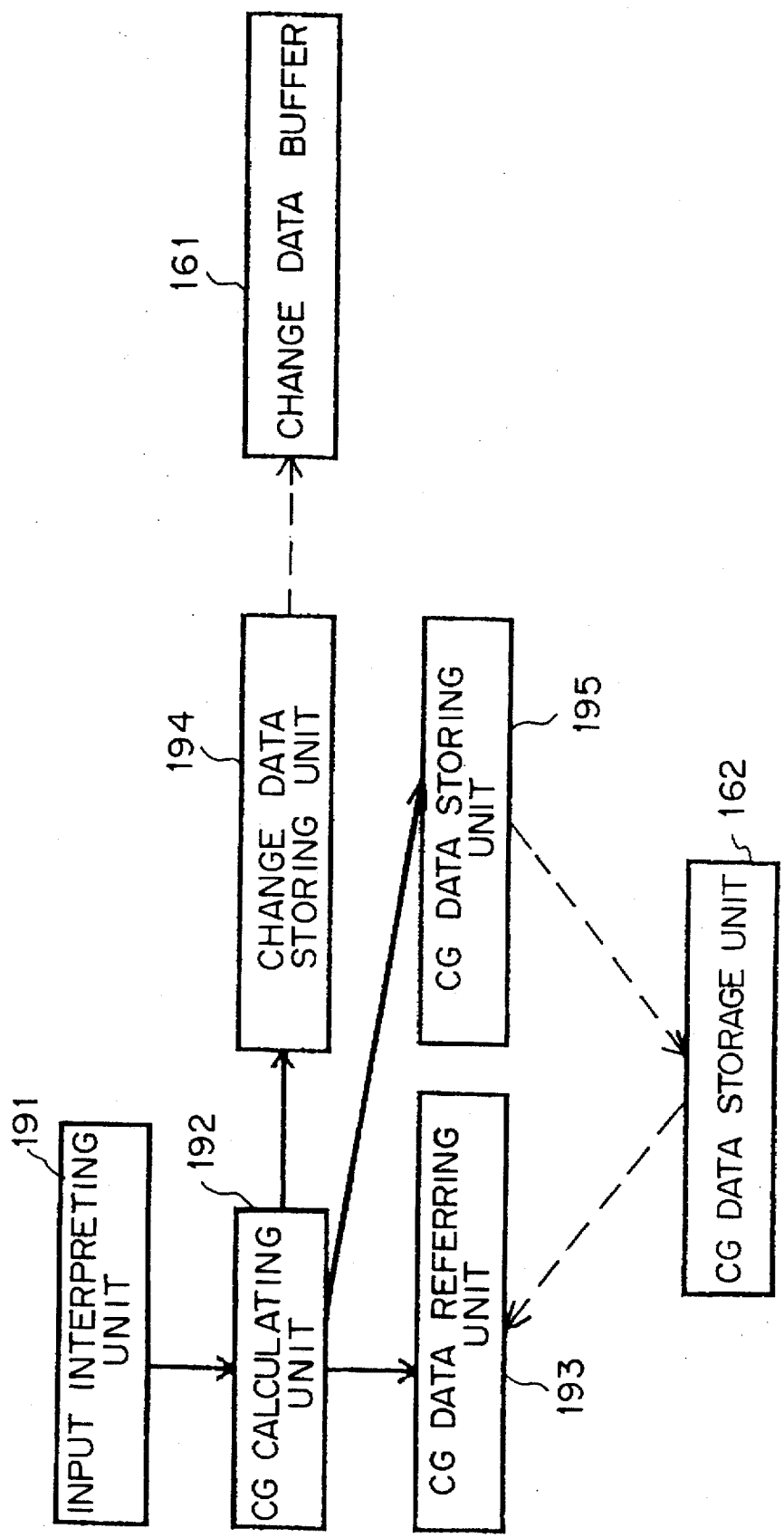
FIG. 55 shows the configuration of the CG data management unit.

The block diagram shown in FIG. 53 is explained below in detail. FIG. 55 shows the configuration of the CG data management unit 163 shown in FIG. 53. The CG data management unit 163 comprises an input interpreting unit 191, a CG calculating unit 192, a CG data referring unit 193, a change data storing unit 194, and a CG data storing unit 195, where solid-line arrows in FIG. 55 indicate the direction of control and the flow of data, and broken-line arrows show the flow of data.

The input interpreting unit 191 receives an input from a mouse and a keyboard, interprets the meaning of the input information, and instructs the CG calculating unit 192 to perform an calculation. In interpreting the information, it also determines what sort of calculation should be performed and informs the CG calculating unit 192 of the determination. The CG calculating unit 192 requests the CG data referring unit 193 to refer to necessary data, and performs a specified calculation on obtained data. Then, it outputs the calculation result to the CG data storing unit 195. Then, the output data are also transmitted to the change data storing unit 194 as change data, and instructs it to store them into the change data buffer 161.

The CG data referring unit 193 retrieves data stored in the CG data storage unit 162 upon receipt of a data retrieval request, and notifies the CG calculating unit 192 of the result. The CG data storing unit 195 stores CG data in the CG data storage unit 162. The change data storing unit 194 stores change data in the change data buffer 161.

Each unit of the CG data management unit 163 is operated as follows. First, upon receipt of data from a keyboard, the input interpreting unit 191 interprets the contents of the input information, and outputs necessary information such as a calculation method, etc. to the CG calculating unit 192. The CG calculating unit 192 requests the CG data referring unit 193 to output data corresponding to the specified calculation method. The CG data referring unit 193 reads corresponding data stored in the CG data storage unit 162, and outputs them to the CG calculating unit 192. The CG calculating unit 192 performs a calculating process using the data and obtains all or a part of the changed CG data as change data. Then, it transmits the CG data to be storing to the CG data storing unit 195.

The CG data storing unit 195 stores the received CG data in the CG data storing unit 162. Thus, the CG data include a change arising during a display process and then are stored in the CG data storage unit 162. Furthermore, to keep the consistency of the information stored in the first processing unit 18 and the second processing unit 23, the CG data storing unit 195 instructs the change data storing unit 194 to store the change data in the change data buffer 161. Then, the change data storing unit 194 stores the change data in the change data buffer 161. Thus, the CG data management unit 163 obtains CG data relating to the input change, and stores it in the CG data storage unit 162 and the change data buffer 161.

In the above described process, data are input from, for example, a mouse and a keyboard. However, the present invention is not limited to these input units, and can receive a display request from, for example, an external computer system. Displayed CG data stored in a ROM can be stored in a RAM at initialization if the information to be displayed is preliminarily limited. Furthermore, they can be added from an external computer system at initialization as initialization information, and then be displayed.

Figure 56:
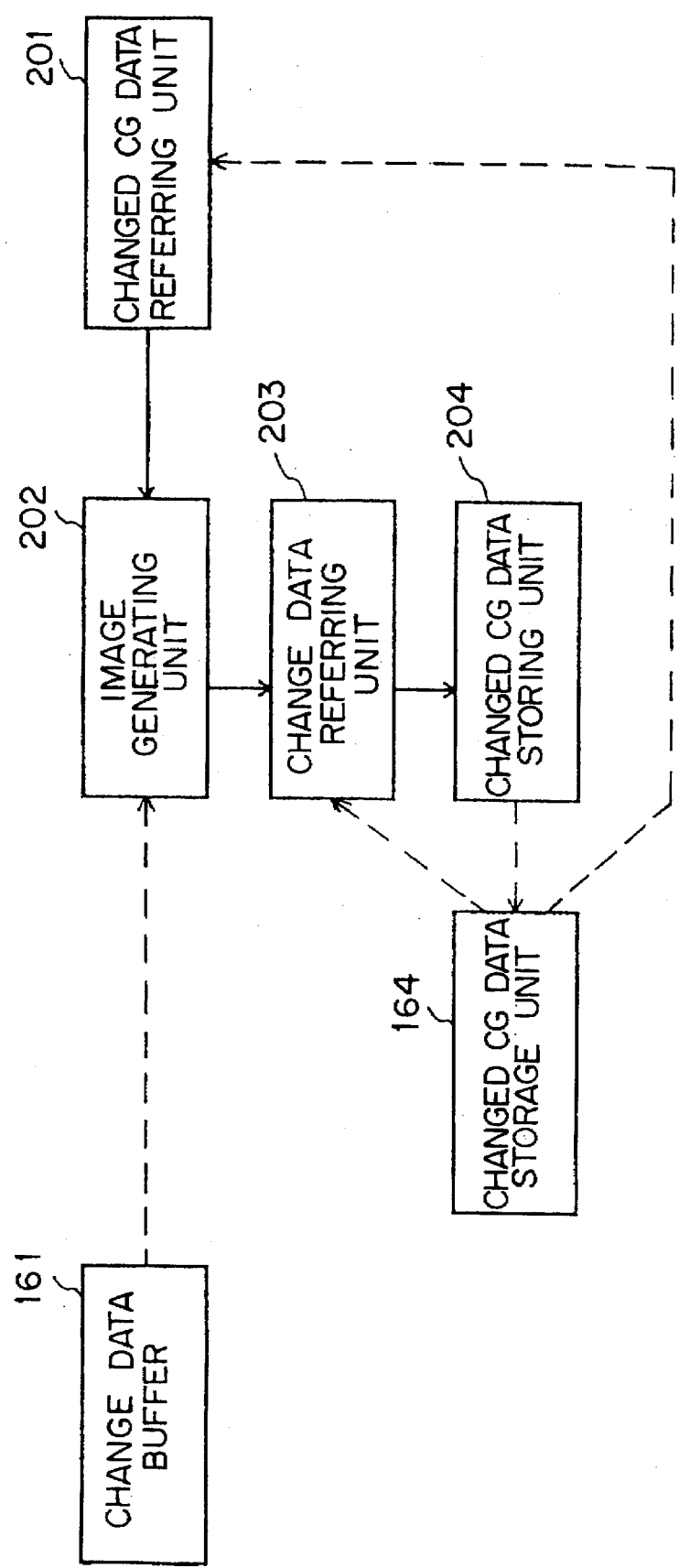
FIG. 56 shows the configuration of the CG data image generating unit.

FIG. 56 shows the configuration of the CG data image generating unit 165. The CG data image generating unit 165 forming part of the second processing unit 23 comprises a changed CG data referring unit 201, an image generating unit 202, a change data referring unit 203, and a changed CG data storing unit 204, where solid-line arrows in FIG. 55 indicate the direction of control and the flow of data, and broken-line arrows show the flow of data.

The image generating unit 202 transmits change data to the change data referring unit 203, instructs the change data referring unit 203 to update changed CG data, obtains the changed CG data from the changed CG data referring unit 201, and generates images. The change data referring unit 203 refers to the contents, corresponding to the change data, of the changed CG data storage unit 164, and transmits the change data to the changed CG data storing unit 204 if a change is required. The changed CG data storing unit 204 updates the changed CG data stored in the changed CG data storage unit 164 according to the contents given by the change data referring unit 203. The changed CG data referring unit 201 reads required CG data from the changed CG data storage unit 164.

The CG data image generating unit 165 shown in FIG. 56 operates as follows. When the change data stored in the change data buffer 161 are received by the image generating unit 202, the image generating unit 202 requests the change data referring unit 203 to update changed CG data.

If there are change data, the change data referring unit 203 outputs their contents to the changed CG data storing unit 204, and instructs the changed CG data storing unit 204 to update the changed CG data. The changed CG data storing unit 204 partially updates the changed CG data stored in the changed CG data storage unit 164 based on the received contents of the change data.

The image generating unit 202 requests the changed CG data referring unit 201 to read CG data required to change an image, and generates image from the updated CG data returned from the changed CG data referring unit 201. The read requests are issued almost simultaneously to the change data referring unit 203 and the changed CG data referring unit 201. Furthermore, the update of changed CG data, the read of updated CG data, and the generation of images are carried out simultaneously.

The CG data management unit 163 and the CG data image generating unit 165 are operated as described above.

According to the present invention, CG data are stored separately in the CG data storage unit 162 and the changed CG data storage unit 164. Accordingly, the information transmitted through the change data buffer 161 can be change data only, and the amount of the information can be considerably reduced, thereby taking shorter time for transmission and resulting in a high speed process. Since, for example, change information provided continuously for the device shown in FIG. 53 can be sequentially processed in parallel in a pipeline system, the entire process can be completed more quickly.

According to the fourth embodiment, the first processing unit 18 and the second processing unit 23 perform respective processes in the units shown in FIGS. 53, 55, and 56. If the processes are performed by processors, then the process of each unit shown in FIGS. 53, 55, and 56 is performed corresponding to each of the processes shown in FIGS. 57, 58, 59, 60, and 61 performed by a processor. These processes can be also performed in multiple processes (multi-process) defined in a computer system. If each process of the first processing unit 18 and the second processing unit 23 is performed by a process of the multiple processes, then the change data only can be transmitted between processes because each process stores CG data. The transmission can be performed within a short time and the entire process can be completed quickly.

Figure 57:
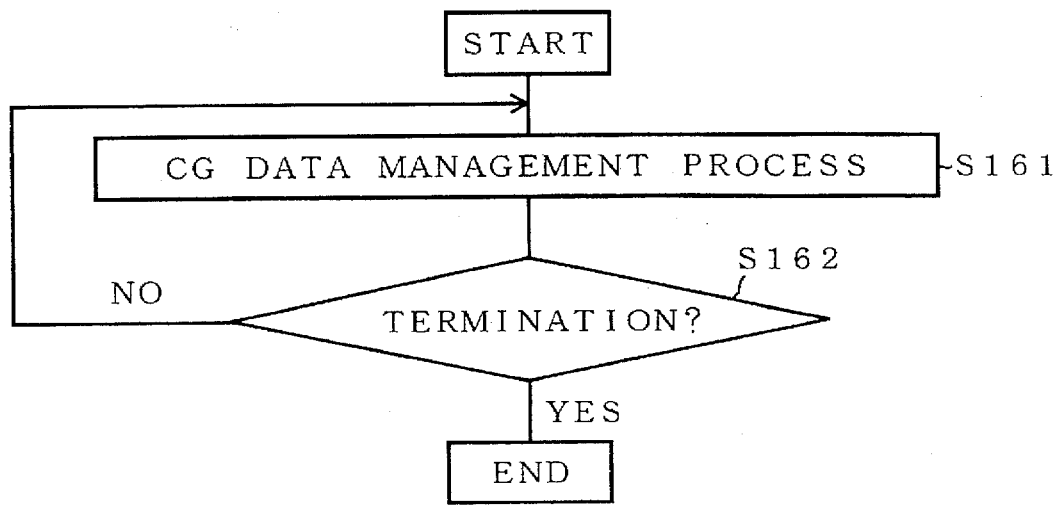
FIG. 57 is the flowchart of the operation of the first processing unit.

FIG. 57 shows the operation of the first processing unit 18. The first processing unit 18 constantly performs a CG data management process in step S161. That is, at the start of its operation, it performs the CG data management process in step S161. If the CG data management process is completed, it is determined whether or not the entire process has been completed in step S162. If no, the CG data management process is performed again in step S161. Thus, the CG data management process is constantly carried out.

Figure 58:
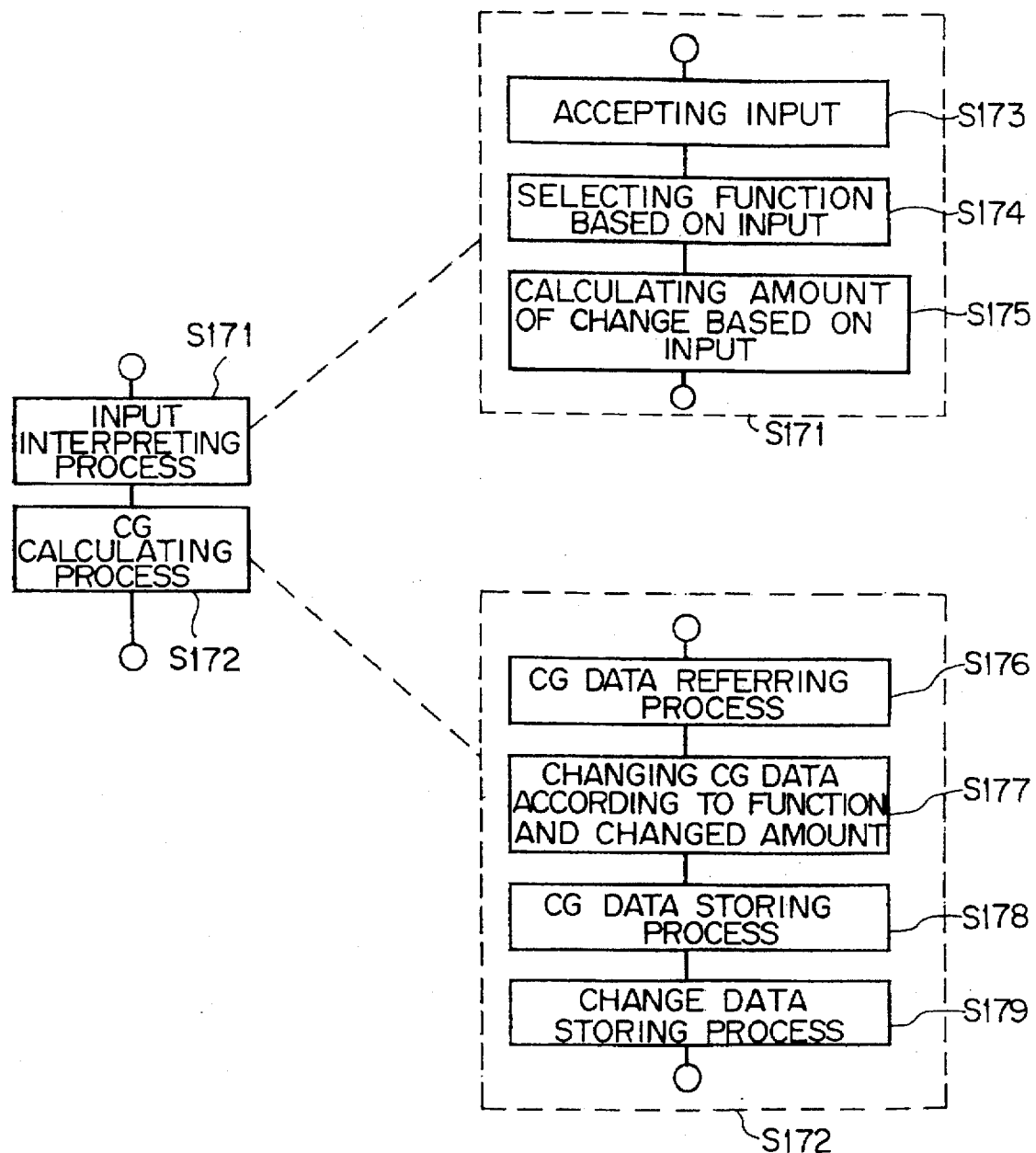
FIG. 58 is the detailed flowchart of the CG data management process.

The CG data management process in step S161 is composed of an input interpreting process in step S171 and a CG calculating process in step S172 as shown in FIG. 58. When the CG data management process is started, the input interpreting process is carried out in step S171. The input interpreting process in step S171 is composed of the processes in steps S173 through S175. First, data are input in step S173. The input is made through, for example, a mouse. Then, a function is selected in step S174 and the amount of a change is calculated in step S175 based on the input information. Interpreting is a selection of a function in step S174. For example, moving a mouse is interpreted as movement of a viewpoint. Calculating the amount of a change using the input data in step S175 is a process of obtaining data used in the following calculation, that is, data indicating that the mouse has moved 3 dots to the right.

If the input interpreting process in step S171 has been completed, the CG calculating process in step S172 is started. The CG calculating process in step S172 is composed of the processes in steps 176 through 179. First, in step S176, the CG data referring process is performed, and the CG data required in a calculation are referred to. In step S177, the CG data changed (change data) are obtained according to the function selected in step S174, the amount of a change obtained in step S175 and the present CG data. That is, obtained is the result that moving the mouse 3 dots to the right has made a change of 30° from the original viewpoint of 15° to a viewpoint of 45°. The change data are stored in the CG data storage unit 162 in the CG data storing process in step S178. Then, the change data are stored in the change data buffer 161 in the change data storing process in step S179.

Figure 59:
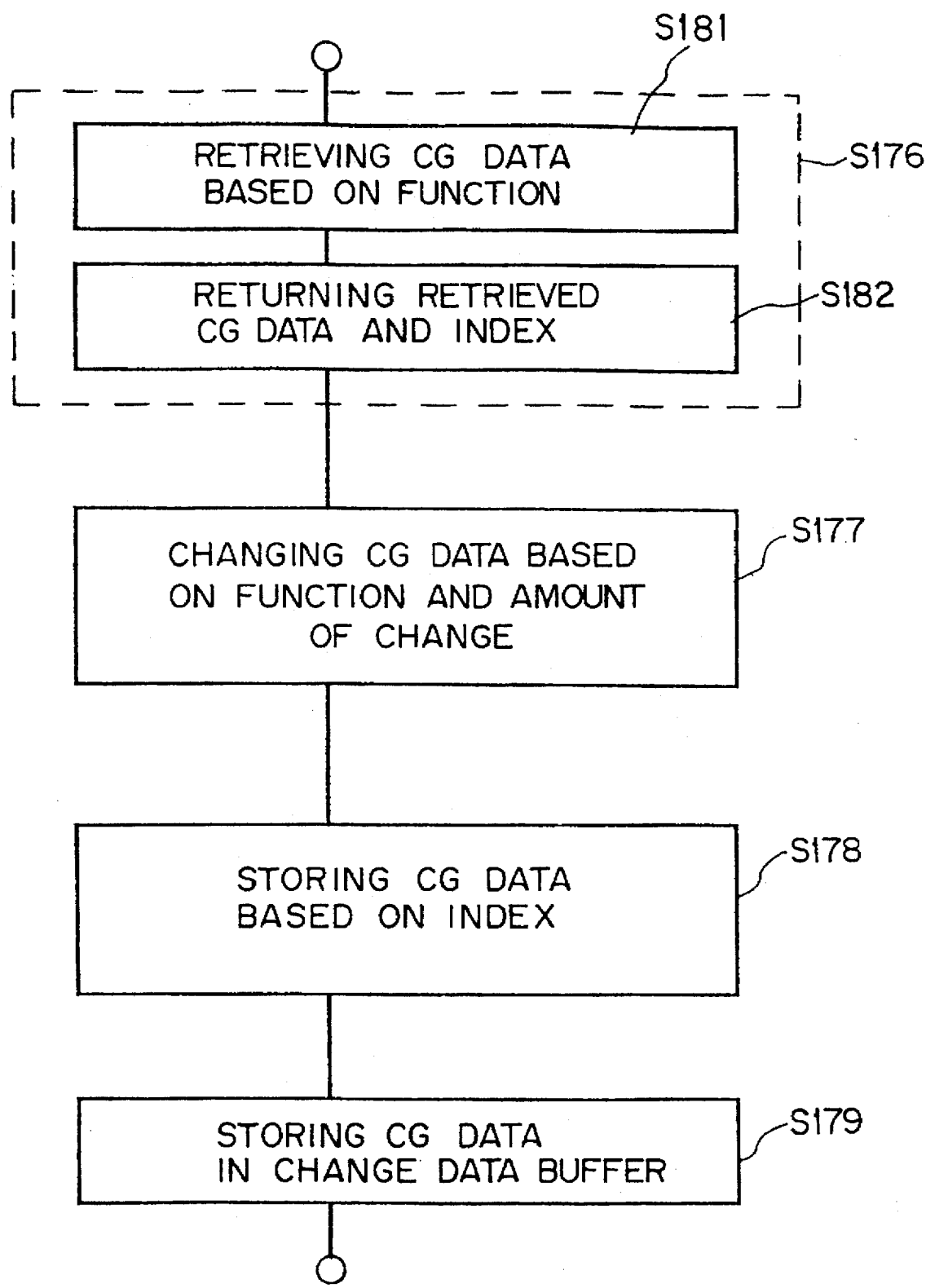
FIG. 59 is the detailed flowchart of the CG calculation process.

FIG. 59 shows further in detail the above described CG calculating process in step S172. First in the CG calculating process, CG data referring process is performed in step S176. That is, CG data are retrieved according to the function in step S181. Then, the retrieved CG data and their index are returned in step S182, and the CG data are changed in step S177 according to the function and the amount of the change. Then, in the CG data storing process in step S178, the CG data changed are stored according to the index in the CG data storage unit 162. In the change data storing process in step S179, the change data of CG data are stored in the change data buffer 161.

As described above, the first processing unit 18 starts its operation and stores change data in the change data buffer 161. If the change data buffer has stored the change data, the second processing unit 23 starts its operation.

Figure 60:
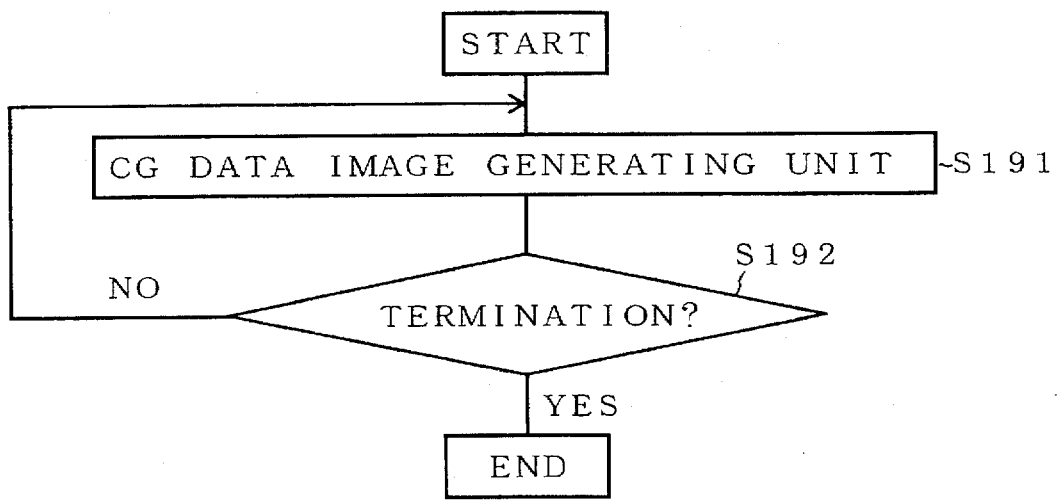
FIG. 60 is the flowchart of the operation of the second processing unit.

FIG. 60 shows the operation of the second processing unit 23. The CG data image generating unit 165 of the second processing unit 23 performs a CG data image generating process in step S191 in which image data representing an image to be displayed are generated from CG data. If the CG data image generating process has been completed, it is determined whether or not it has been actually completed. If no, the CG data image generating process is performed again in step S191.

FIG. 61 shows the above described CG data image generating process in step S191. When the process is started, the change data referring process is performed in step S201. First, in the change data referring process, it is determined in step S205 whether or not there are change data. If yes, a changed CG data storing process in step S206 is performed to store according to the index the changed CG data updated based on the change data. Then, it is determined again whether or not there are any change data in step S205.

If there are no change data (no in step S205), a changed CG data referring process is performed in step S202, and CG data are referred to according to an index, and are retrieved. Then, in step S203, the CG data referred to, that is, the read CG data are converted into an image. In step S204, it is determined whether or not all data have been referred to. If no, the processes are repeatedly performed again from step S202. If all data have been referred to, the CG data image generating process in step S191 terminates.

As described above, input images are managed by the first processing unit 18, and a changing process is performed based on change data and an image is generated simultaneously by the second processing unit 23. If two processors are used to manage the change data and to generate the image changed, they are operated in parallel. Parallel processing can be performed because the first processing unit 18 and the second processing unit 23 are provided with the CG data storage unit 162 and the changed CG data storage unit 164 respectively. Furthermore, only the data associated with a change are transmitted between the two processing units, the amount of the transmission data can be reduced, thereby taking a shorter time for transmission. That is, even if a large amount of CG data are changed at very short intervals, the CG data management unit 163 for managing CG data and the CG data image generating unit 165 for processing data changes are separately operated asynchronously at a high speed. Only transmitting a data portion directly changed reduces the amount of transmission data, thereby further speeding up the entire process.

In a process of a computer system operating with multi-process mechanism, an asynchronous operation realizes quick response of the system. Therefore, even a single computer system can perform the above described process at a high speed.

FIG. 62 shows the processes performed in parallel by the first processing unit 18 and the second processing unit 23. In FIG. 62, while a changed screen is generated based on the input by the (n−1)th operation in the CG data image generating process of the second processing unit 23, the n-th input is provided for the first processing unit 18.

At this time, the first processing unit 18 performs the n-th input interpreting process followed by the CG calculating process in parallel to the (n−1)th CG data image generating process of the second processing unit 23. If the (n−1)th CG data image generating process has been completed, the second processing unit 23 performs the n-th CG data image generating process based on the n-th change data received from the first processing unit 18.

The first processing unit 18 and the second processing unit 23 also process the (n+1)th and the (n+2)th inputs in parallel, and sequentially display CG data.

Figure 63:
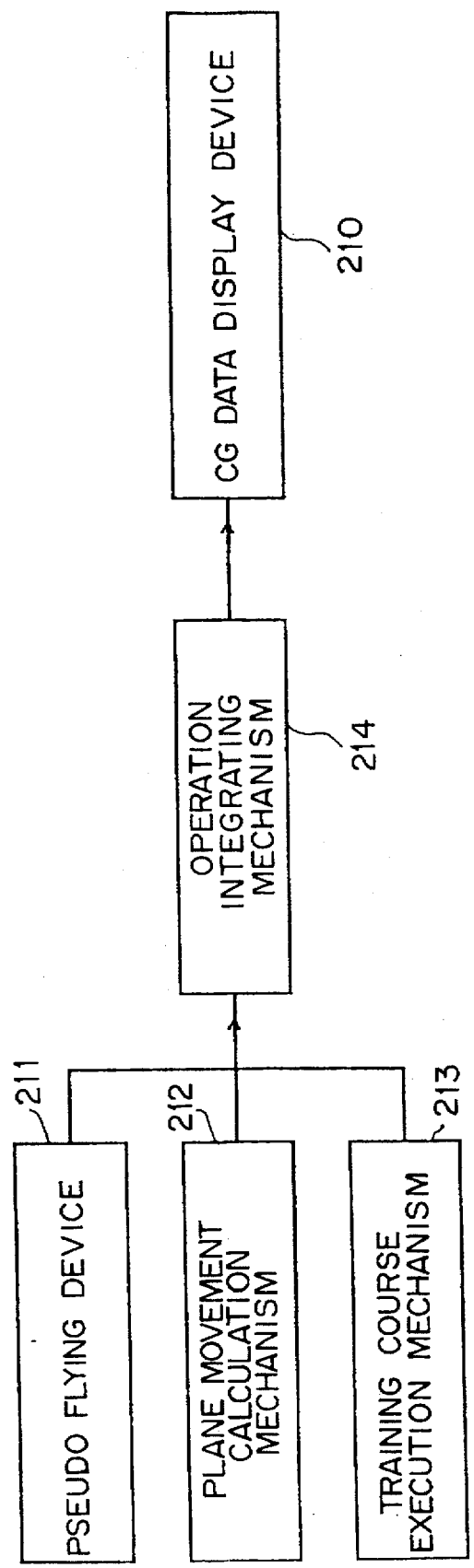
FIG. 63 shows the configuration of the flight simulator according to the fourth embodiment.
Figure 64:
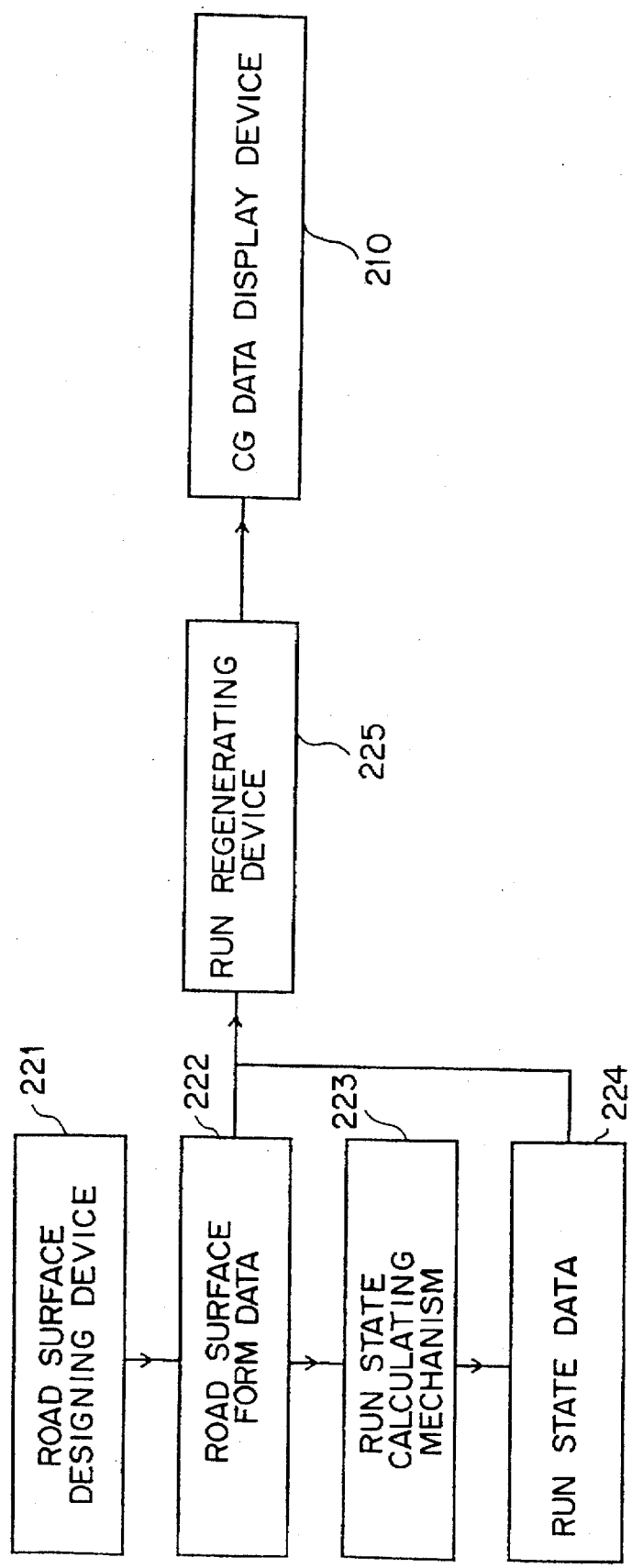
FIG. 64 shows the configuration of the test course simulator according to the fourth embodiment.
Figure 65:
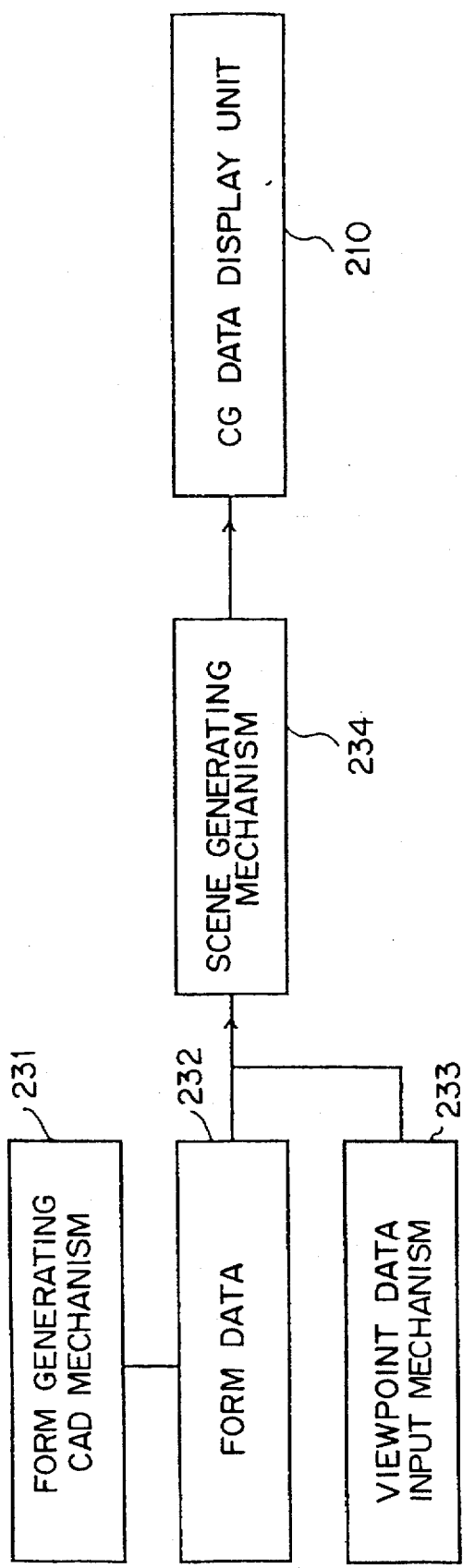
FIG. 65 shows the configuration of the scene simulator according to the fourth embodiment.

FIGS. 63 through 65 show more practical examples of the fourth embodiment. FIG. 63 shows the configuration of a flight simulator. FIG. 64 shows the configuration of a test course simulator. FIG. 65 shows the configuration of a scene simulator.

The flight simulator in FIGS. 63 simulates a flight of an airplane, and is provided with a CG data display device 210.

A pseudo flying device 211 comprises a user-operated handle, pedal, etc. which are input units of the simulator of flying the airplane. A plane movement calculation mechanism 212 calculates the present state of the plane body. For example, it calculates the state of the airplane as it is when the airplane is taking off or landing. A training course execution mechanism 213 instructs an operator to fly the airplane in accordance with the present training course if the present embodiment is a training simulator.

The information obtained by the above described device and mechanisms is input to an operation integrating mechanism 214. The operation integrating mechanism 214 generates a view from the present pilot seat and outputs to the CG data display device 210. Display data, that is, CG data, of various information to be displayed like a layout of an airport, a state of clouds, etc. are stored in the operation integrating mechanism 214 and output to the CG data display device 210 at any time when necessary. The CG data display device 210 has the configuration as shown in FIG. 53. Unless a new unit of display is specified, display images are generated according to the input information, for example, a specified direction, etc., and are displayed on a CRT or other display devices.

The test course simulator shown in FIG. 64 simulates the test course for an automobile. A road surface designing device 221 generates coordinate data of the surface of a course road including, for example, a bank obtained through a computer aided design (CAD), etc. The information generated by the road surface designing device 221 is input as road surface form data 222 to a run regenerating device 225. The road surface form data 222 are input to a run state calculating mechanism 223. The run state calculating mechanism 223 calculates and outputs run data in a specified run state. The run state calculating mechanism 223 generates run state data 224.

The run regenerating device 225 operates according to road surface form data 222 and run state data 224. Screen information at, for example, a bank is generated when a test run is performed, and is output to the CG data display device 210. The run regenerating device 225 preliminarily stores display information, that is, CG data in the CG data display device 210, moves a viewpoint according to the result of the run state, and instructs the CG data display device 210 to display an image from the viewpoint. Thus, a test course simulation can be realized.

FIG. 65 shows the configuration of a scene simulator. Form data 232 are generated by a form generating CAD mechanism 231. If a viewpoint data input mechanism 233 enters viewpoint data from which a scene is viewed, a scene generating mechanism 234 generates a scene as being viewed from the viewpoint, and outputs the scene to the CG data display device 210. For example, if a tower, for example, an iron tower is to be constructed, the system operates as follows. To evaluate the difference between the scene without a tower and the scene with the tower to be constructed, the CG data display device 210 preliminarily stores and displays the scene without the tower. If the form data 232 generated by the form generating CAD mechanism 231 are input as information about the tower, then the scene generating mechanism 234 inputs to the CG data display device 210 the changed portion display information, that is, the CG data of the tower, and the position information about the viewpoint of the scene. Then, the CG data display device 210 displays the scene with the tower. Even though the viewpoint has moved, the CG data display device 210 does not change all CG data, but changes only a necessary portion of the CG data and performs in parallel a display process associated with the change. Thus, the data can be displayed at a high speed.

The CG data management unit 163 according to the fourth embodiment is designed to receives an input through a program as well as an input by, for example, a mouse. The scene generating mechanism 234 can be provided with a program for moving a viewpoint along a predetermined course and generating a scene without any operation by a user. According to the information from the program, the CG data display device 210 generates and displays image data. That is, it operates as if viewpoint data were constantly received from the viewpoint data input mechanism 233.

The instruction from the program is not limited to the application in the scene simulator shown in FIG. 65, but can be used in a flight simulator and test course simulator. If these systems are the computer systems comprising a multi-process mechanism, then the CG data management unit 163 waits for a call for a function instead of monitoring the operation of a mouse.

Figure 66A:
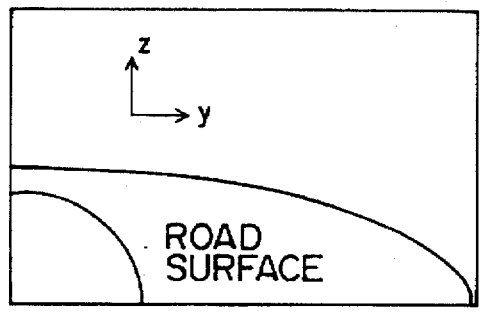
FIG. 66A shows an example of the display screen of the drive simulator according to the fourth embodiment.

To explain the fourth embodiment further in detail, a CG data display device applied to a drive simulator such as a test course simulator, etc. is more concretely explained below. FIG. 66A shows an example of a display screen of a drive simulator provided with the CG data display device 210. In FIG. 66A, the displayed three-dimensional world is represented by an xyz coordinate system, where the y axis is extended horizontally to the right, the z axis is extended vertically upward, and the x axis is extended inward in a vertical direction to the screen. Displayed on the screen shown in FIG. 66A is a scene from a driver's viewpoint toward the moving direction of the car. Moving a mouse to left and right corresponds to operating a handle. The distance between the center of the screen and the mouse pointer is set as the turn angle of the handle.

Assume that a user moves the mouse button 3 picture elements (3 dots) to the right from the center of the screen. In this case, the following determination is made.

A mechanism for monitoring the movement of a mouse is designed to cover the movement in a specified area of the X-WINDOW SYSTEM of UNIX, that is, control is passed to a specified function when the mouse is moved in a window of the X-WINDOW. If control is passed to the function, it is determined that the moving direction of the viewpoint has been changed.

If the mouse is moved, then control is passed to the specified function, and the moving distance and direction of the mouse are calculated based on the position of the mouse after the movement and the position of the mouse previously stored in a memory. The previous position is stored as the position of the mouse in the memory.

Assuming that the mouse has moved to the right the mouse has moved by a 3-picture-element distance, the input interpreting unit 191 of the CG data management unit 163 determines that the direction of the viewpoint has changed to the right with the change amount of 3 picture elements.

With the data, the CG calculating unit 192 requests the CG data referring unit 193 to refer to the present viewpoint data and the viewpoint movement data to perform a calculating process. That is, it provides a retrieval function with a viewpoint identifier and receives a pointer to a structure of a viewpoint. The CG data referring unit 193 retrieves the CG data in the CG data storage unit 162 and obtains a three-dimensional coordinate, a direction vector and a speed of the movement at the position.

Figure 68:
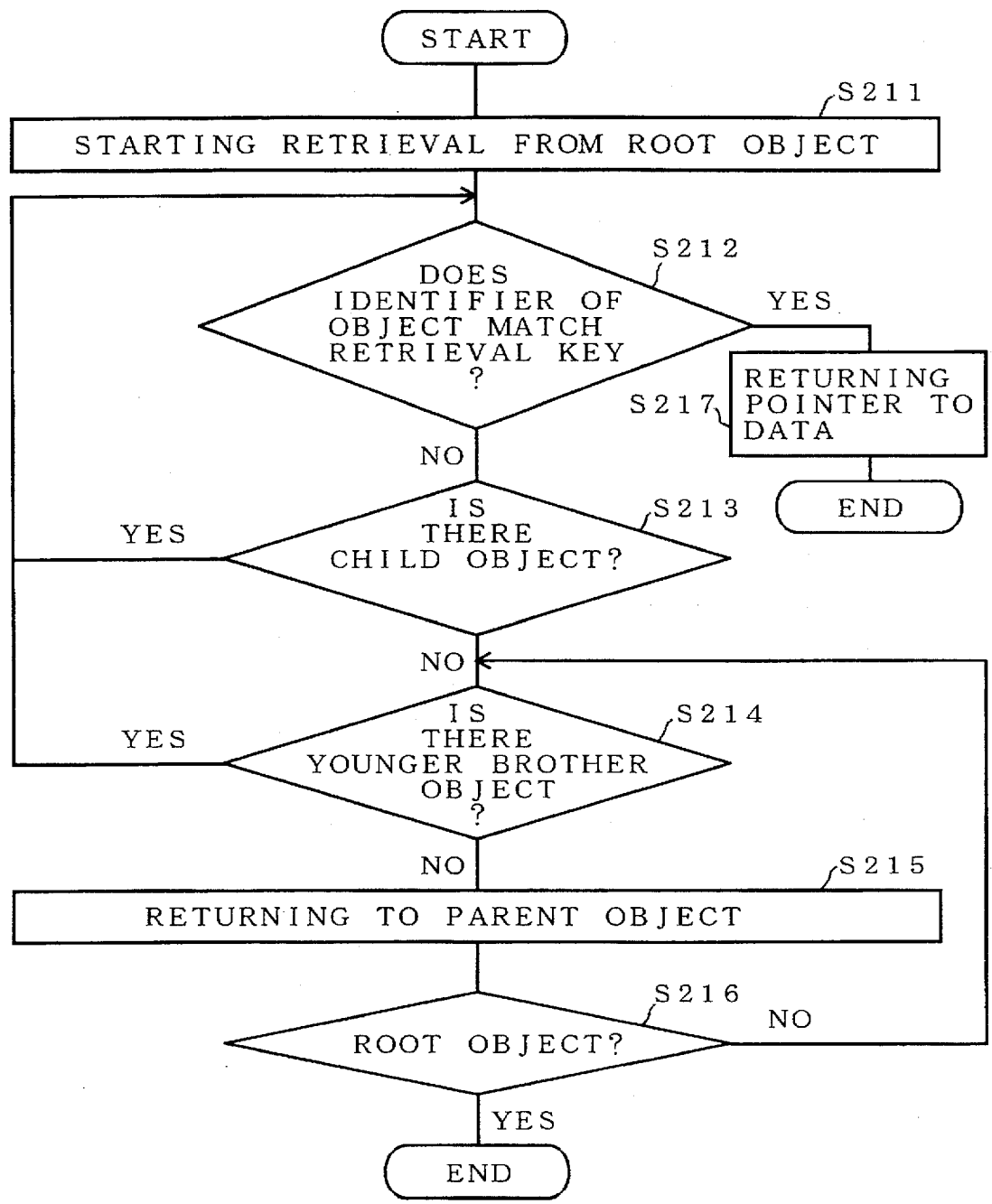
FIG. 68 is the flowchart of the data retrieval process.

The data of the fourth embodiment form a tree structure. FIG. 67 shows a data structure according to the C language. FIG. 68 is a flowchart of retrieving in an object tree.

The identifier of the above described retrieval, that is, a retrieval key, is an identifier of the viewpoint associated with the change request. Based on the identifier, the retrieval is performed as follows. First, the retrieval process starts with a retrieval start object (root object) (step S211). Then, it is determined whether or not the retrieval key and the identifier of the object match each other (step S212). If yes, a pointer to data of the object is returned and the retrieval process terminates (step S217). If they don't match, it is checked whether or not it has any child object (step S213). If the object has any child object, then control is returned to the process in step S212 to retrieve the child object. If the object has no child objects, it is checked whether or not the object has any younger brother object (step S214). If yes, control is returned to the process in step S212 to retrieve the younger brother object. If the object has no younger brother objects, its parent object is to be retrieved, but is not actually retrieved (step S215). Then, it is checked whether or not the parent object is a root object (step S216). If yes, the retrieval is determined to have failed. Unless the parent object is a root object, the processes in and after step S214 are performed. Thus, the CG data are retrieved.

The above described operation of the drive simulator is explained below furthermore in detail. For example, the retrieved three-dimensional coordinate of the viewpoint, the movement direction vector, and the speed are set as follows.

3-dimensional coordinate of viewpoint:
(100. 0, 200. 0, 0. 6)
movement direction vector:
(1. 0, 0. 0, 0. 0)
speed: 10.0

The movement direction vector is extended toward the positive direction of the x axis.

The CG calculating unit 192 changes the direction vector by +3° to the right based on the data received from the CG data referring unit 193 and the data received from the input interpreting unit 191 indicating a 3-picture-element movement to the right. That is, the changed movement direction vector is represented as follows.

movement direction vector:
(0. 998, 0. 052, 0. 0)

Then, the CG calculating unit 192 calculates the increment after the movement based on a new movement direction vector and speed. At this time, a velocity vector is generated by multiplying each element of the new movement direction vector by the speed. The resultant velocity vector is represented as follows.

velocity vector: (9. 980, 0. 520, 0. 0)

The velocity vector gives a movement increment for the viewpoint.

Furthermore, the CG calculating unit 192 calculates the three-dimensional coordinate of a new viewpoint by adding each element of the velocity vector to the three-dimensional coordinate of the present viewpoint. The three-dimensional coordinate is represented as follows.

three-dimensional coordinate of the viewpoint:
(109,. 980, 200. 520, 0. 6)

Then, the CG calculating unit 192 requests the CG data storing unit 195 to store the three-dimensional coordinate of the new viewpoint and the movement direction vector. The CG data storing unit 195 stores these data in the CG data storage unit 162. The stored three-dimensional coordinate of the viewpoint and the movement direction vector are represented as follows.

```
three-dimensional coordinate of the viewpoint:
         (109. 980, 200. 520, 0. 6)
       movement direction vector:
         (0. 980, 0. 052, 0. 0)
```

After the CG data storing unit 195 has stored the data, the CG calculating unit 192 requests the change data storing unit 194 to store change data. The change data refer to the three-dimensional coordinate of a new viewpoint. The three-dimensional coordinate of the three-dimensional viewpoint stored by the change data storing unit 194 is acquired by the image generating unit 202 of the second processing unit 23. That is, the image generating unit 202 reads the three-dimensional coordinate of the viewpoint stored in the changed data buffer 161.

```
three-dimensional coordinate of the viewpoint:
         (109. 980, 200. 520, 0. 6)
```

Then, the image generating unit 202 transmits the three-dimensional coordinate of the viewpoint to the change data referring unit 203 and requests it to update the data. By the instruction from the change data referring unit 203, the changed CG data storing unit 204 updates and stores the three-dimensional coordinate of the viewpoint stored in the changed CG data storage unit 164.

Figure 66B:
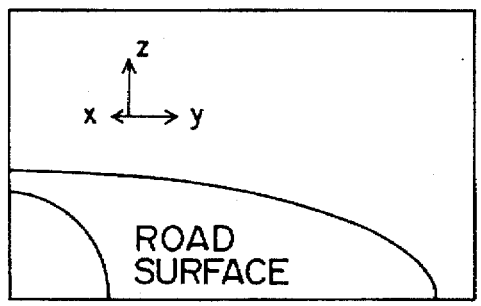
FIG. 66B shows an example of the changed display screen of the drive simulator according to the fourth embodiment.

Then, the image generating unit 202 refers to the CG data to be displayed through the changed CG data referring unit 201, and generates images. The changed CG data referring unit 201 refers to the changed CG data storage unit 164 using a pointer, and passes the reference result to the image generating unit 202 which generates and displays images. FIG. 66B shows the new image to be displayed. Since the movement direction vector is vertical to the screen and is extended inward the screen as in the case shown in FIG. 66A, the x axis is turned 3° to the left compared with the state shown in FIG. 66A. Accordingly, the road surface is represented and displayed as being entirely changed.

FIG. 69 shows the movement of a viewpoint. When a chair is displayed in a state ST on a screen, clicking a mouse cursor X at a left point to the center of the screen moves the viewpoint to the left, thereby displaying the chair in a state ST' from a different viewpoint.

Figure 70:
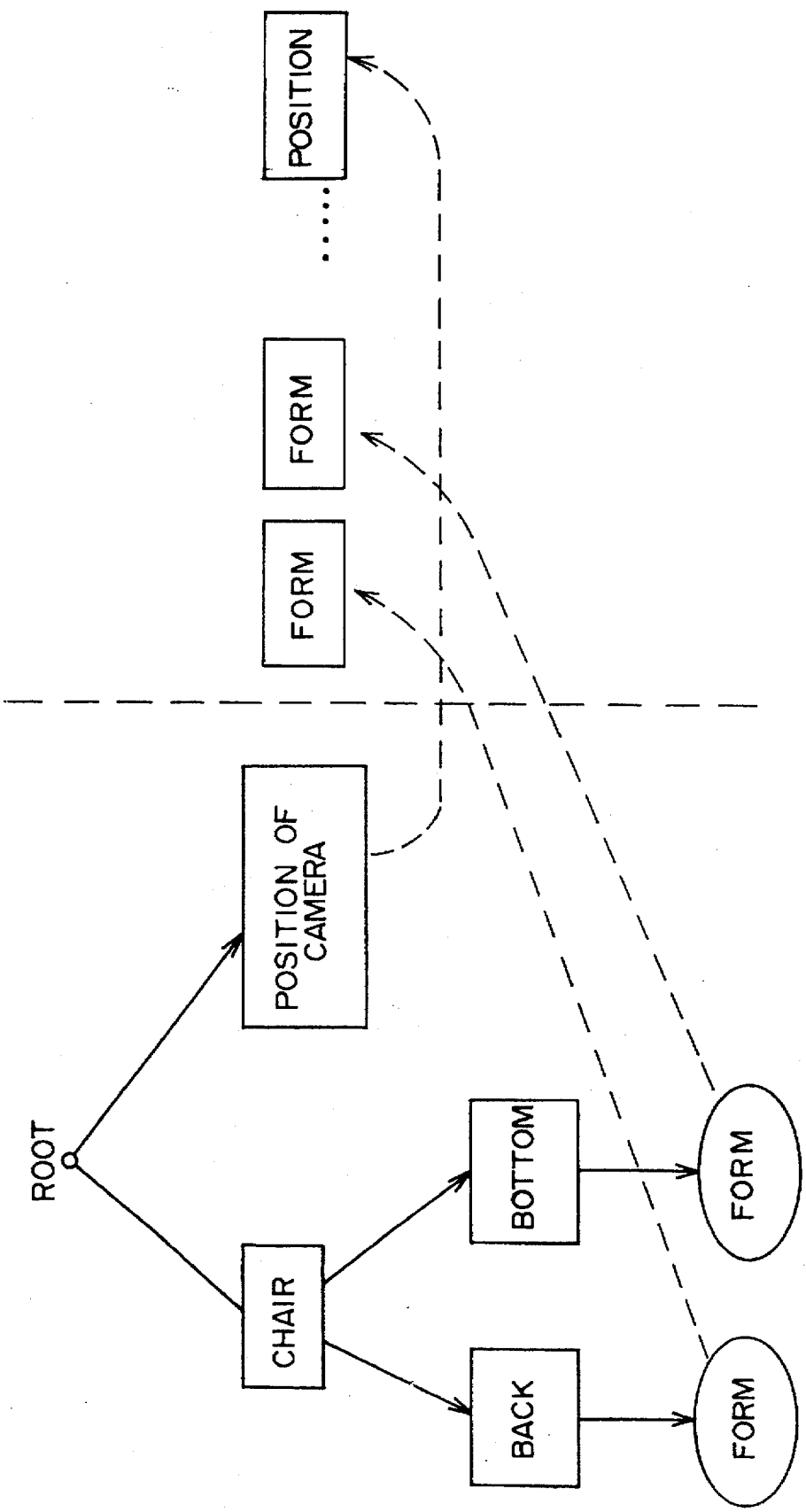
FIG. 70 shows an example of the configuration of the CG data.

FIG. 70 shows an example of the configuration of the CG data according to the fourth embodiment. In the example according to the fourth embodiment, the CG data stored in the CG data storage unit 162 are represented by process codes. For example, when a chair is represented, the chair is specified using a process code through a root object. Then, a back object and a bottom object are provided as child objects of the chair. The back and bottom objects have information about their forms for use in display. A camera position object is stored at a brother position, that is, at the equal level as that of the chair. That is, the objects are stored in a tree structure.

According to the fourth embodiment, the storage format can be either the same or different between the CG data storage unit 162 and the changed CG data storage unit 164. For example, as shown in FIG. 70, the CG data can be stored at a same level in the changed CG data storage unit 164. That is, the items such as a back form, bottom form, camera position, etc. are defined as data at an equal level, thereby equalizing the access time in a display process.

Figure 71:
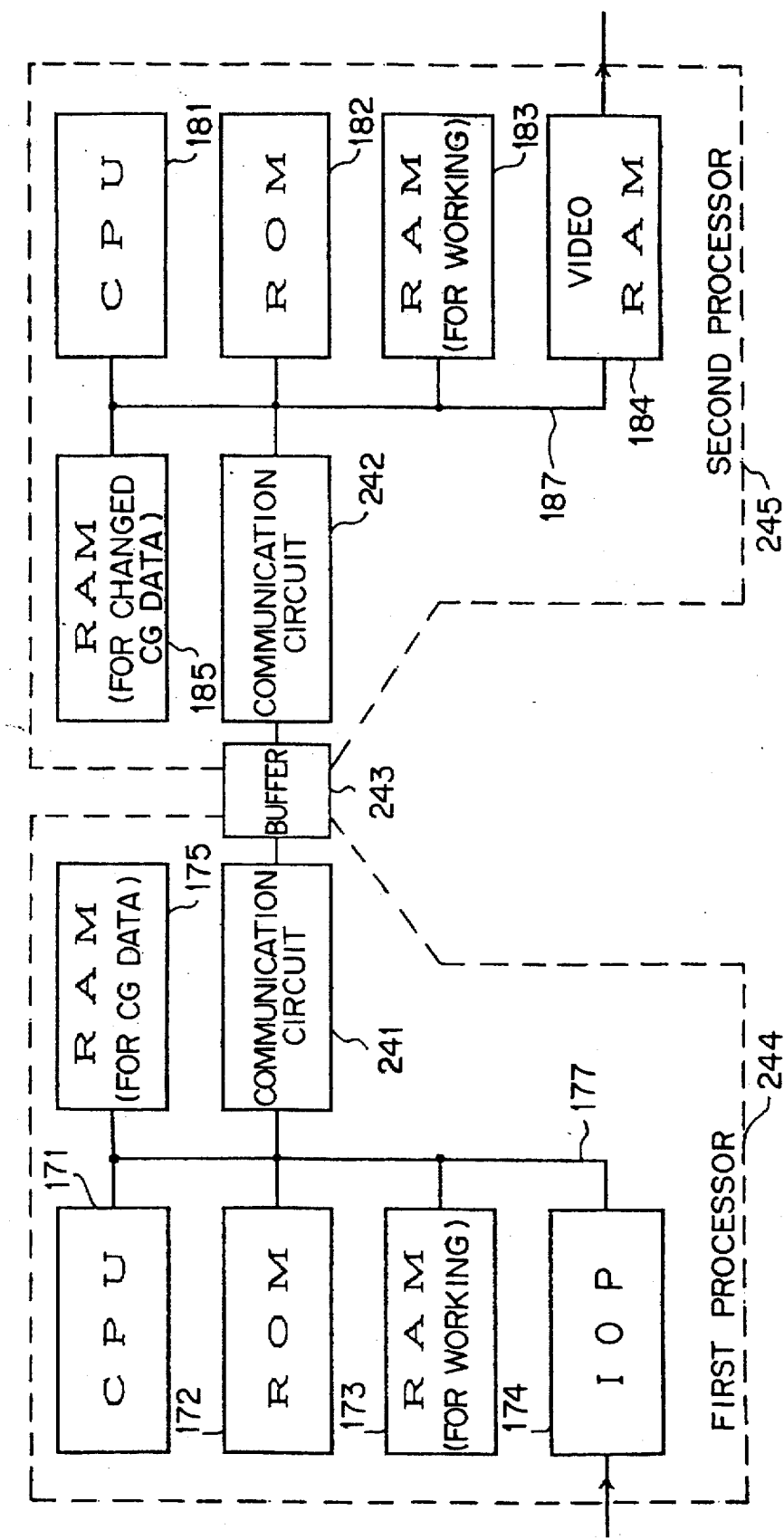
FIG. 71 shows the configuration of another system according to the fourth embodiment.

FIG. 71 shows an example of another configuration according to the fourth embodiment. In FIG. 71, a unit also shown in FIG. 54 is assigned a corresponding number. According to the embodiment shown in FIG. 54, data are transmitted through the shared memory 178. According to the embodiment shown in FIG. 71, data are transmitted through a communication circuit 241 of a first processor 244 and a communication circuit 242 of a second processor 245. A buffer 243 is provided between the communication circuits to release the first processor 244 and the second processor 245 from a synchronous operation with each other. The buffer 243 corresponds to the change data buffer 161 shown in FIG. 53.

Figure 72:
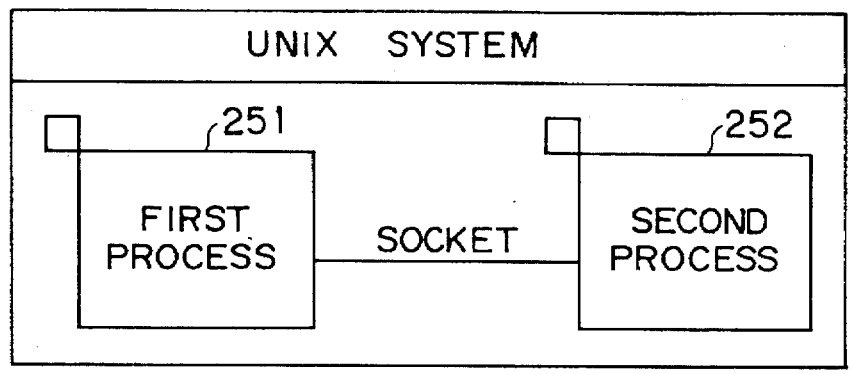
FIG. 72 shows the fourth embodiment realized by the multiprocess capabilities.

The CG data display device is described above according to the fourth embodiment, but the fourth embodiment is not limited to a system operated with a multiprocessor. For example, it can be operated with a single-processor system when a multiple-process function is provided under the control of an operating system. The communications between a plurality of processes are performed through an inter-process communication, for example, like a socket in a UNIX system. FIG. 72 shows the CG data display device according to the fourth embodiment realized with a UNIX system. In FIG. 72, a first process 251 performs a CG data management process shown in FIG. 57, and transmits change data to a second process 252 through a socket connected between the first process 251 and the second process 252. The first process 251 writes change data onto the socket in the change data storing process in step S179 shown in FIG. 57. The second process 252 performs the CG data image generating process shown in FIG. 60, and reads change data from the socket in the change data referring process in step S201 shown in FIG. 61. In the fourth embodiment, since the amount of data communicated through the socket is reduced to the lowest possible level, the image generating process can be performed at a high speed.

Furthermore, the first processing unit 18 and the second processing unit 23 shown in FIG. 53 can be designed separately as a logic circuit. According to the embodiment shown in FIG. 54, external CG data are stored in a RAM. If display contents are limited, however, they can be preliminarily stored in a ROM and transmitted to a RAM when necessary.

As described above, a process performed in a CG data display device can be divided into two portions for each of which a processing unit is provided according to the fourth embodiment. Since each processing unit is provided with CG data, only change data relative to a change has to be transmitted, thereby shortening the time taken for transmission and successfully realizing a high-speed process. Furthermore, the two processing units operate in parallel and the amount of data transmitted between the two processes are considerably reduced. Therefore, the image display process can be performed at a high speed with dynamic images represented realistically and static images changed immediately after a change of scene.

Figure 1:
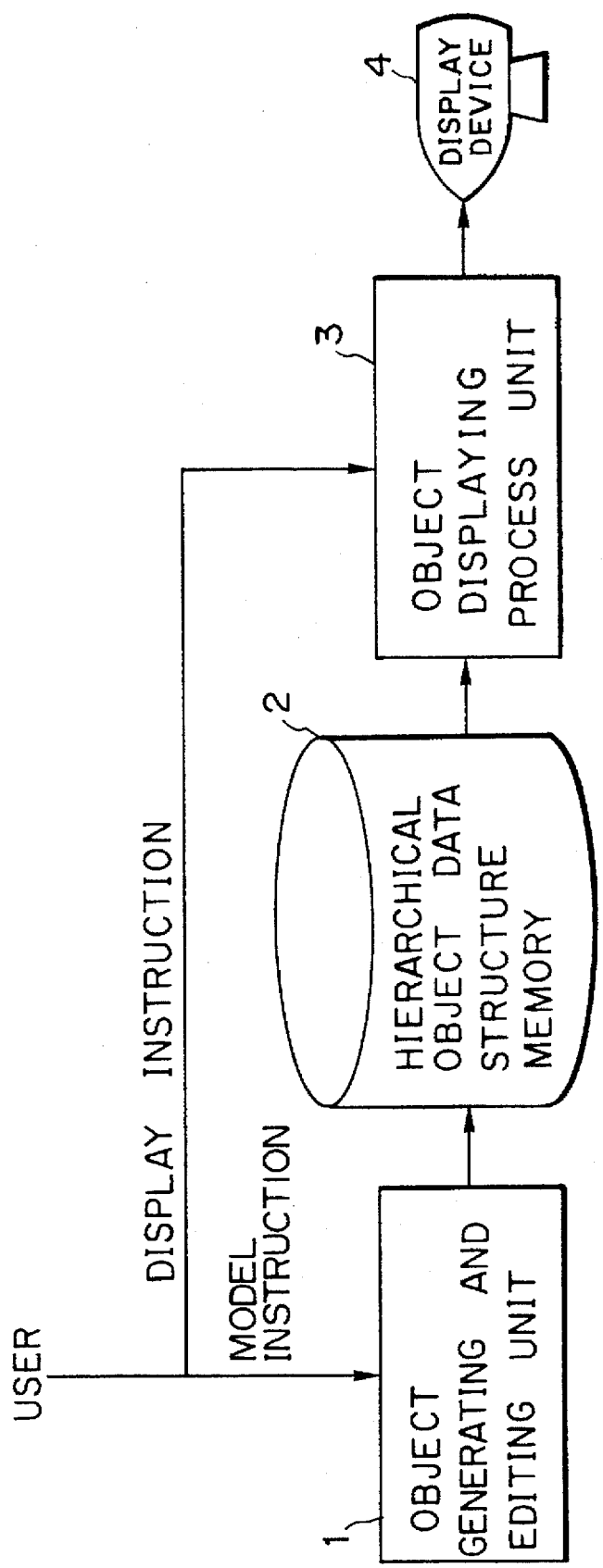
FIG. 1 shows the configuration of the important portion of a common three-dimensional object display device.
Figure 73:
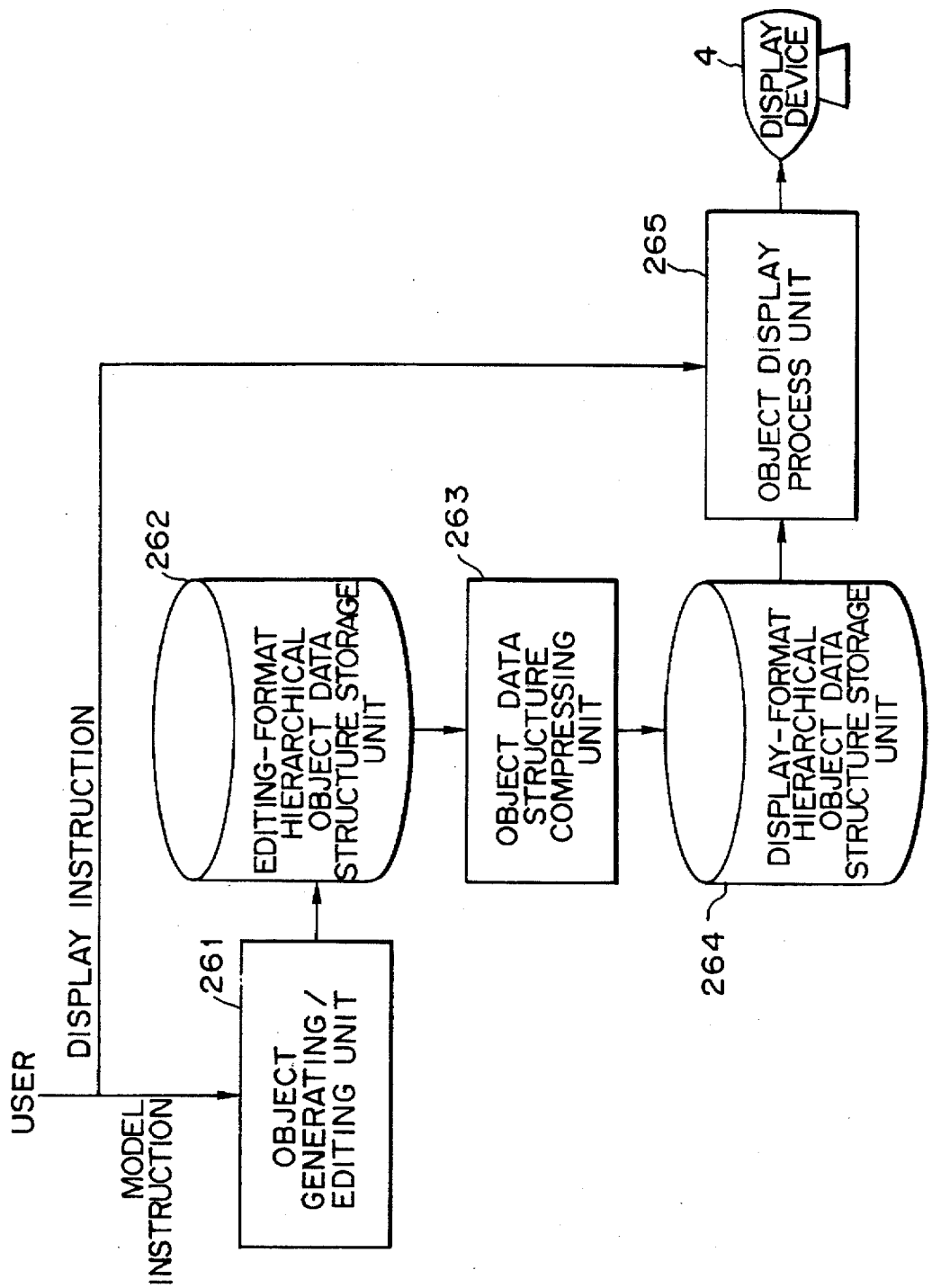
FIG. 73 shows the configuration of the important portion according to the fifth embodiment.

FIG. 73 shows the configuration of the important portion of the three-dimensional object display device according to the fifth embodiment of the CG data display device of the present invention. The fifth embodiment comprises an object data structure compressing unit 263 and a display-format hierarchical object data structure storage unit 264 not included in the conventional device shown .in FIG. 1. As shown in FIG. 73, the object data structure compressing unit 263 is connected between an editing-format hierarchical object data structure storage unit 262 and a display-format hierarchical object data structure storage unit 264. The display-format hierarchical object data structure storage unit 264 outputs display CG data to an object display process unit 265.

A model instruction is transmitted from a user to an object generating/editing unit 261, and a display instruction is concurrently transmitted from the user to the object display process unit 265. In FIG. 73, there are two storage units each having a hierarchical object data structure. One unit has an editing-format hierarchical object data structure, and the other has a display-format hierarchical object data structure.

Upon receipt of a model instruction from a user, the object generating/editing unit 261 updates the hierarchical object data structure in the editing-format hierarchical object data structure storage unit 262. At this time, the object data structure compressing unit 263 compresses the hierarchical object data structure according to predetermined rules, and updates the display-format hierarchical object data structure in the display-format hierarchical object data structure storage unit 264 based on the compression result. The object display process unit 265 processes the data in the display-format hierarchical object data structure storage unit 264, generates image data, and displays them on the screen of the display device 4.

Thus, the display-format hierarchical object data structure are sequentially updated, compressed, retrieved at a user's display instruction, and actually displayed. The display-format hierarchical object data structure is considerably reduced in depth of structure or in number of objects when compared with the editing-format hierarchical object data structure in the editing-format hierarchical object data structure storage unit 262, thereby shortening retrieval time and ensuring a high-speed process.

The process of compressing the hierarchical object data structure according to the fifth embodiment is very unique. That is, when the hierarchical object data structure in the editing-format hierarchical object data structure storage unit 262 is updated through the object generating/editing unit 261 at a user's model instruction, the object data structure compressing unit 263 compresses the editing-hierarchical object data structure, and simultaneously updates the display-format hierarchical object data structure based on the compression result.

Compressing a hierarchical object data structure is expanding a child object inheriting an attribute of a parent object and storing the child object in the parent object. The expanding process copies the attribute of the child object to its parent object. However, this process should be performed by checking a user's access request so as not to affect an operation in a user's modeling process.

Figure 74A:
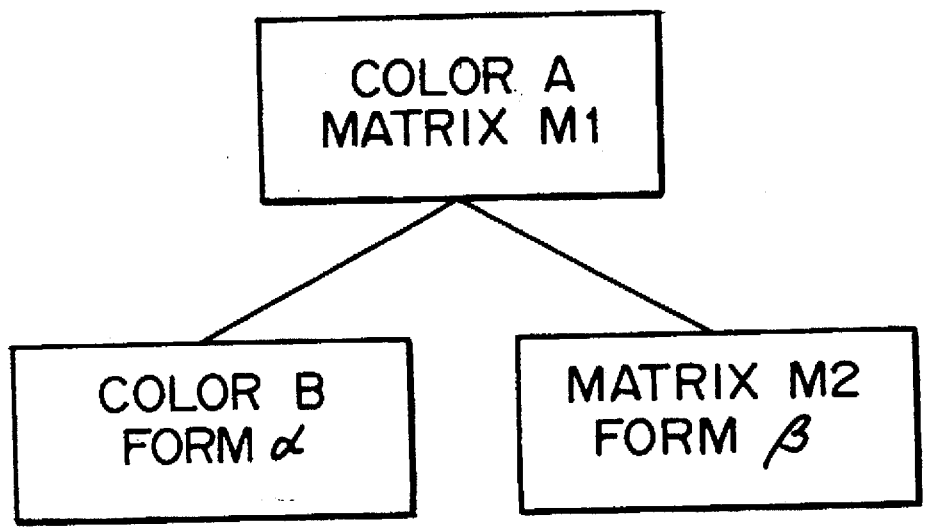
FIG. 74A shows an example of a hierarchical object data structure composed of three objects.
Figure 74B:
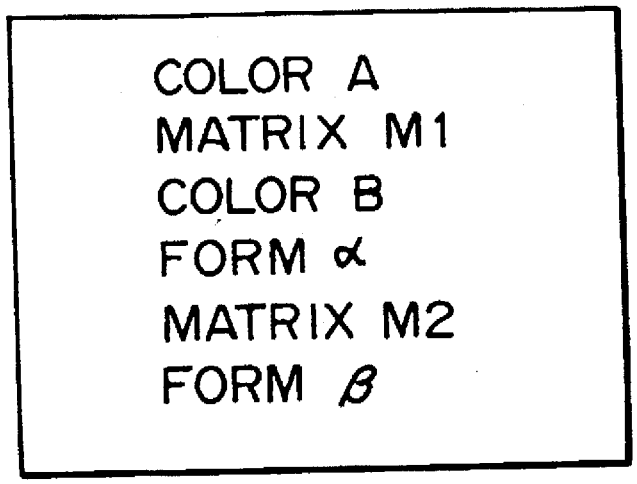
FIG. 74B shows an example of a hierarchical object data structure compressed by ignoring the inheritance of objects.

The process of compressing a hierarchical object data structure presents a problem when objects are simply combined. That is, the attribute inheritance characteristic between a parent object and a child object should be maintained. For example, FIG. 74B shows an example of an erroneous compression in which the inheritance of objects shown in FIG. 74A is ignored. In FIG. 74A, although a child object having form β has been generated such that it inherits color A of its parent, it actually shows color B of a child object having form α as a result of the compression shown in FIG. 74B.

Typical attributes having inheritance characteristics of an object are color, texture, and transformation matrix. The attribute not having the inheritance characteristics is form.

A number of objects use the inheritance characteristics for color and texture. That is, utilizing the inheritance characteristics for color and texture can considerably reduce the number of objects and hierarchical levels.

Regarding the transformation matrix, an object data structure can be compressed under a consideration of inheritance of it as well as color and texture if the matrix relates to a world coordinate which is an absolute coordinate. If the transformation matrix of a child is a relative transformation matrix between the coordinate of a parent and that of a child, then the transformation matrix in a world coordinate system of the child object is calculated by multiplying the transformation matrix of the world coordinate system of the parent by the relative transformation matrix. Therefore, a relative transformation matrix does not show inheritance of an attribute. In this case, the transformation matrix of the world coordinate system of the child is also calculated and stored in the display-format hierarchical object data structure storage unit 264 to perform a compressing process.

Figure 2:
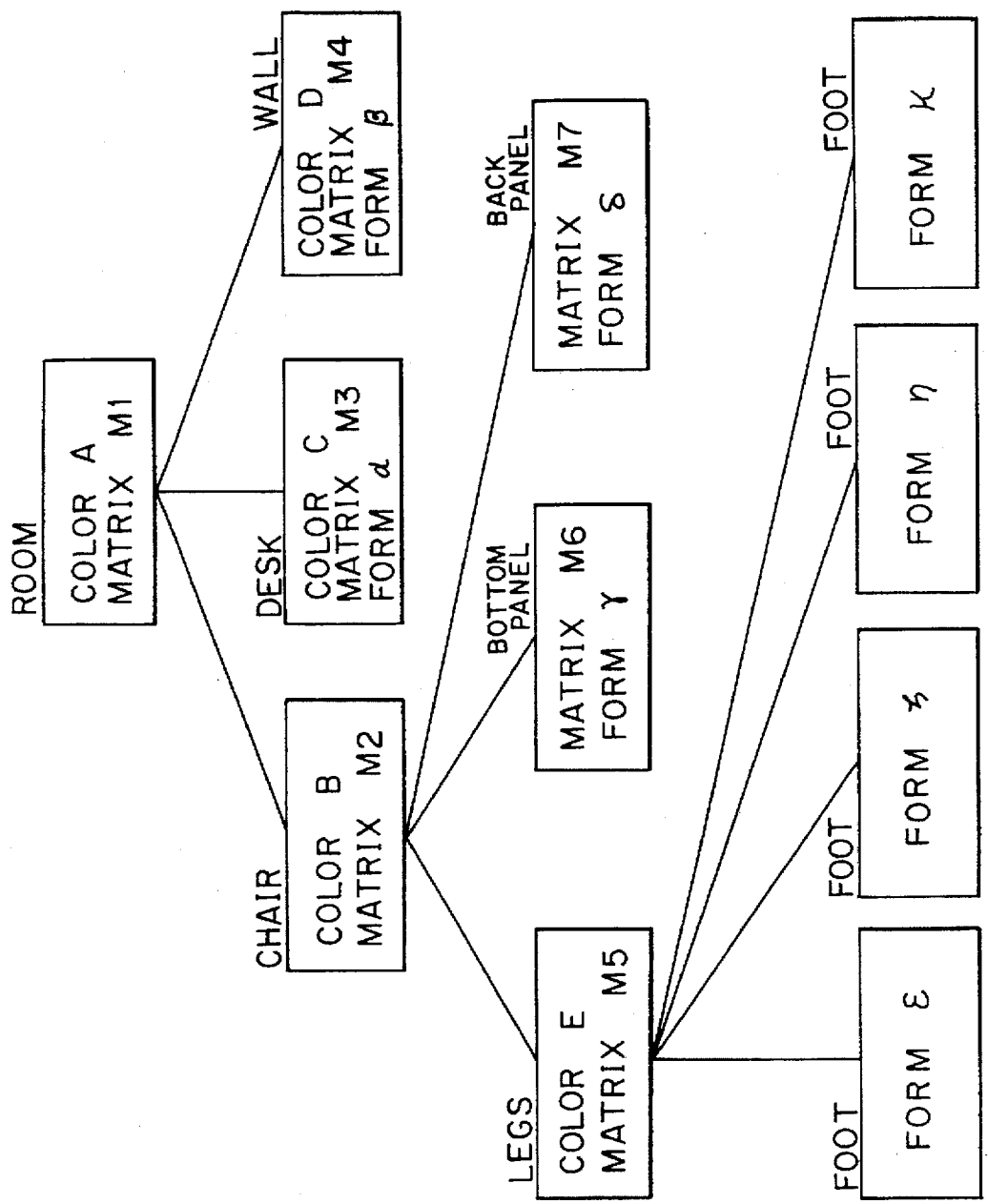
FIG. 2 shows an example of a hierarchical object data structure.
Figure 75:
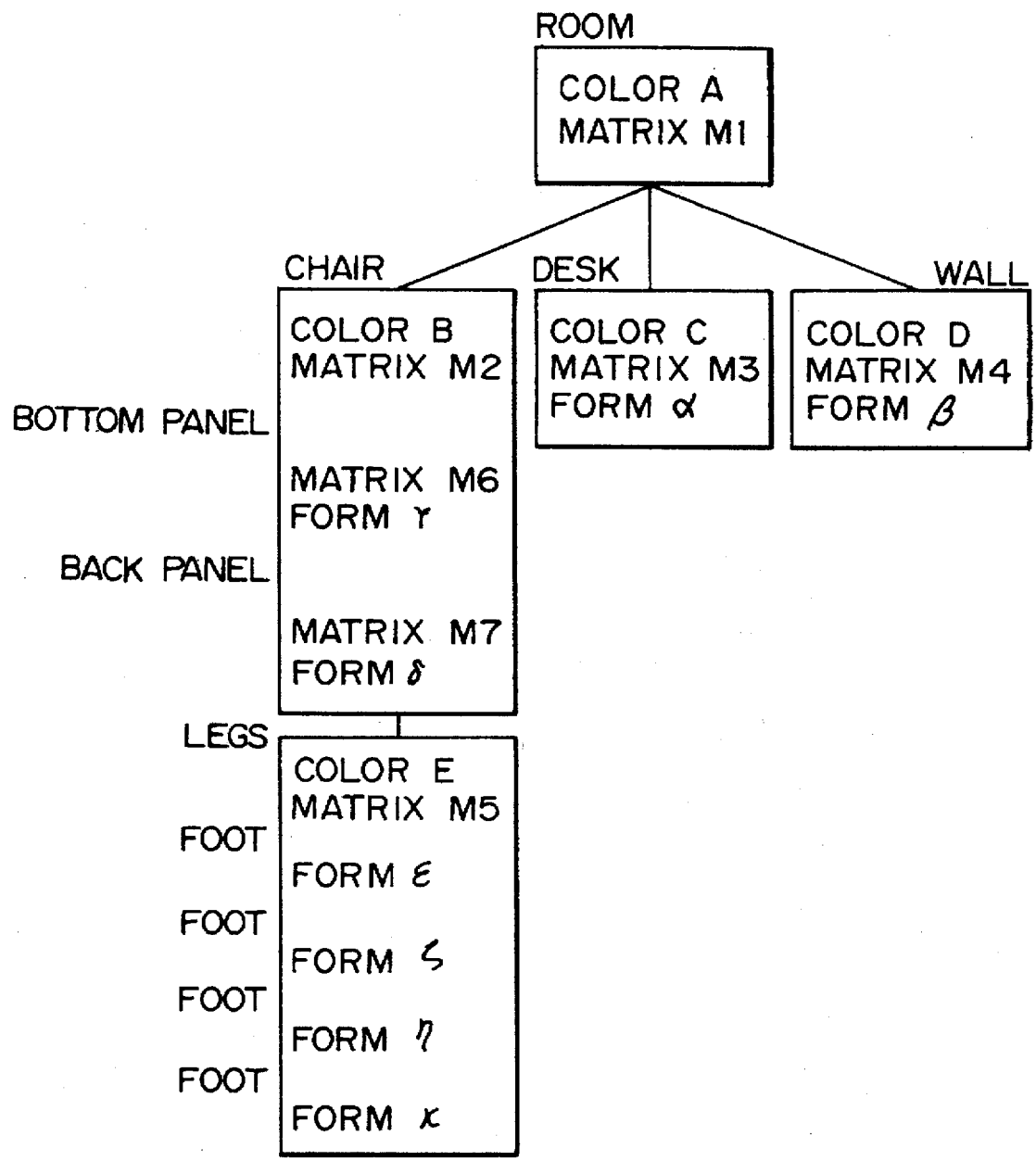
FIG. 75 shows an example of a hierarchical object data structure compressed according to color attributes according to the fifth embodiment.

FIG. 75 shows an example of a compressing process for a color attribute of an object shown in FIG. 2. The process is performed by the object data structure compressing unit 263 shown in FIG. 73. FIG. 2 shows the hierarchical object data structure at the time of editing an object. FIG. 75 shows the hierarchical object data structure after the compressing process according to the fifth embodiment. In this case, an object data structure compressing process is performed using the attribute inheritance characteristic. The present example is also an object-editing-format hierarchical object data structure as a model of the room represented by the conventional method shown in FIG. 2.

As shown in FIG. 75, the four objects as the feet of the chair inherit color E of the parent legs. Accordingly, these objects can be ended into the parent and stored, and they maintains the inheritance characteristic after expansion. Since the bottom panel and the back panel similarly inherit color B of the parent indicating the chair, they can be compressed and expanded into the parent object. A "expansion" indicates that an attribute of a child node is copied to its parent node. However, the legs object does not inherit the color of the chair, that is, the parent of the legs, but indicates its own color E. Therefore, it cannot be expanded. FIG. 75 shows the final display-format hierarchical object data structure processed by the compression through the above described expansion.

In FIG. 2, the depth of the hierarchy of the object tree is four levels and the number of objects is 11. On the other hand, in FIG. 75, the depth of the hierarchy is 3 levels and the number of objects is 5. That is, the object data structure is compressed.

Figure 76A:
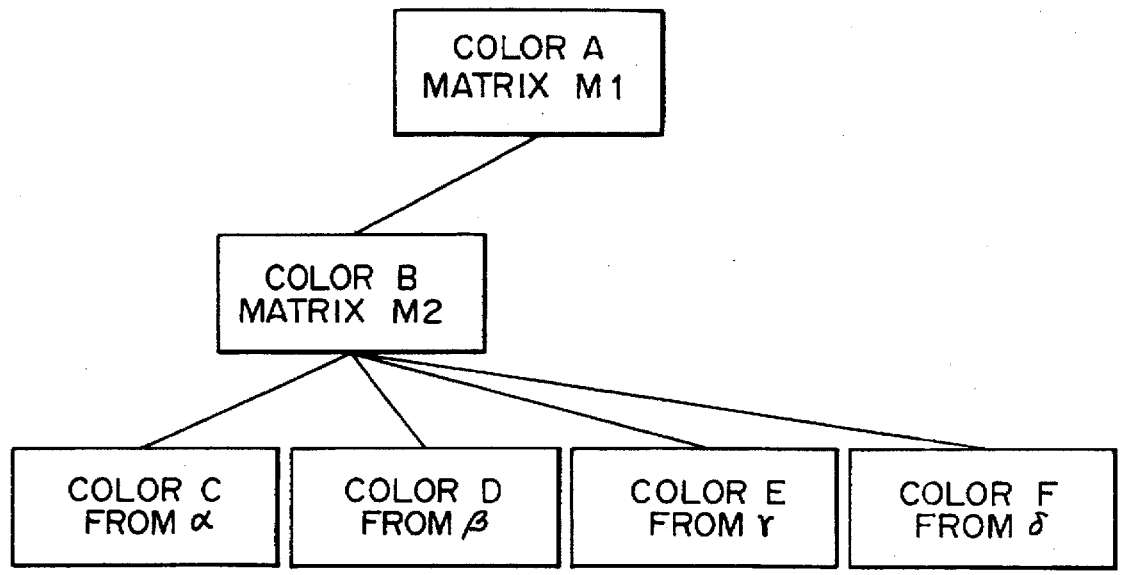
FIG. 76A shows an example of the hierarchical object data structure inheriting a transformation matrix.
Figure 76B:
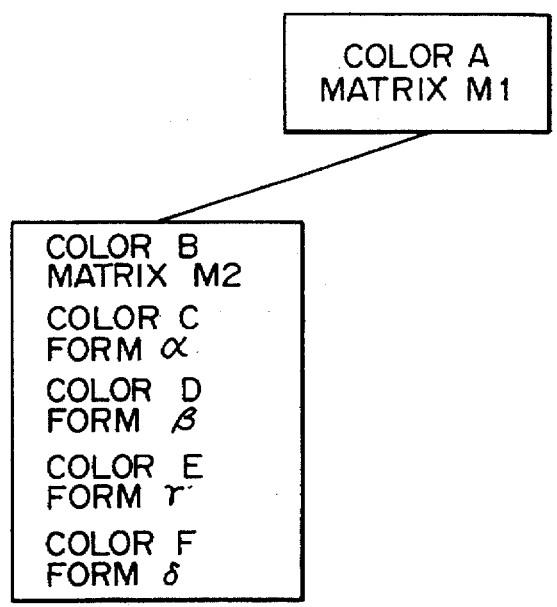
FIG. 76B shows an example of a hierarchical object data structure compressed according to transformation matrix attributes according to the fifth embodiment.

FIG. 76B shows an example of a compressing process for the attribute of the transformation matrix of the object shown in FIG. 76A. FIG. 76A shows the hierarchical data structure at a time of editing an object. FIG. 76B shows the hierarchical object data structure after the compressing process according to the fifth embodiment. FIG. 76A shows the case in which four child objects having specific colors and forms inherit the transformation matrix M2 of their parent. In this case, simply changing the transformation matrix M2 of the parent converts the coordinates of the four child objects according to the changed transformation matrix. The child objects can be expanded into their parent object and stored, thereby the object data structure can be compressed.

In FIG. 76A, the depth of the hierarchy is 3 levels, and the number of objects is 6. On the other hand, in FIG. 76B, the depth of the hierarchy is 2 levels, and the number of objects is 2 by compressing the object data structure.

Figure 77A:
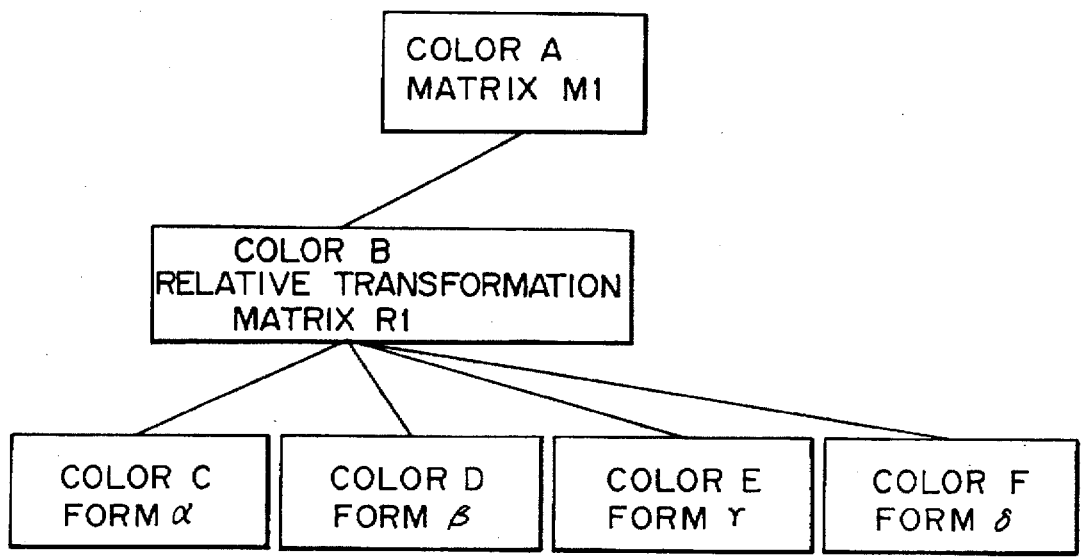
FIG. 77A shows an example of the hierarchical object data structure inheriting a relative transformation matrix.
Figure 77B:
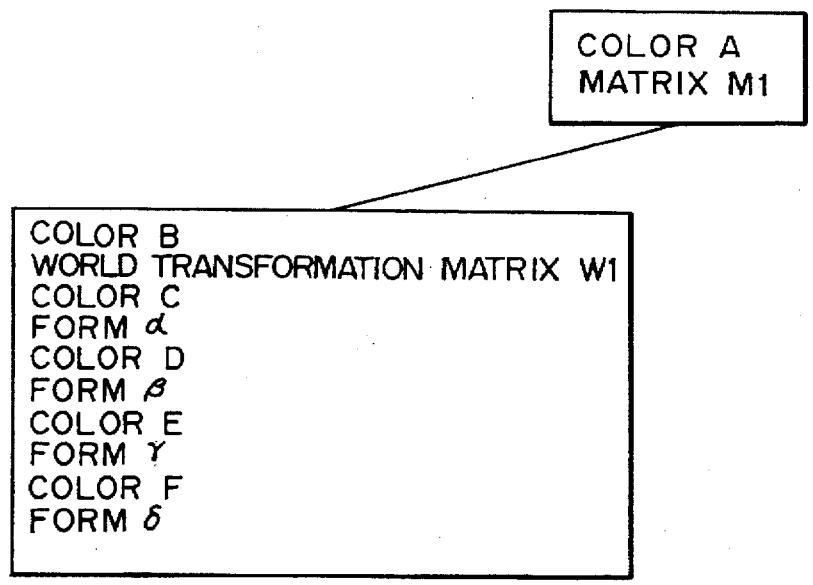
FIGS. 77B shows an example of a hierarchical object data structure compressed according to relative transformation matrix attributes according to the fifth embodiment.

FIG. 77B shows an example of a compressing process for the attribute of the object having the relative transformation matrix shown in FIG. 77A. FIG. 77A shows the hierarchical data structure at a time of editing an object. FIG. 77B shows the hierarchical object data structure after the compressing process according to the fifth embodiment. Fundamentally, the compressing process is performed similarly as shown in FIG. 75 while the relative transformation matrix R1 in the object-editing-format hierarchical object data structure is replaced with the transformation matrix in the world coordinate system (world transformation matrix) W1. Then, the world transformation matrix W1 is stored in the display-format hierarchical object data structure.

FIG. 77A shows the case in which four child objects having specific colors and forms inherit the relative transformation matrix R1 of their parent. Simply changing the relative transformation matrix R1 of the parent converts the coordinates of the four child objects. In this case, simultaneously calculating the transformation matrices of the world coordinate system of the parent and the four children according to the method described later expands and stores the child objects to the parent object with respect to the world transformation matrices. Thus, the object data structure can be compressed.

FIG. 78 shows the contents of each node in the object tree structure. As shown in FIG. 78, the contents are a pointer to the parent node, color information, texture information, matrix information, number of children, and pointers to the children. If a node inherits the color, texture, and matrix of its parent node, the node does not contain the information.

Figure 79:
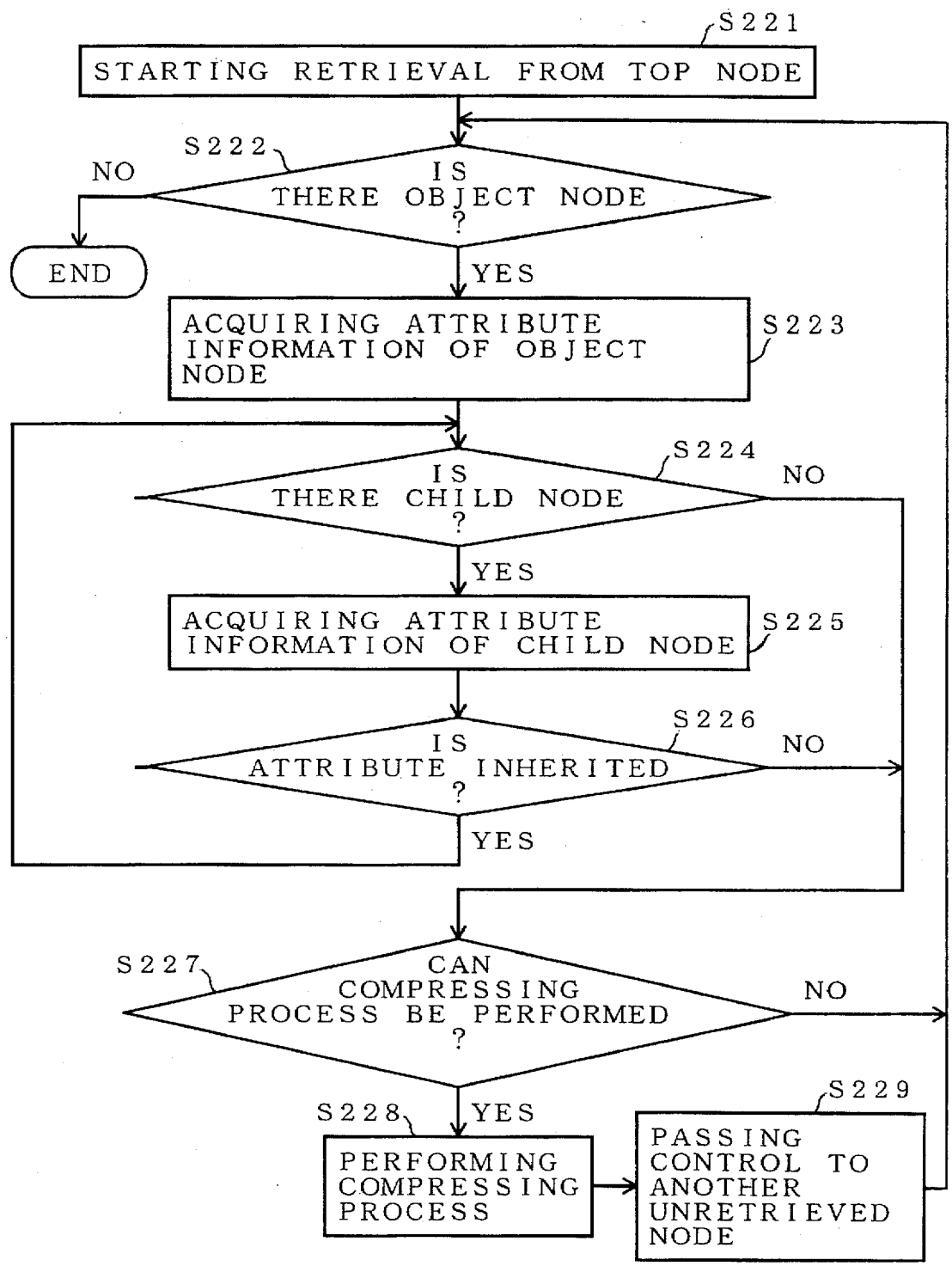
FIG. 79 is the flowchart of the process performed by the object data structure compressing unit shown in FIG. 73.

FIG. 79 is the flowchart of the processes performed by the object data structure compressing unit 263 shown in FIG. 73. If retrieval is started from the top node (root) of an object data structure (step S221), then it is determined whether or not there are any nodes to be processed (step S222). If no, the process terminates. If yes in step S224, the attribute information of the node is acquired (step S223). Then, it is determined whether or not there are any child nodes to the node (step S224). If no, it is determined whether or not a compressing process can be performed (step S227). If yes in step S224, the attribute information of the child node is acquired (step S225). Then, it is determined whether or not an attribute is inherited (step S226). If no, it is determined whether or not a compressing process can be performed (step S227). If yes in step S226, control is returned to the process in step S224.

In the above described step S226, it is estimated whether or not attributes are inherited with respect to all attributes such as color, texture, matrix, etc. If a matrix remains to be inherited after the inheritance of color is processed, then a child node at a lower level is inquired of the existence of the inheritance of a matrix. A child node inheriting the attribute is sequentially stored as a child node to be processed in a compressing process. If a user specifies an attribute to be compressed, the existence of inheritance characteristic is checked only for the specified attribute.

If a compressing process cannot be performed in step S227 because, for example, a child node does not inherit an attribute, then the child node is a non-inheritance node, and the processes are performed from step S222 again. If the compressing process can be performed, the compressing process is carried out (step S228). The inheritance attribute remaining in the child node at this time is the longest inheritance characteristic. Then, the stored child node is compressed with respect to the attribute. In the compressing process, all attribute elements of a child node which inherits attributes are expanded below attribute elements of a specified node (a parent node). Then, the expanded child node is deleted. If the attribute-inheriting child node is further defined below the child node, then all attribute elements are expanded to the specified node and the child node is deleted in the same manner. Thus, child nodes are expanded to a specified node and the child nodes are deleted, thereby reducing the number of levels of an object data structure and the entire number of nodes.

If the compressing process has been completed in step S228, then control is passed to another unretrieved node (step S229).

In this case, the unretrieved node closest to the top node is defined as a specified node. To process the inheritance of an attribute, the object tree should be retrieved from an upper level.

Figure 80:
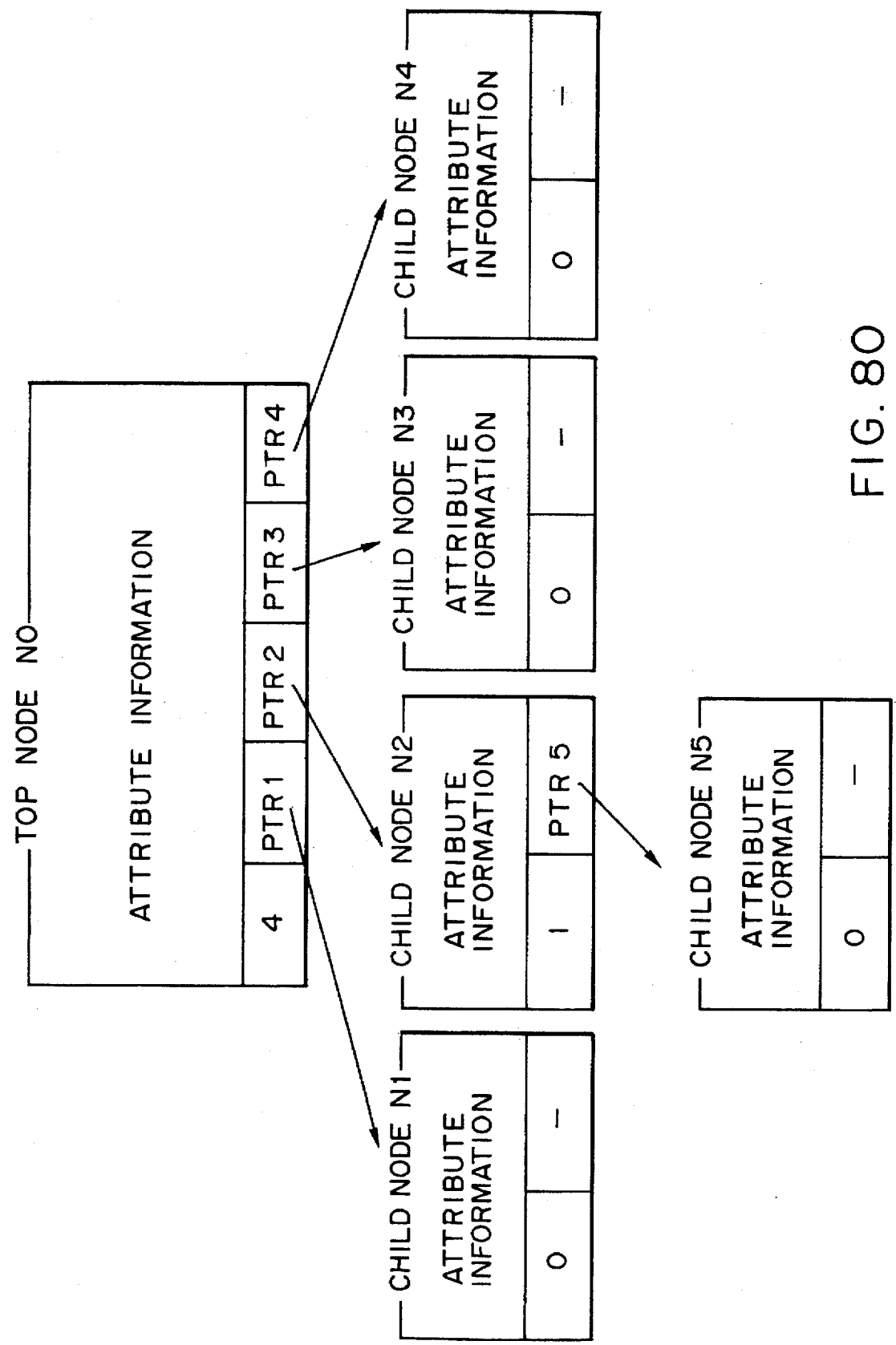
FIG. 80 shows an example of a pointer to a child node.

The process shown in FIG. 79 is explained in detail using an example of the object tree shown in FIG. 80. Each node of the object tree shown in FIG. 80 has the data structure as shown in FIG. 78.

The number of the children of top node N0 is 4. Since top node N0 has the child nodes (yes in step S224), the attribute information about the first child node, that is, child node N1, pointed to by pointer PTR1 is acquired (step S225). Then, a compressing process is performed on child node N1 (step S228). Since child node N1 has no child nodes, control is returned to top node NO at the highest level (step S229).

Then, child node N2 pointed to by the next pointer PTR2 is processed (step S225). Since child node N2 has child node N5 pointed to by pointer PTR5, child node N5 is processed (step S225), and a compressing process is performed on child nodes N2 and N5 (step S228). Since child node N5 has no child nodes, control is returned to child node N2 at a higher level. Since the only one child node N5 of child node N2 has been processed, control is returned to top node NO at the highest level (step S229).

Thus, the nodes are recursively retrieved in a compressing process, and child nodes N3, N4 are accessed using child node pointers PTR3 and PRT4 respectively in a compressing process.

Figure 81:
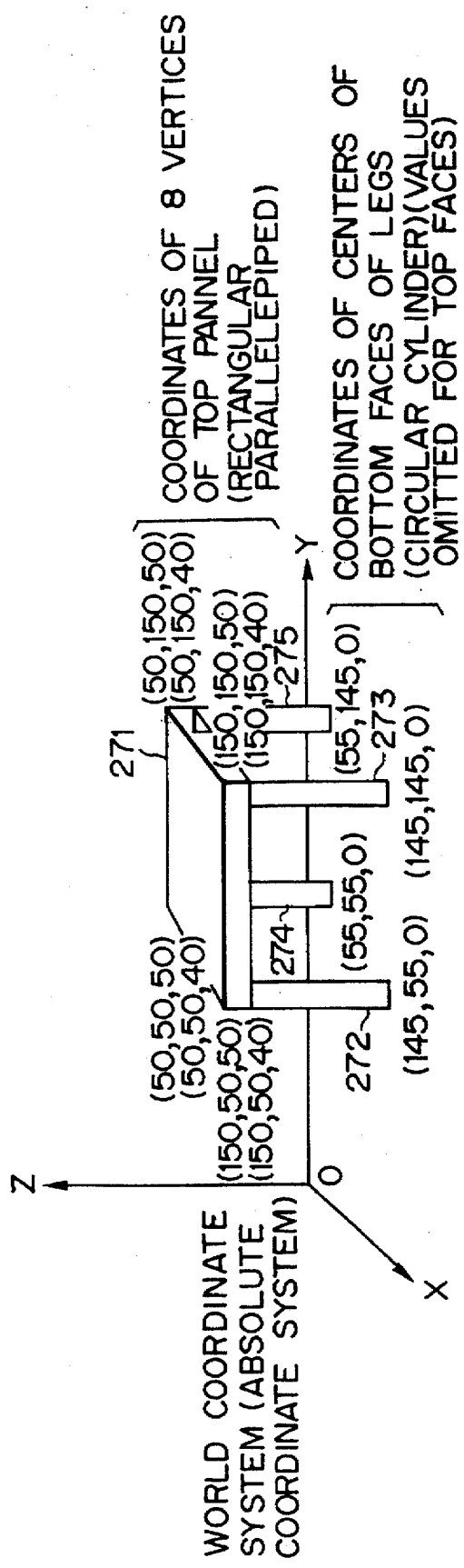
FIG. 81 shows a desk in the world coordinate system.

FIG. 81 shows an example to explain a world transformation matrix. In this example, a square desk is placed in a room as shown in FIG. 81. A world coordinate system (absolute coordinate system) is used to define the form of the desk. In this system, one corner of the room is defined as the origin O. The center of the top panel 271 of the desk is assigned the position (x, y, z) =(100, 100, 45). The size of the top panel 271 of the desk is 100 in width, 100 in depth, and 10 in thickness. The four legs 272, 273, 274, and 275 of the desk are circular cylinders with 5 in radius and 40 in height, and separately fixed to the four corners of the top panel. At this time, a XY plane corresponds to the floor of the room.

If the desk is modeled using the world coordinate system under the above described condition, the coordinates of eight vertices of a rectangular parallelepiped of the top panel 271 and the coordinates of the centers of bottom faces of the circular cylinder legs are obtained as shown in FIG. 81.

FIG. 82 shows a modeling coordinate system of the top panel 271. FIG. 83 shows a modeling coordinate system of the legs 272, 273, 274, and 275. As shown in FIG. 82, a local coordinate system is defined with the center of the top panel 271 of the desk set as the origin O.

A modeling coordinate system is a coordinate system for unique use in defining the form of an object. That is, the form of an object can be defined without considering the position in the world coordinate system, thereby allowing a user to immediately model the object.

Likewise, a modeling coordinate system can be defined as shown in FIG. 83 for a leg of the desk with the center of a circular cylinder of the leg set as the origin O. After the definition, the modeling coordinate systems are converted into the world coordinate system using the world transformation matrices of the top panel and the legs, thereby generating a desk in the room. In this example, the world transformation matrix is simple and has an amount of a displacement as an element.

FIG. 84 shows a world transformation matrix which transforms the top panel 271 shown in FIG. 82 to the world coordinate system shown in FIG. 81, and a world transformation matrix which transforms the leg shown in FIG. 83 to the position of the leg 272 shown in FIG. 81. Each world transformation matrix shown in FIG. 84 is one of the well-known affine transformation matrices, and indicates a parallel displacement of a point in a three-dimensional space. Generally, a point (x, y, z) in an XYZ space is moved to the point (x', y', z') represented by the following equation using the three-dimensional affine transformation matrix $M_A$.

$$(x',y',z',1) = (x,y,z,1)M_A \qquad (12)$$

FIG. 85 shows various three-dimensional affine transformation matrices. The transformation matrix $M_p$ is a transformation matrix through which the point (x, y, z) is moved in parallel to the X, Y, and Z axes by $T_x$, $T_y$, and $T_z$ respectively. The transformation matrix $M_s$ is a transformation matrix through which the coordinate values of the point (x, y, z) are multiplied by $S_x$, $S_y$, and $S_z$ respectively, and indicates scale conversion including enlargement, reduction, and inversion. Using the transformation matrices $M_{RX}$, $M_{RY}$, and $M_{RZ}$, the point (x, y, z) is rotated by θ degrees around the X, Y, and Z axes respectively.

The transformation matrix through which a three-dimensional object is transformed is used as follows. First, the transformation matrices $M_{RX}$, $M_{RY}$, and $M_{RZ}$ produce rotations such that each axis of coordinate of a modeling coordinate system of a polyhedron to be modified can match a corresponding axis of coordinate in the modeling coordinate system of a specified polyhedron. Then, a parallel displacement is applied to the polyhedron using the transformation matrix $M_P$.

If user-selected lines are to be overlapped, a rotation and a parallel displacement are carried out so that the lines are overlapped. If it is necessary to set the lines in the same length, then a scale conversion is conducted using the transformation matrix $M_s$ so that a length of a line to be modified matches a length of a specified line.

If selected points should be overlapped, only the transformation matrix $M_P$ is used to conduct a parallel displacement. The transformation matrices $M_P$, $M_S$, $M_{RX}$, $M_{RY}$ and $M_{RZ}$ are multiplied to the coordinates of each vertex of a polyhedron to be modified in the above described manner. Thus, the polyhedron is transformed in a three-dimensional space.

Each world transformation matrix shown in FIG. 84 corresponds to the transformation matrix $M_P$ shown in FIG. 85. The center of the top panel 271 shown in FIG. 82 is moved from the origin to the point (100, 100, 45) according to the world transformation matrix of the top panel. The center of the leg shown in FIG. 83 is moved from the origin to the point (145, 55, 20) according to the world transformation matrix of the leg. The relationship between the world coordinate system and the modeling coordinate system can be defined by an arbitrary affine transform other than a parallel displacement if necessary. Then, a necessary change associated with the movement of a form can be made using the world transformation matrix, and each coordinate of the form need not be changed at all.

FIG. 86 shows relative transformation matrices of the legs 272, 273, 274, and 275 generated with the center of the top panel 271 as a base point. For example, according to the relative transformation matrix of the leg 272, the center (0, 0, 0) of the top panel shown in FIG. 80 is moved to the point (45, −45, −25) indicating the relative position of the center of the leg 272. Since the relative transformation matrices are generated in the modeling coordinate system of the top panel 271, the legs can be modeled without considering the position of the top panel 271 in the room. Furthermore, since the relative transformation matrices are assigned regardless of the position of the top panel 271, displacement and rotation can be produced even for the legs by changing the world transformation matrix of the top panel 271 in the world coordinate system. Therefore, a user can be provided with an efficient modeling environment. Actually, since the position of each leg in the world coordinate system is required to display the forms of the legs, the world transformation matrix of each leg is obtained by multiplying the world transformation matrix of the top panel 271 by the relative transformation matrix of each leg. However, the user need not be informed of the world transformation matrix of each leg obtained by the multiplication.

Figure 87:
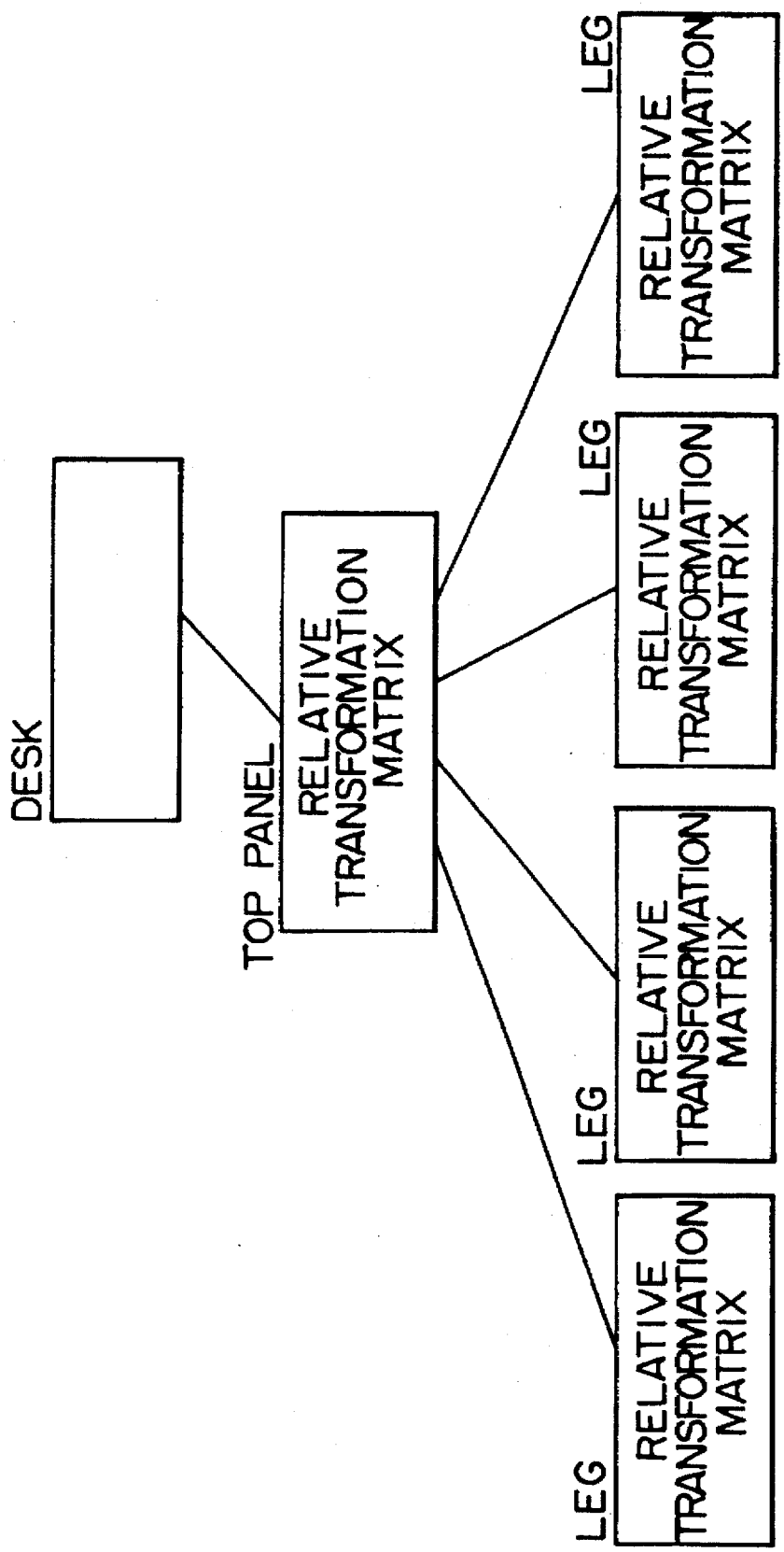
FIG. 87 shows the hierarchical object data structure having a relative transformation matrix as an attribute.

FIG. 87 shows an example of the hierarchical object data structure relating to the relative transformation matrix stored in the editing-format hierarchical object data structure storage unit 262. In FIG. 87, the relative transformation matrix of the top panel is generated with the corner of the room set as an base point. Since the corner of the room is the origin of the world coordinate system, it is also a world transformation matrix of the top panel. The relative transformation matrices of the legs are defined with the center of the top panel set as an base point. In FIG. 87, the color and texture are omitted, and only the relative transformation matrix is considered. Since the relative transformation matrices of the legs are defined relative to the position of the top panel, they are represented by a parent-child relationship between the top panel and the legs.

Figure 88:
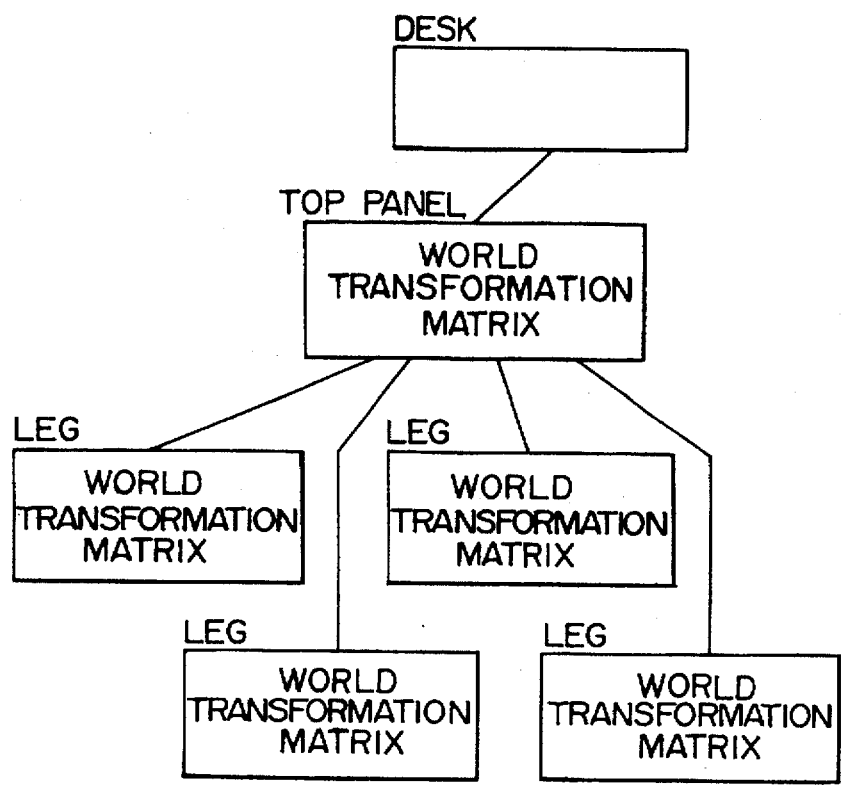
FIG. 88 shows an example of the hierarchical object data structure having an attribute of a world transformation matrix.
Figure 89:
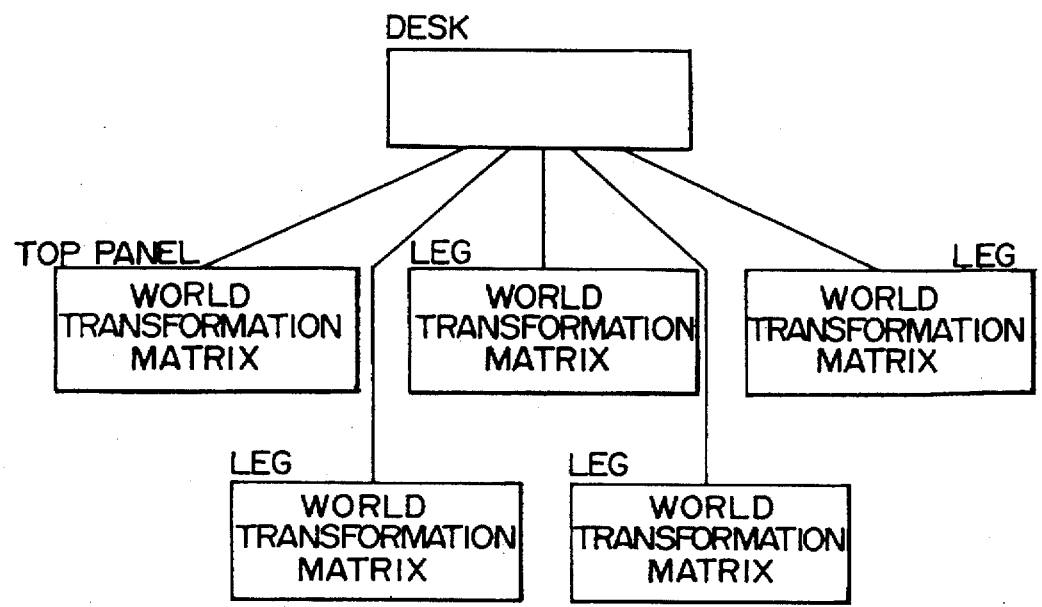
FIG. 89 shows another example of the hierarchical object data structure having an attribute of a world transformation matrix.

FIGS. 88 and 89 show examples of hierarchical object data structures relating to a world transformation matrix. In FIGS. 88 and 89, the color and texture are omitted, and only the relative transformation matrix is considered as an attribute of each object. The world transformation matrix is, unlike the relative transformation matrix, generated based on the origin of the world coordinate system. Therefore, a number of combinations of a parent and children among objects can be defined. For example, in FIG. 88, four legs are the child objects of the top panel. However, each leg does not have to be necessarily the child of the top panel. As shown in FIG. 89, it can be a child object of the desk which is an object at a higher level.

The relative transformation matrix is not required as an attribute in the display-format hierarchical object data structure as long as the world transformation matrix is available. The world transformation matrix of a child object can be used in a display process independently of the world transformation matrix of a parent object. Then, each relative transformation matrix of the editing-format hierarchical object data structure shown in FIG. 87 is transformed into the world transformation matrix so as to generate the hierarchical object data structure shown in FIG. 88 or 89, thereby it can be compressed.

Figure 90:
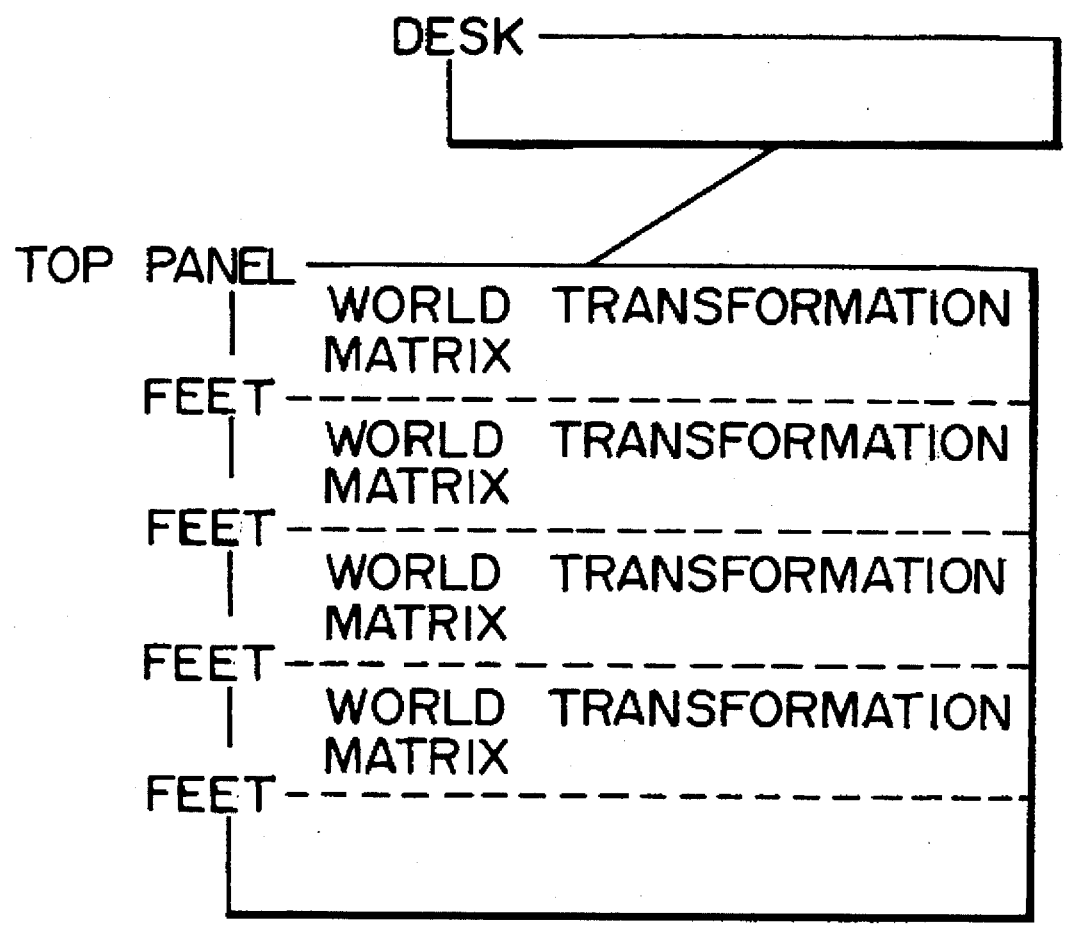
FIG. 90 shows the compressed hierarchical object data structure having a world transformation matrix as an attribute.

FIG. 90 shows an example of a structure obtained after compressing the hierarchical object data structure shown in FIG. 88. In FIG. 88 showing the state before the compression, the depth of the hierarchy is 3, and the number of objects is 6. On the other hand, in FIG. 90 showing the state after the compression, the depth of the hierarchy is 2, and the number of the objects is 2. Therefore, objects can be retrieved at a higher speed in a display process by using the hierarchical object data structure shown in FIG. 90.

FIG. 91 is a flowchart of the compressing process performed by the object data structure compressing unit 263 when the editing-format hierarchical object data structure contains as an attribute the matrix information such as a relative transformation matrix, a world transformation matrix, etc.

In FIG. 91, a compressing process is started from the top node (step S231), a child node is retrieved (step S232), and it is determined whether or not a child node has a relative transformation matrix as an attribute (step S233).

If a child node has a relative transformation matrix, then the world transformation matrix of the child is obtained by multiplying the world transformation matrix of the parent by the relative transformation matrix (step S234). Next, the obtained world transformation matrix of the child is copied to the parent node (step S235), the child node is deleted (step S236), and the processes in and after step S232 are repeated.

If the child node has no relative transformation matrix in step S233, then the processes in and after step S235 are performed. Then, in step S232, the process terminates if there are no child nodes to be compressed.

Thus, the compressed hierarchical object data structure are stored in the display-format hierarchical object data structure storage unit 264, and used by the object display process unit 265 in generating image data.

As described above, according to the fifth embodiment, a compressing process is performed while maintaining an effective attribute inheritance characteristic in a modeling process. Simultaneously, a display-format hierarchical object data structure is concurrently updated. Thus, an object retrieval process can be reduced, thereby considerably shortening the time taken for a displaying process and realizing a high speed display.

What is claimed is:

1. A computer graphics data display device for displaying an object in a computer graphics world comprising:

attribute defining/setting means for defining and setting an attribute indicating a type of calculation to determine a state change for at least one object in the computer graphics world;

attribute memory means for storing the attribute of the at least one object set by said attribute defining/setting means;

state change calculating means for calculating the state change of a displayed object according to the attribute change of at least one related object in response to one of a movement of the displayed object in the computer graphics world and receipt of an external activation instruction, the at least one related object including one of the displayed object and an other object; and result display means for displaying a result of a calculation.

2. The computer graphics data display device according to claim 1, further comprising:

viewpoint volume defining means for defining a volume of a viewpoint corresponding to the displayed object in the computer graphics world, wherein said state change calculating means calculates a moved-to position of the viewpoint based on a relation between the volume of the viewpoint and the attribute of the other object.

3. The computer graphics data display device according to claim 1, wherein said attribute defining/setting means defines an interference attribute as the attribute indicating the type of the calculation, the interference attribute relating to an interference between the displayed object and the object when the displayed object comes in contact with the other object; and said state change calculating means performs a movement interference calculation for the displayed object using a calculation method specified by the interference attribute.

4. The computer graphics data display device according to claim 3, wherein said interference attribute contains an interference restriction attribute indicating a constraint on the movement of the displayed object in the interference between the displayed object and the other object in the computer graphics world.

5. The computer graphics data display device according to claim 4, wherein said attribute defining/setting means defines an average slope angle as the interference restriction attribute which is the constraint when the displayed object moves on the other object having the interference restriction attribute; and said state change calculating means performs a movement calculation, based on the average slope angle, of the displayed object moving on the other object assigned the average slope angle.

6. The computer graphics data display device according to claim 4, wherein said attribute defining/setting means defines an attribute indicating restriction information which depends on a level of a contact force generated by the interference as the interference restriction attribute; and said state change calculating means calculates the contact force in the interference between the displayed object and the other object assigned the interference restriction attribute.

7. The computer graphics data display device according to claim 1, wherein said attribute defining/setting means defines a reaction attribute as the attribute indicating the type of the calculation, the reaction attribute related to the displayed object which reacts with the other object when the displayed object comes in contact with the other object and starts the state change; and said state change calculating means performs the movement interference calculation for the displayed object according to one of a trigger and a type of the state change of the displayed object specified by the reaction attribute.

8. The computer graphics data display device according to claim 7, further comprising:

sound output means for outputting a predetermined sound when the displayed object having a sound output attribute, indicating an output of a predetermined sound as the reaction attribute, comes in contact with the other object; wherein said attribute defining/setting means defines the sound output attribute.

9. The computer graphic data display device according to claim 1, wherein said attribute defining/setting means defines a reaction attribute as the attribute indicating the type of the calculation, the reaction attribute related to the displayed object which reacts with the external activation instruction and starts the state change of one of the displayed object and other objects involved; and said state change calculating means detects the external activation instruction and calculates the state change of the one of the displayed object and the other objects involved.

10. The computer graphics data display device according to claim 9, further comprising:

sound output means for outputting a predetermined sound when the activation instruction is issued to the displayed object having a sound output attribute indicating an output of a predetermined sound as the reaction attribute; wherein said attribute defining/setting means defines the sound output attribute.

11. The computer graphics data display device according to claim 1, further comprising:

attribute distribution display means for displaying information about the attribute defined and set for the at least one object correspondingly to the at least one object in the computer graphics world.

12. A computer graphics data display method of displaying an object in a computer graphics world comprising the steps of: defining an attribute indicating a type of calculation to determine a state change for at least one object in the computer graphics world;

storing the defined attribute of the at least one object;

calculating the state change of a displayed object according to an attribute of at least one related object in response to one of movement of the displayed object in the computer graphics world and receipt of an external activation instruction, the at least one related object including one of the displayed object and an other object; and displaying a calculation result.

13. A computer graphics data display device for use in a display system for displaying computer graphics data generated as graphic information by a computer, the computer graphics data display device comprising:

first processing means for detecting a change in first computer graphics data and, if there is a change detected in the first computer graphics data outputting second computer graphics data relating to the change as change data; and second processing means for storing display computer graphics data corresponding to the first computer graphics data and used to generate image data, said second processing means receiving the change data output from said first processing means, updating the display computer graphics data using the change data, and generating the image data based on updated display computer graphics data.

14. The computer graphics data display device according to claim 13, further comprising:

change data buffer, provided between said first and second processing means, for storing the change data, wherein said first and second processing means asynchronously performs respective processes.

15. The computer graphics data display device according to claim 13, wherein said first processing means comprises:

computer graphics data memory means for storing the first computer graphics data; and computer graphic data management means for obtaining the change data by calculating an influence of external information on the first computer graphics data stored in said computer graphics data memory means.

16. The computer graphics data display device according to claim 13, wherein said second processing means comprises:

changed computer graphics data memory means for storing the display computer graphics data; and computer graphics data image generating means for updating the display computer graphics data stored in said changed computer graphics data memory means and generating the image data from the display computer graphic data.

17. The computer graphics data display device according to claim 13, wherein said first computer graphics data are output from a flight simulator comprising an operation integrating mechanism for obtaining information to be displayed based on data received from a pseudo flying device for a simulation of flying an airplane, calculated data of movement of an body of the airplane, and data indicating a flying method.

18. The computer graphics data display device according to claim 13, wherein said computer graphics data are output from a run simulator comprising a run regenerating device for obtaining run display data to be displayed based on road surface form data designed according to a computer aided design, and run state data calculated from the road surface form data.

19. The computer graphics data display device according to claim 13, said computer graphics data are output from a scene simulator comprising a scene generating mechanism for obtaining scene display data to be displayed based on form data designed according to a computer aided design and viewpoint data.

20. A computer graphics data display device for use in a display system for displaying computer graphics data generated as graphic information by a computer, comprising:

first processing means for outputting change data including first computer graphic data relating to a change if a change has arisen in second computer graphics data, said first processing means including:

a computer graphics data memory unit for storing the second computer graphics data; and a computer graphics data management unit for obtaining the change data by calculating an influence of external information on the second computer graphics data stored in said computer graphics data memory unit;

second processing means including:

a changed computer graphics data memory unit for storing display computer graphics data corresponding to the second computer graphics data and used to generate image data; and a computer graphics data image generating unit for updating the display computer graphics data stored in said changed computer graphics data memory unit based on the change data, and generating the image data from the display computer graphics data; and a change data buffer, provided between said first and second processing means, for temporarily storing the change data.

21. The computer graphics data display device according to claim 20, wherein said first and second processing means are separately provided processor systems.

22. The computer graphics data display device according to claim 21, wherein said change data buffer is a shared memory to be commonly accessed by one of the processor systems forming said first processing means and another one of the processor systems forming said second processing means.

23. The computer graphics data display device according to claim 21, wherein said computer graphics data memory unit is a random access memory in one of the processor systems forming said first processing means; and said changed computer graphics data memory unit is a random access memory in another one of the processor systems forming said second processing means.

24. The computer graphics data display device according to claim 20, wherein said computer graphics data memory unit stores the second computer graphics data in a tree structure in item units; and said changed computer graphics data memory unit stores the display computer graphics data in item units, all items being stored at one level.

25. The computer graphics data display device according to claim 20, wherein said computer graphics data management unit comprises:
an input interpreting unit for receiving the external information and interpreting meaning of the external information;
a computer graphics data calculating unit for receiving an interpretation result from said input interpreting unit and performing an operation specified by the interpretation result;
a computer graphics data storing unit for storing a result of the operation performed by said computer graphics data calculating unit in said computer graphics data memory unit; and
a change data storing unit for storing in said change data buffer the change data obtained from the result of the operation performed by said computer graphic data calculating unit.

26. The computer graphics data display device according to claim 20, wherein said computer graphics data image generating unit comprises:
an image generating unit for receiving the change data, outputting an update instruction relating to the change data, and generating an display image;
a change data referring unit for receiving the update instruction from said image generating unit, referring to contents of said changed computer graphics data memory unit corresponding to the change data, and outputting contents of the change data;
a changed computer graphics data storing unit for updating the display computer graphics data, stored in said changed computer graphics data memory means, based on the contents of the change data output from said change data referring unit; and
a changed computer graphics data referring unit for reading from said changed computer graphics data memory unit and outputting the display computer graphics data updated to said image generating unit.

27. A computer graphics data display method, comprising the steps of:

storing first computer graphics data corresponding to second computer graphics data; and performing in parallel a process of generating, if a change has arisen in the first computer graphics data, change data which are computer graphics data relating to the change, and a process of generating image data by updating the second computer graphics data based on the change data.

* * * * *